(12) United States Patent
Black et al.

(10) Patent No.: US 7,167,860 B1
(45) Date of Patent: Jan. 23, 2007

(54) FAULT TOLERANCE FOR NETWORK ACCOUNTING ARCHITECTURE

(75) Inventors: Darryl P. Black, Hollis, NH (US); William Carter Carroll Bullard, New York, NY (US); Kevin Farrell, Windham, NH (US); Utpal Datta, Bedford, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/276,056

(22) Filed: Mar. 25, 1999

(51) Int. Cl.
G06F 17/30 (2006.01)

(52) U.S. Cl. .......................................... 707/10; 709/224

(58) Field of Classification Search ............... 707/1–10, 707/100–104.1, 200–206; 705/35; 709/217–219, 709/224, 237, 248, 232, 234
See application file for complete search history.

(56) References Cited

U.S. PATENT DOCUMENTS

| | | | |
|---|---|---|---|
| 3,463,222 A | 8/1969 | Grames | 165/10 |
| 4,396,058 A | 8/1983 | Kurschner et al. | 165/8 |
| 4,449,573 A | 5/1984 | Pettersson et al. | 165/10 |
| 4,744,410 A | 5/1988 | Groves | 165/10 |
| 5,020,058 A | 5/1991 | Holden et al. | 370/109 |
| 5,025,457 A | 6/1991 | Ahmed | 375/106 |
| 5,101,402 A | 3/1992 | Chiu et al. | 370/17 |
| 5,109,486 A | 4/1992 | Seymour | 709/200 |
| 5,230,048 A | 7/1993 | Moy | 365/600 |
| 5,293,379 A | 3/1994 | Carr | 370/94.1 |
| 5,430,709 A | 7/1995 | Galloway | 370/13 |
| 5,465,206 A | 11/1995 | Hilt et al. | 705/40 |

(Continued)

FOREIGN PATENT DOCUMENTS

| | | |
|---|---|---|
| EP | 0 786 883 A1 | 7/1997 |
| EP | 0849912 A2 | 6/1998 |
| EP | 0 866 596 A2 | 9/1998 |
| EP | 0 948 165 A1 | 10/1999 |
| EP | 1 014 619 A1 | 6/2000 |
| WO | WO 96/07281 | 3/1996 |
| WO | WO 97/26739 | 7/1997 |
| WO | WO 98/23080 | 5/1998 |
| WO | WO 98/24208 | 6/1998 |
| WO | WO 99/07108 | 2/1999 |

OTHER PUBLICATIONS

Cobb 'Preserving quality of service guarantees in spite of flow aggregation'—Oct. 13–16, 1998, IEEE, pp. 90–97.*
XaCCT User Guide, 1997–1998, XaCCT Technologies, Inc.
XaCCT ISM Guide, "Generic Proxy Server," 1997–1998, XaCCT Technologies, Inc.
XaCCT ISM Guide, "Netscape Proxy Server," 1997–1998, XaCCT Technologies, Inc.

(Continued)

*Primary Examiner*—Shahid Alam
*Assistant Examiner*—Jean Bolte Fleurantin
(74) *Attorney, Agent, or Firm*—Withrow & Terranova, P.L.L.C.

(57) ABSTRACT

A system for collecting and aggregating data from network entities for a data consuming application is described. The system includes a data collector layer to receive network flow information from the network entities and to produce records based on the information. The system also includes a flow aggregation layer fed from the data collection layer and coupled to a storage device. The flow aggregation layer receiving records produced by the data collector layer and aggregates received records. The system can also include an equipment interface layer coupled to the data collector layer and a distribution layer to obtain selected information stored in the storage device and to distribute the select information to a requesting, data consuming application.

23 Claims, 36 Drawing Sheets

U.S. PATENT DOCUMENTS

| | | | | |
|---|---|---|---|---|
| 5,557,746 | A | | 9/1996 | Chen et al. ................. 709/202 |
| 5,592,620 | A | | 1/1997 | Chen et al. ................. 709/223 |
| 5,630,125 | A | | 5/1997 | Zellweger ................... 395/614 |
| 5,634,009 | A | * | 5/1997 | Iddon et al. ................. 709/223 |
| 5,651,006 | A | | 7/1997 | Fujino et al. ................ 370/408 |
| 5,668,955 | A | | 9/1997 | deCiutiis et al. ............ 379/130 |
| 5,757,798 | A | | 5/1998 | Hamaguchi .................. 370/397 |
| 5,761,502 | A | | 6/1998 | Jacobs ......................... 395/614 |
| 5,778,350 | A | | 7/1998 | Adams et al. ................. 707/1 |
| 5,781,729 | A | | 7/1998 | Baker et al. .................. 709/320 |
| 5,784,443 | A | | 7/1998 | Chapman et al. ............ 379/119 |
| 5,787,253 | A | | 7/1998 | McCreery et al. ...... 395/200.61 |
| 5,793,853 | A | | 8/1998 | Sbisa ........................... 379/120 |
| 5,793,976 | A | | 8/1998 | Chen et al. ............ 295/200.54 |
| 5,794,221 | A | | 8/1998 | Egendorf ...................... 705/40 |
| 5,799,321 | A | | 8/1998 | Benson ......................... 707/201 |
| 5,802,468 | A | | 9/1998 | Gallant et al. ................ 455/422 |
| 5,802,502 | A | | 9/1998 | Gell et al. ..................... 705/37 |
| 5,815,556 | A | | 9/1998 | Thuresson et al. ......... 379/93.25 |
| 5,852,812 | A | * | 12/1998 | Reeder ......................... 705/39 |
| 5,878,420 | A | | 3/1999 | de la Salle ................... 707/10 |
| 5,920,847 | A | | 7/1999 | Kolling et al. ................ 705/40 |
| 5,923,659 | A | | 7/1999 | Curry et al. .................. 370/401 |
| 5,926,104 | A | | 7/1999 | Robinson ................ 340/825.22 |
| 5,931,913 | A | | 8/1999 | Meriwether et al. ......... 709/227 |
| 5,949,782 | A | | 9/1999 | Wells ........................... 370/395 |
| 5,956,391 | A | | 9/1999 | Melen et al. ................. 379/114 |
| 5,956,690 | A | | 9/1999 | Haggerson et al. .......... 235/375 |
| 5,958,009 | A | | 9/1999 | Friedrich et al. ............ 709/224 |
| 5,958,010 | A | | 9/1999 | Agarwal et al. ............. 709/224 |
| 5,978,780 | A | | 11/1999 | Watson ......................... 705/40 |
| 5,991,746 | A | * | 11/1999 | Wang ........................... 709/40 |
| 5,999,604 | A | | 12/1999 | Walter .......................... 379/133 |
| 6,002,948 | A | | 12/1999 | Renko et al. ................. 455/567 |
| 6,009,154 | A | | 12/1999 | Rieken et al. ................ 379/114 |
| 6,014,691 | A | * | 1/2000 | Brewer et al. ................ 709/217 |
| 6,018,713 | A | | 1/2000 | Coli et al. ..................... 705/2 |
| 6,032,147 | A | | 2/2000 | Williams et al. ............. 707/101 |
| 6,038,551 | A | | 3/2000 | Barlow et al. ................ 705/41 |
| 6,047,051 | A | | 4/2000 | Ginzboorg et al. .......... 379/130 |
| 6,047,268 | A | | 4/2000 | Bartoli et al. ................. 705/35 |
| 6,052,447 | A | | 4/2000 | Golden et al. ............... 379/114 |
| 6,058,380 | A | | 5/2000 | Anderson et al. ............ 705/40 |
| 6,069,941 | A | | 5/2000 | Byrd et al. ................... 379/121 |
| 6,070,192 | A | | 5/2000 | Holt et al. .................... 709/227 |
| 6,078,907 | A | | 6/2000 | Lamm .......................... 705/40 |
| 6,078,957 | A | | 6/2000 | Adelman et al. ............ 709/224 |
| 6,081,524 | A | | 6/2000 | Chase et al. .................. 370/389 |
| 6,088,344 | A | | 7/2000 | Wales et al. .................. 370/329 |
| 6,088,706 | A | | 7/2000 | Hild ............................. 707/202 |
| 6,088,789 | A | | 7/2000 | Witt ............................. 712/207 |
| 6,091,737 | A | | 7/2000 | Hong et al. ................... 370/431 |
| 6,112,236 | A | | 8/2000 | Dollin et al. ................. 709/224 |
| 6,118,936 | A | | 9/2000 | Lauer et al. ............ 395/200.53 |
| 6,119,096 | A | | 9/2000 | Mann et al. .................. 705/5 |
| 6,119,160 | A | | 9/2000 | Zhang et al. ................. 709/224 |
| 6,151,601 | A | | 11/2000 | Papierniak et al. ........... 707/10 |
| 6,157,648 | A | | 12/2000 | Voit et al. ..................... 370/401 |
| 6,175,867 | B1 | | 1/2001 | Taghadoss .................... 709/223 |
| 6,192,408 | B1 | | 2/2001 | Vahalia et al. ............... 709/229 |
| 6,199,195 | B1 | | 3/2001 | Goodwin et al. ............. 717/1 |
| 6,230,203 | B1 | | 5/2001 | Koperda et al. ............. 709/229 |
| 6,243,667 | B1 | | 6/2001 | Kerr et al. .................... 703/27 |
| 6,272,126 | B1 | | 8/2001 | Strauss et al. ................ 370/352 |
| 6,275,953 | B1 | | 8/2001 | Vahalia et al. ............... 714/11 |
| 6,278,995 | B1 | * | 8/2001 | Hawkinson ................... 707/4 |
| 6,282,267 | B1 | | 8/2001 | Nolting ........................ 379/34 |
| 6,289,352 | B1 | | 9/2001 | Proctor ......................... 707/102 |
| 6,295,532 | B1 | * | 9/2001 | Hawkinson ................... 707/4 |
| 6,304,892 | B1 | | 10/2001 | Bhoj et al. .................... 709/202 |
| 6,308,148 | B1 | * | 10/2001 | Bruins et al. ................. 703/27 |
| 6,321,326 | B1 | | 11/2001 | Witt ............................. 712/207 |
| 6,327,049 | B1 | | 12/2001 | Ohtsuka ....................... 358/1.18 |
| 6,359,976 | B1 | | 3/2002 | Kalyanpur et al. .......... 379/134 |
| 6,377,567 | B1 | | 4/2002 | Leonard ....................... 370/352 |
| 6,381,306 | B1 | | 4/2002 | Lawson et al. ........... 379/32.01 |
| 6,385,301 | B1 | | 5/2002 | Nolting et al. ............ 379/32.01 |
| 6,405,251 | B1 | * | 6/2002 | Bullard et al. ............... 709/224 |
| 6,415,312 | B1 | | 7/2002 | Boivie .......................... 709/200 |
| 6,418,415 | B1 | | 7/2002 | Walker et al. ................ 705/26 |
| 6,418,467 | B1 | | 7/2002 | Schweitzer et al. .......... 709/223 |
| 6,445,916 | B1 | | 9/2002 | Rahman ....................... 455/423 |
| 6,446,200 | B1 | * | 9/2002 | Ball et al. ..................... 713/1 |
| 6,452,915 | B1 | | 9/2002 | Jorgensen .................... 370/338 |
| 6,625,657 | B1 | * | 9/2003 | Bullard ......................... 709/237 |
| 6,751,663 | B1 | * | 6/2004 | Farrell et al. ................ 709/224 |

OTHER PUBLICATIONS

XaCCT ISM Guide, "Firewall–1," 1997–1998, XaCCT Technologies, Inc.

XaCCT ISM Guide, "Domain Name System," 1997–1998, XaCCT Technologies, Inc.

XaCCT ISM Guide, "ISM Installation and Usage Guide," 1997–1998, XaCCT Technologies, Inc.

Sunworld, "New or Updated Products for SUN UNIX Computing," http://sunsite.uakom.com/sunworldonline/swol–03–1998/swol–03–newproducts.html.

Gerald D. Baulier, Stephen M. Blott, Henry F. Korth, and Avi Silberschatz, "Sunrise: A Real–Time Event–Processing System," Bell Labs Technical Journal, Jan.–Mar. 1998, pp. 3–18.

"Internet Usage Billing Solution," Cisco Systems and Hewlett Packard, 1998.

Press release, "HP and Cisco Deliver Internet Usage Platform and Billing and Analysis Solutions," from www.hp.com, Apr. 28, 1998.

Cisco User Control Point Administrator Guide, "Chapter 5: Retrieving Accounting Data," Sep. 9, 1998.

Ray Hunt, "SNMP, SNMPv2 and CMIP—The Technologies for Multivendor Network Management", Computer Communications 20 (1997) 73–88.

Joseph P. Schlaerth, "A Concept for Tactical Wide–Area Network Hub Management", IEEE, 1994.

ICMP Protocol Overview and part of RFC 792, Sep. 1981, 2 pages.

*XACCT Usage Overview*, XACCT Technologies, 1997.

*HP and Cisco Deliver Internet Usage Platform and Billing and Analysis Solutions* (http://www.hp.com/smartinternet/press/prapr28.html), Hewlett Packard Company, 1998.

Article, Quadri, et al., *Internet Usage Platform White Paper* (http://www.hp.com/smartinternet/solutions/usagewp.), Hewlett Packard Company, 1998.

Article, *Strategies for Managing IP Data* (http://www.hp.com/smartinternet/press/not.html), Hewlett Packard Company.

Article, Nattkemper, *HP and Cisco Deliver Internet Usage and Billing Solutions* (http://www.interex.org/hpworldnews/hpW806.html), Hewlett Packard Company, Jun. 1, 1999(?).

*HP Smart Internet Billing Solution* (http://hpcc925.external.hp.com/smartinternet/solutions/usagebilling.html), Hewlett Packard Company, 1998.

*HP Smart Internet Usage Analysis Solution* (http://www.hp.com/smartinternet/solutions/usageanalysis.html), Hewlett Packard Company, 1998.

Press Release, *New Cisco IOS NetFlow Software and Utilities Boost Service Provider Revenues and Service Management Capabilities* (http://www.cisco.com/warp/public/cc/cisco/mkt/gen/pr/archive/cros_pr.htm), Cisco Systems, Inc., Jul. 1, 1997.

Documentation, *NetFlow FlowCollector 2.0* (http://www.cisco.com/univerca/cc/td/doc/product/rtrmgmt/nfc/nfc_2_0/index.htm), Cisco Systems, Inc., 1998.

Article, Mary Jander, *Hot Products: Network Management—Usage Monitoring Intranet Inspector* (http://www.data.com/issue/990107/manage3.html), Tech Web, CMP Media Inc., Jan. 1999.

Article, Loring Wirbel, *Tools coming for probing, billing of IP packets* (http://www.techweb.com/se/directlink.cgi?EET19981214S0033), EETIMES, Issue 1039, Section: Systems & Software, Dec. 14, 1998, CMP Media Inc.

Article, Loring Wirbel, *Tools enable usage–based billing on the Net* (http://www.eetimes.com/story/OEG19981208S0007), EETIMES, Dec. 8, 1998, CMP Media Inc.

Article, Limor Schweizer, *Meeting the IP Network Billing Challenge* (http://www.tmcnet.com/tmcnet/articles/xacct1298.htm), TMCnet, Dec. 1998(?).

Product Review, *XACCTusage* (http://www.xacct.com/news/xuoverview.htm), internet.com, Internet Product Watch(?).

Article, Loring Wirbel, *In next–generation networks, ISPs are calling the shots* (http://www.techweb.com/se/directlink.cgi?EET19981019S0058), EETIMES, Issue 1031, Section: Communications. Oct. 19, 1998, CMP Media Inc.

Article, Kate Gerwig, *ISPs Take 'Do–It–Yourself' Tack With Billing* (http://www.internetwk.com/news1098/news101398-3.htm), CMP's Tech Web, CMP Media Inc., Oct. 12, 1998.

Article, Kathleen Cholewka, *Xacct Makes It Easier To Bill For IP Service* (http://www.zdnet.com/intweek/daily/981005d.html), Inter@ctive Week, ZDNet, Oct. 5, 1998.

Article, Lucas et al., *Mediation in a Multi–Service IP Network* (http://www.xacct.com/news/art100198.html), XACCT Technologies, Inc., Oct. 1, 1998.

Article, Matt Hamblen, *Middleware enables net usage planning* (http://www.xacct.com/news/art092898.html), Computerworld, vol. 32, No. 29, Sep. 28, 1998.

Article, Tim Greene, *XAACT pinpoints IP network usage* (http://www.xacct.com/news/art092198.html), Network-World, vol. 15, No. 38, Sep. 21, 1998.

Article, Margie Semilof, *Charging for IP use gets easier* (http://www.xacct.com/news/art092198b.html), Computer Reseller News, Sep. 21, 1998.

Article, Kate Gerwig, *Creating Meter Readers For The Internet* (http://www.techweb.com/se/directlink.cgi?INW19980921S0042), Internetweek, Issue: 733, Section: Bandwitdth, Sep. 21, 1998, CMP Media Inc.

Article, John Morency, *XaCCT offers multivendor, multi–technology billing model for ISP consumption* (http://www.nwfusion.com/newsletters/nsm/0914nm2.html), Network World Fusion Focus on Network/Systems Management, Network World, Inc., Sep. 16, 1998.

Article, Shira Levine, *XACCT brings flexible billing to the IP world* (http://www.americasnetwork.com/news/9809/980915_xacct.html), Advanstar Communications, Sep. 15, 1998.

Telecom Product News, *Accounting and Reporting System for Corporate Network Resource and IS Use* (http://www.xacct.com/news/pressreleases/papers3.html), XACCT Technologies, Inc., Apr. 1998.

Article, *BYTE's Best of Show Award at CeBIT Goes To SuperNova;s Visual Concepts* (http://www.byte.com/special/3cebit98.htm), Byte, Mar. 23, 1998.

Press Release, *XACCT Teams With Kenan to Provide Advanced Solution For Usage–Based Billing of IP Applications* (http://www.xacct.com/news/pressreleases/papers8.html), XACCT Technologies, Inc., Oct. 26, 1998.

Press Release, *Solect and XACCT Partner to Provide IP Usage–based Billing Solution* (http://www.xacct.com/news/pressreleases/papers7.html), XACCT Technologies, Inc., Sep. 28, 1998.

Press Release, *XACCT Supports Cisco's New Web–Based Enterprise Management Suite* (http://www.xacct.com/news/pressreleases/papers6.html), XACCT Technologies, Inc., Sep. 22, 1998.

Press Release, *XACCT Technologies Enables Usage–Based Billing for Internet* (http://www.xacct.com/news/pressreleases/papers4.html), XACCT Technologies, Inc., Sep. 21, 1998.

News Release, *XACCT Technologies Now shipping Accounting and Reporting System for Corporate network Resource and ISP Use* (http://www.xacct.com/news/pressreleases/papers1.html), XACCT Technologies, Inc., Mar. 19, 1998.

News Release, *XACCT Technologies Releases Accounting and Reporting System for ISP and Corporate Network Resource Use* (http://www.xacct.com/news/pressreleases/papers.html), XACCT Technology, Inc., Dec. 10, 1997.

"Visual IP Insight," www.visualnetworks.com/products/visual_ip_insight.html.

Press Release, "Visual Networks Reports Record Fourth Quarter and Year End Revenue and Earnings," www.visualnetworks.com/events/0113.html, Jan. 13, 2000.

Lee E. Heindel, Helen L. Hogan, Vincent A. Kasten, "Introduction to the Automatic Message Accounting Data Network System (AMADNS)", Journal of Network and Systems Management, vol. 5, No. 1, 1997, pp. 31–54.

Mike Kogut, Shoshi Loeb, "AMADMS: A Usage Data Transport and Processing System", The Internet Engineering Task Force Proceedings, Mar. 30, 1994, from www.ietf.cnri.reston.va.us.

* cited by examiner

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| NAR_ATTR Type ||||||||| NAR_ATTR Code ||||||||| NAR_ATTR Qualifier ||||||| NAR_ATTR Length |||||||
| Value .... ||||||||||||||||||||||||||||||||

FIG. 9A

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| NAR_ATTR Type ||||||||| NAR_ATTR Code ||||||||| UINT8 ||||||| NAR_VALUE |||||||

FIG. 9B

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| NAR_ATTR Type ||||||||| NAR_ATTR Code ||||||||| NAR_ATTR Qualifier ||||||| NAR_ATTR Length |||||
| 0x10 ||||||||| 0x00 ||||||||| Type ||| | 3 |||||
| | | | | | | | | | | | | | | | | | | | | TIME ||| | | | | | | | |
| Seconds ||||||||||||||||||||||||||||||||
| Seconds ||||||||||||||||||||||||||||||||

| 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| NAR_ATTR Type ||||||||| NAR_ATTR Code |||||||| NAR_ATTR Qualifier |||||||| NAR_ATTR Length ||||||||
| 0x40 ||||||||| 0x40 |||||||| Dir | | | | D | R | Type |||||||||
| | | | | | | | | | | | | | | | | s r c | d s t | t p t | e r c | r e p | | UINT32 ||||| 2 |||||
| | | | | | | | | | | | | | | | | | | | | | | UINT64 ||||| 3 |||||
| Count ||||||||||||||||||||||||||||||||

FIG. 12

FAULT TOLERANCE FOR NETWORK ACCOUNTING ARCHITECTURE

BACKGROUND

This invention relates to accounting systems that collect information from computer networks.

Data collection systems are used to collect information from network traffic flow on a network. These data collection systems are designed to capture one type of network traffic from one source type and deliver the date to one application type such as a billing application.

SUMMARY

According to an aspect of the invention, a method of transmitting accounting records in an accounting system includes collecting data by a data collector associated with a network device and to produce normalized accounting records from the data and transmitting the records to a flow aggregation process. The transmitting further includes storing in the data collector the normalized records, transmitting the normalized records to the flow aggregation process, and awaiting an acknowledgment signal from the flow aggregation process that the flow aggregation process received the records before discarding the records sent to the flow aggregation process; and if the data collector determines that the flow aggregation process is not operating, the data collector, continuing to collect and store records from the network device for future transmission to that flow aggregation process, if the data collector does not receive an acknowledgment signal in response to transmitting the records to the flow aggregation process.

According to an additional aspect of the invention, a system includes a first flow aggregation process, connected to a plurality of data collectors. The plurality of data collectors collect data from network devices, and send the collected data as records to the first flow aggregation process. The first flow aggregation process processes the records to generate aggregated records. The system also includes a second flow aggregation process, connected to the data collectors. The data collectors also send the collected data to the second flow aggregation process. The second flow aggregation process processes the data to generate aggregated records. The system also includes an error detection module detecting an error relating to the first flow aggregation process, and causing the aggregated reports from the second flow aggregation process to be sent to the accounting module in place of the aggregate reports from the first flow aggregation process.

The invention can use and acknowledgment mechanism and a shadowed flow aggregation process to insure fault tolerance for transferring accounting information through the accounting process.

BRIEF DESCRIPTION OF THE DRAWINGS

FIGS. 8A–8B, 9A–9B, 10, 11A–11E, 12 and 13A–13B, are schematic views of data structures used in network accounting records.

DETAILED DESCRIPTION

Architecture

Figure 1:
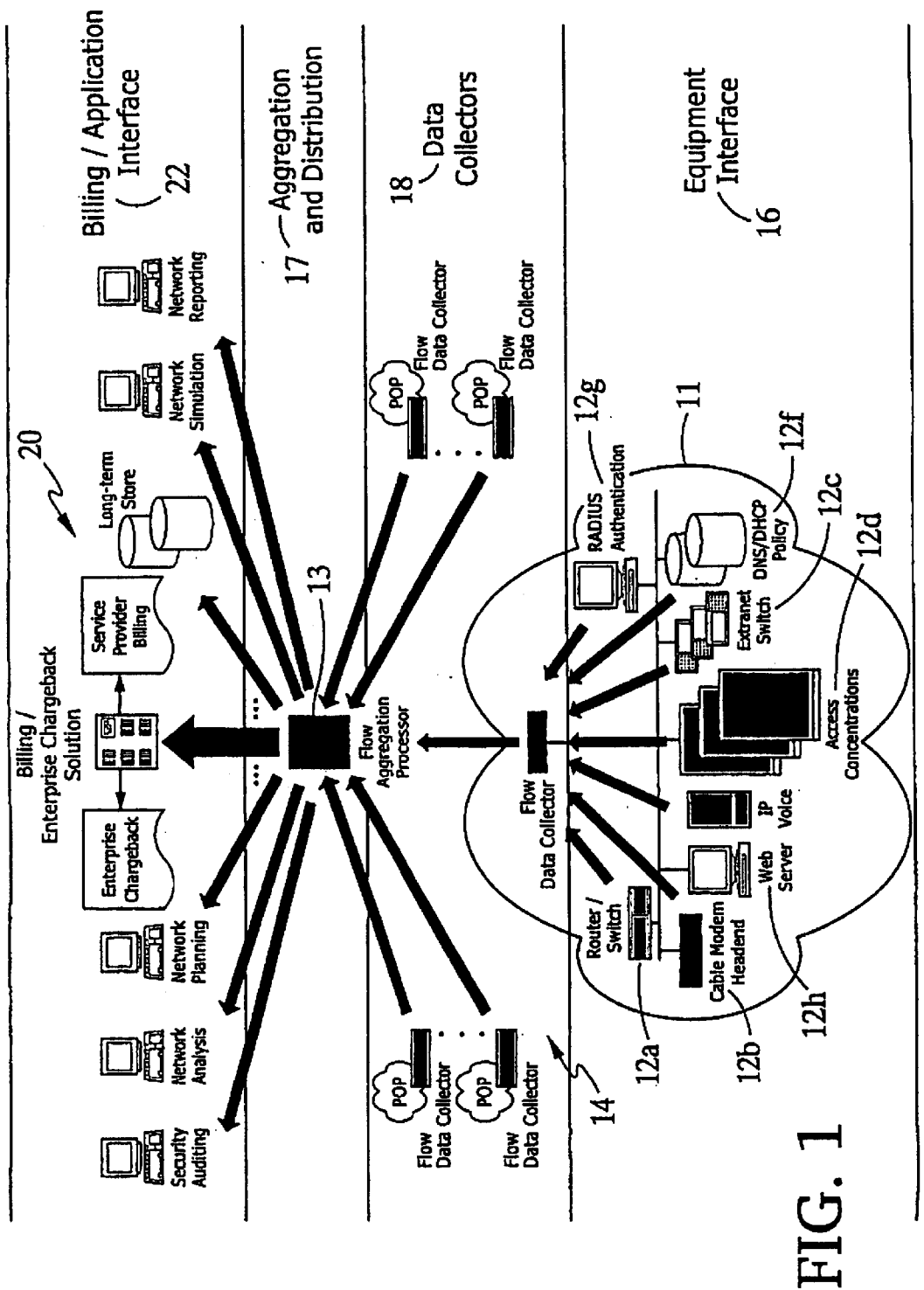
FIG. 1 is a block diagram of a server running an accounting application monitoring a network.

Referring now to FIG. 1, an exemplary arrangement 10 for collecting information from a network is shown. The network includes various network devices 12. The network devices 12 can be disparate, i.e., different equipment types, operating under different protocols and formats. The network devices 12 are coupled to an accounting process 14 via an equipment interface 16.

The accounting process 14 includes a flow data collection layer 18 that runs as client processes with the equipment interfaces on or close to the network devices 12. Individual and multiple data collectors (not referenced) can be disposed at points of presence (POP) in a network 11. The accounting process 14 includes a flow aggregation and distribution process 17 that runs as a server process on a server 15. The accounting process 14 assembles the data into a format that can be used by billing or other user defined data consuming applications 20 that interface to the accounting process 14, through a data consuming application interface 22. Thus, the accounting process 14 collects via the data collector layer 18 multiple and diverse types of data from the network 11, normalizes the data into a consistent accounting record, and provides open interfaces to one or more applications, such as billing via the application interface 22.

The network devices 12, e.g., switches, routers, remote access concentrators, and so forth can produce data of various types and formats which are all handled in the accounting process 14. Examples of the network devices 12 include a router or switch 12a, cable or telephone modems 12b, a flow probe 12c, a remote access concentrator 12d an Extranet switch 12e, a directory naming service (DNS) server 12f, a RADIUS server 12g and web server 12h. One particular source of data, the flow probe 12c will be described below in conjunction with FIGS. 24–28. The network devices 12 can include a "Remote Authentication Dial-In User Service" (RADIUS) server 12g that produces RADIUS accounting records using an existing RADIUS accounting process (not shown). The accounting process 14 can interface to the existing RADIUS accounting process and can use existing RADIUS records without modifying the existing RADIUS accounting environment. RADIUS is a well-accepted standard in the industry and is used across a number of different types of technologies (dial-in, cable, DSL, VoIP, etc.), with the most prominent being dial-in access. So, by supporting RADIUS records the accounting process 14 provides the ability to fit into an existing network environment without modification.

The accounting process 14 enables users such as an Enterprise or an Internet Service Provider to maintain an existing accounting configuration. Information sources can include network traffic flow, RADIUS accounting data, RMON/RMON2 data, SNMP-based data, and other sources of network usage data. The accounting process 14 collects data via the flow data collection layer 18 from multiple disparate sources and produces a new type of composite records. These new composite records result in new information which provides a source for network accounting, billing, management, capacity planning, and so forth.

The accounting process 14, as will be described in FIG. 2, has a core process that can handle data records from each of the equipment types above, as well as other equipment types, and can provide data to each of the plurality of user-defined data consuming applications. This accounting process 14 provides flexibility in choosing data consuming applications that use accounting data. Such applications can include billing, enterprise charge-back or cost allocations, capacity planning, trending, application monitoring, user profiling and so forth.

Accounting Architecture

Figure 2:
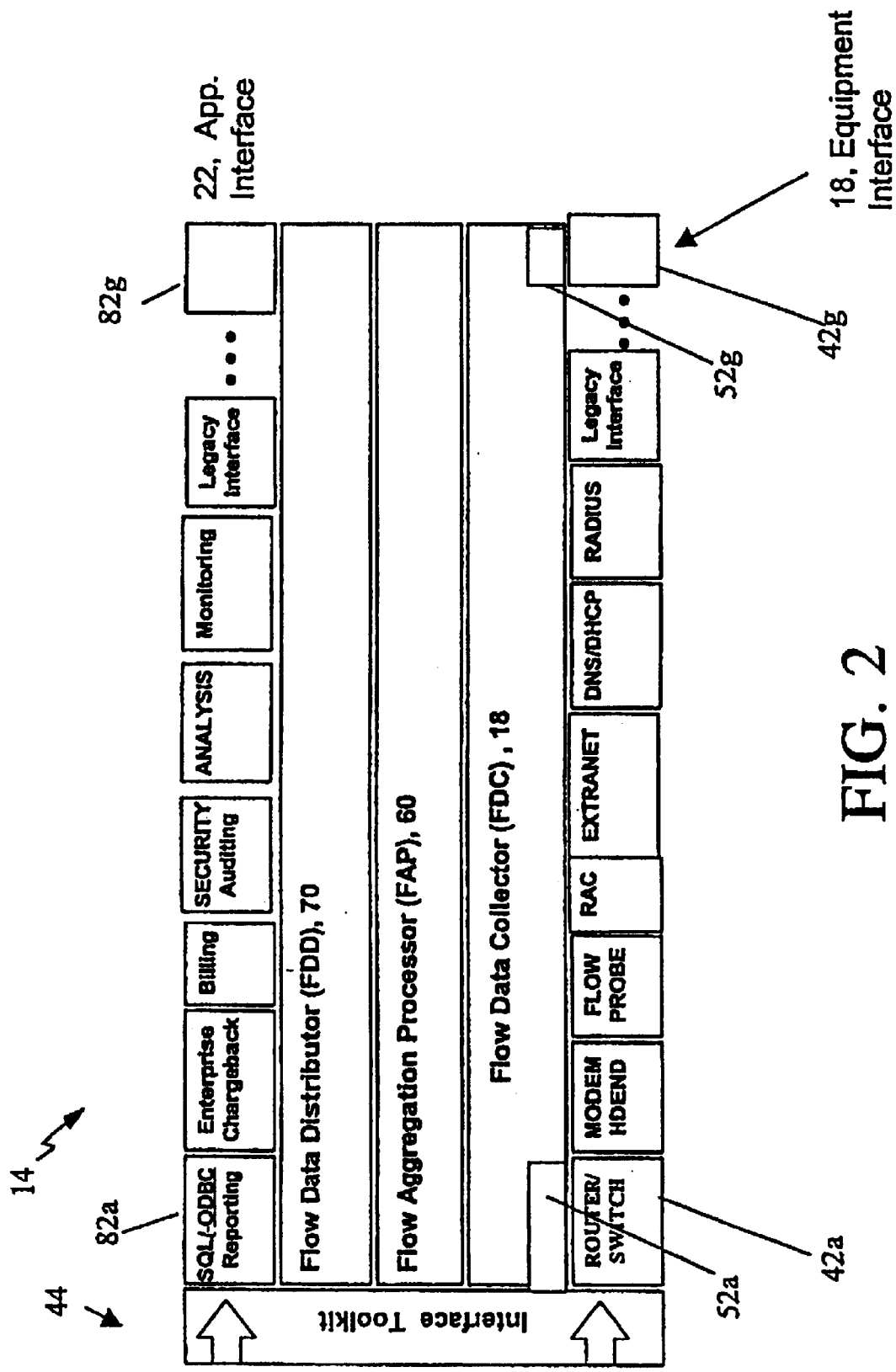
FIG. 2 is an architectural block diagram of the accounting application used in FIG. 1.

Referring now to FIG. 2, the equipment interface layer 16 of the accounting process 14 includes various equipment interfaces 42a–42c which are, respectively, an interface 42a for the router/switch 12a, an interface 42b for the cable/modem head end 12b, and an interface 42c for the flow probe 12c. The equipment interface layer 16 also includes additional interfaces such as an interface 42d for a remote access concentrator 12d, an interface 42e for an Extranet switch 12e, an interface 42f for a DNS server 12f, and an interface 42g for a RADIUS server 12g. The equipment interface can have additional interfaces that can be specified, as new equipment is added. The interfaces 42a–42g can be developed by an interface toolkit 44. The interface toolkit 44 permits a user to construct a new equipment interface type to couple the accounting process 14 to a new equipment source type.

The accounting process 14 also includes a data collector layer 18. The data collector layer 18 is a distributed layer comprised of individual data collectors, e.g., 52a–52g. The data collector layer 18 collects data in the form of raw accounting information specific to the device type. The data collector collects data via the aforementioned equipment interfaces 42a–42g. The data collectors 52a–52g collect the data and convert data into normalized records herein referred to as Network Accounting Records (NARs). Each of the data collectors 52a–52g, as appropriate, forwards network accounting records (NARs) to a flow aggregation process 60.

The data collectors 52a–52g support several different collection models. For example, the data collectors 52a–52g can support a so-called "push model" in which a connected device initiates a transmission of data to the accounting process 14. The data collectors 52a–52g also can support a "pull model" in which the accounting process 14 initiates a connection to an equipment interface for the purpose of obtaining data. In addition, the data collectors 52a–52g can support an "event driven model" in which an event that occurs in either the equipment interface layer 16 or in the accounting process 14 initiates a transfer based on some threshold or criteria being met by the equipment layer 16 or accounting process 14 within which the event occurred.

The data collectors 52a–52g are distributed throughout the network. The data collectors 52a–52g are placed close to or within the network device that the collector is assigned to. That is, the data collector can be in-line or out-of-line relative to the device monitored. The data collectors 52a–52g can be anywhere. The data collectors 52a–52g can be completely uncoupled from the devices except for communication paths. As new network devices 12 are added to the accounting support arrangement 10, new data collectors are also deployed.

The accounting process 14 also includes a flow aggregation processor 60 that is part of the aggregation and distribution process 17 (mentioned above). The flow aggregation processor 60 is a central collection joint for all network accounting records (NARs) produced from various data collectors 52a–52g in the flow data collection layer 18. The flow aggregation processor 60 receives NARs from various data collectors 52a–52g and aggregates, i.e., summarizes related information from the received NARs across the accounting support arrangement 10. The aggregation processor 60 produces Summary NARs i.e., enhanced and unique network accounting records. That is, the flow aggregation process aggregates the records across the network devices; whereas, individual data collectors 52a–52g can aggregate accounting records from individual data sources. Aggregation will be described below in FIGS. 14–23.

The accounting architecture also includes a data distributor layer 70 (part of the aggregation and distribution process 17). The data distribution layer 70 provides a flexible data distribution mediation between the flow aggregation process 60 and a user-defined application, via an application interface layer 22. Data distributor layer 70 presents information to the application interface layer 22, with a pre-defined format, protocol and schedule that is determined by requirements of a user application. The data distributor layer 70 can support push, pull and event driven data distribution models. The application interface layer 22, is comprised of individual application interfaces 82a–82g that are provided by the toolkit 44. The toolkit 44 as with the network device interfaces 42a–42g can be used to produce additional application interfaces 82.

Exemplary Configurations

Figure 3:
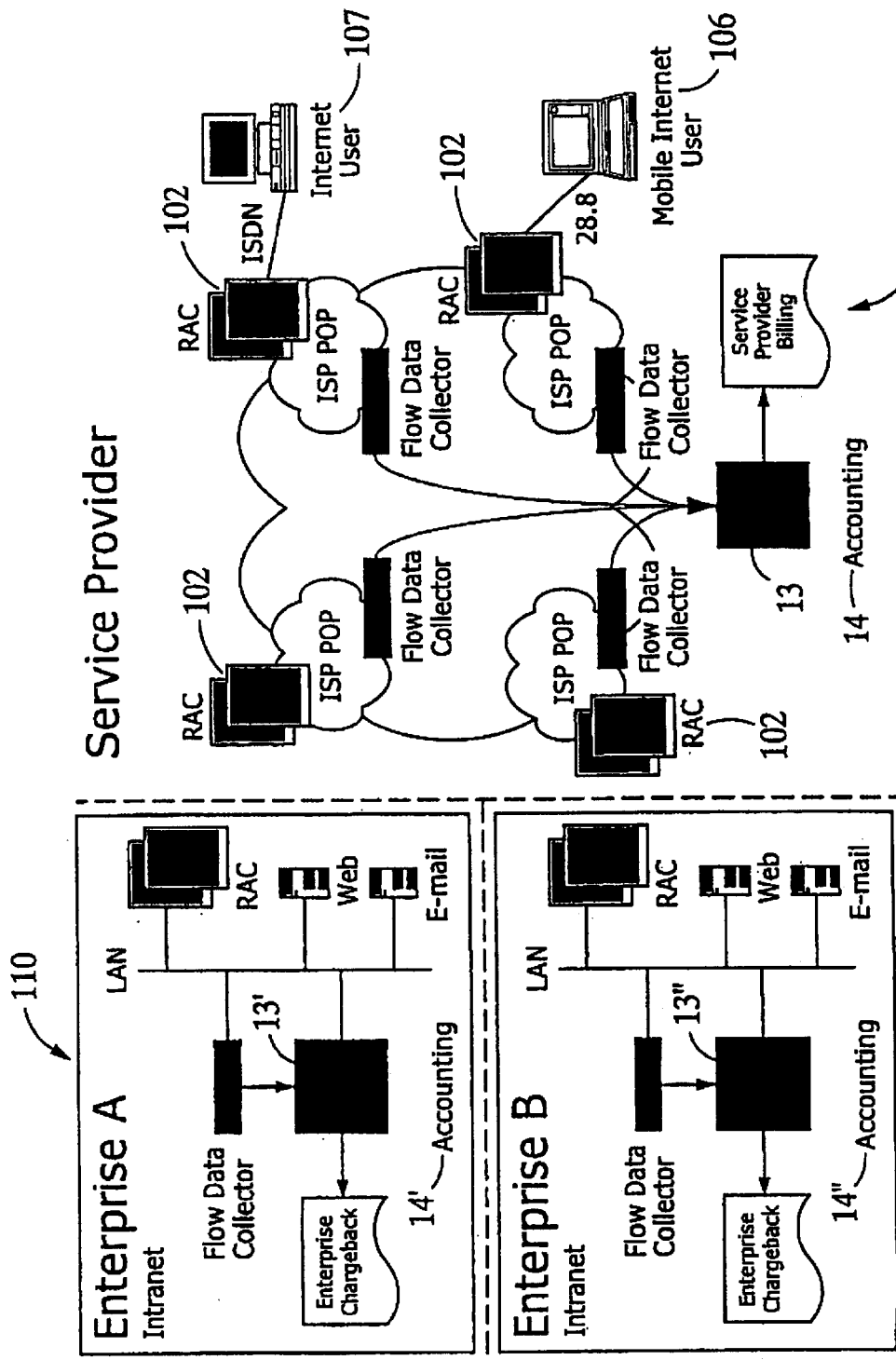
FIG. 3 is a block diagram of accounting support in an access process used by an Internet/Intranet service provider or a large enterprise.

Referring now to FIG. 3, the accounting process 14 can, in general, support any configuration. Exemplary configurations used by an Internet service provider 100, an Enterprise A that host its own remote access 110, and an Enterprise B that uses the Internet service provider 120, are shown.

As shown in FIG. 3, for the Internet service provider, data collectors 52a–52d (illustrated in FIG. 2) are distributed at specific Points of Presence (POP), such as remote access concentrators 102 managed by the Internet service provider. The remote access concentrators allow a mobile Internet user 106 or an Internet user 107 with remote access to access an enterprise over the Internet, via the Internet service provider. In this example, the Internet service provider arrangement 100 and the large Enterprise arrangements 110 and 120 include servers 13, 13', and 13" that run accounting processes 14, 14' and 14". The accounting processes 14, 14' and 14" each independently manage and collect information regarding network traffic usage.

The Internet service provider arrangement 100 includes the accounting server 13 that runs the accounting process 14. The accounting process 14 includes a flow data collector layer 18 that gathers data from the service provider network 100. The flow data collector layer 18 includes distributed, individual flow data collectors 52a–52d. The distributed, flow data collectors 52a–52d collect transaction specific details about a user's connection type and actual network usage. These data are converted into the NARs in the distributed, flow data collectors 52a–52d, as mentioned above. The NARs are aggregated over the entire system by the flow aggregation layer 60 (FIG. 2).

Data is made available to the Internet service provider via the data distribution layer (FIG. 2) so that the Internet service provider can analyze data in order to differentiate service offerings to different users. The Internet service provider can evaluate and use such detailed accounting data collected from various sources to migrate from a single flat rate fee business model to more flexible charging. For example, analysis of the data can enable the Internet service provider to develop new service options that can take into consideration bandwidth usage, time of day, application usage and so forth. In addition, Internet service providers can offer discounts for web hits that may exist in an Internet service provider cache, thereby minimizing the need to look up an address for a requested site on the Internet and can provide free E-mail usage while charging for other types of applications such as file transfer protocol and web traffic.

The data can also be used by other applications such as network planning, security, auditing, simulation, flow profiling capacity planning and network design and so forth. Thus, the Internet service provider can independently monitor and evaluate network traffic caused by remote employees and mobile users, for example.

Similarly, other instances 14', 14" of the accounting process can be used by enterprises, as also shown in FIG. 3. For example, an enterprise may host its own remote access, as shown for Enterprise A and would include a server 13' running an accounting process 14'. An enterprise could use the Internet service provider as shown for Enterprise B, and still have a server 13' running an accounting process 14". The accounting process 14', 14" includes an associated data collector that is coupled to enterprise A and enterprise B local area networks or other network arrangement. In this model, the enterprises use data from the accounting process 14', 141" for enterprise charge-back functions such as billing departments for Internet usage within the enterprise and so forth.

Different instances of the accounting process are used by both the Internet service provider and enterprise A and Enterprise B sites. The instances 14, 14", 14" of the accounting process are independent they do not need to exchange accounting data. Rather, they exist as separate, independent accounting domains.

Figure 4:
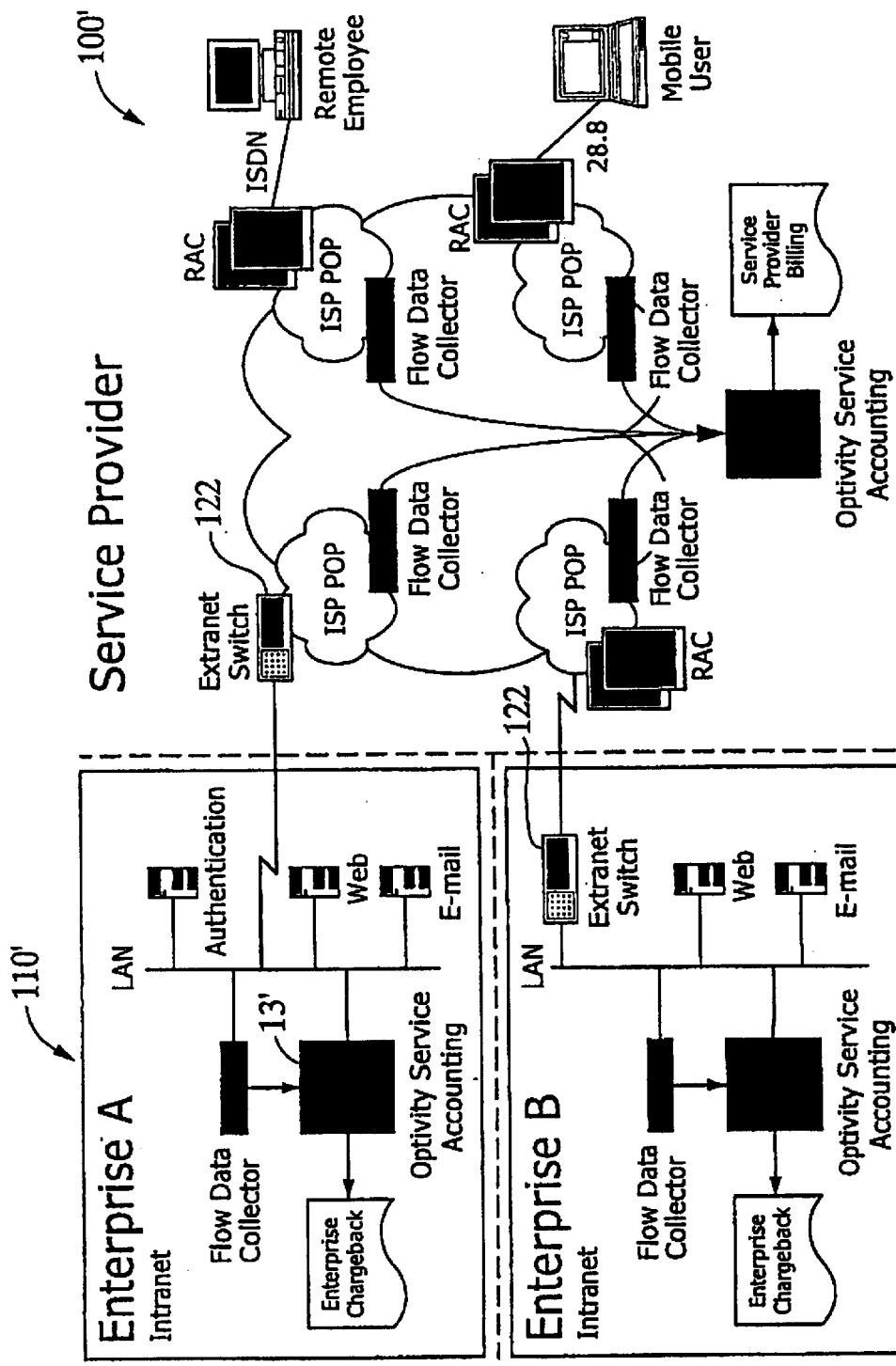
FIG. 4 is a block diagram of accounting support in an access process used by an Internet/Intranet service provider or a large enterprise using an Extranet switch.

Referring now to FIG. 4, a similar access configuration 100', as the configuration 100 (FIG. 3) can be used with an Extranet switch 122. Extranet access allows remote users to dial into an Internet service provider (ISP) and reach a corporate or branch office via an ISP. The Extranet switch 122 allows Internet users access to corporate databases, mail servers and file servers, for example. It is an extension of the Internet in combination with a corporate Intranet. In this configuration, the Extranet switch 122 can be owned and operated by an Internet service provider as shown with enterprise A, or it could, alternatively, be owned and operated by an enterprise, as shown with enterprise B. Users would access the corporate network of either enterprise A or enterprise B, via the Internet service provider with various types of tunneling protocols such as Layer 2 Tunneling Protocol (L2TP), Layer 2 Forwarding (L2F), Point to Point Tunneling Protocol (PPTP) or Internet Protocol Security (IPSec), and so forth. The accounting server 13 located at the service provider and also accounting servers 13', 13" within enterprise A and enterprise B allow each the Internet service provider and each of enterprises A and B to run accounting process 14', 14" on the servers 13', 13" to monitor and collect network data.

Transaction Flow Model

Figure 5:
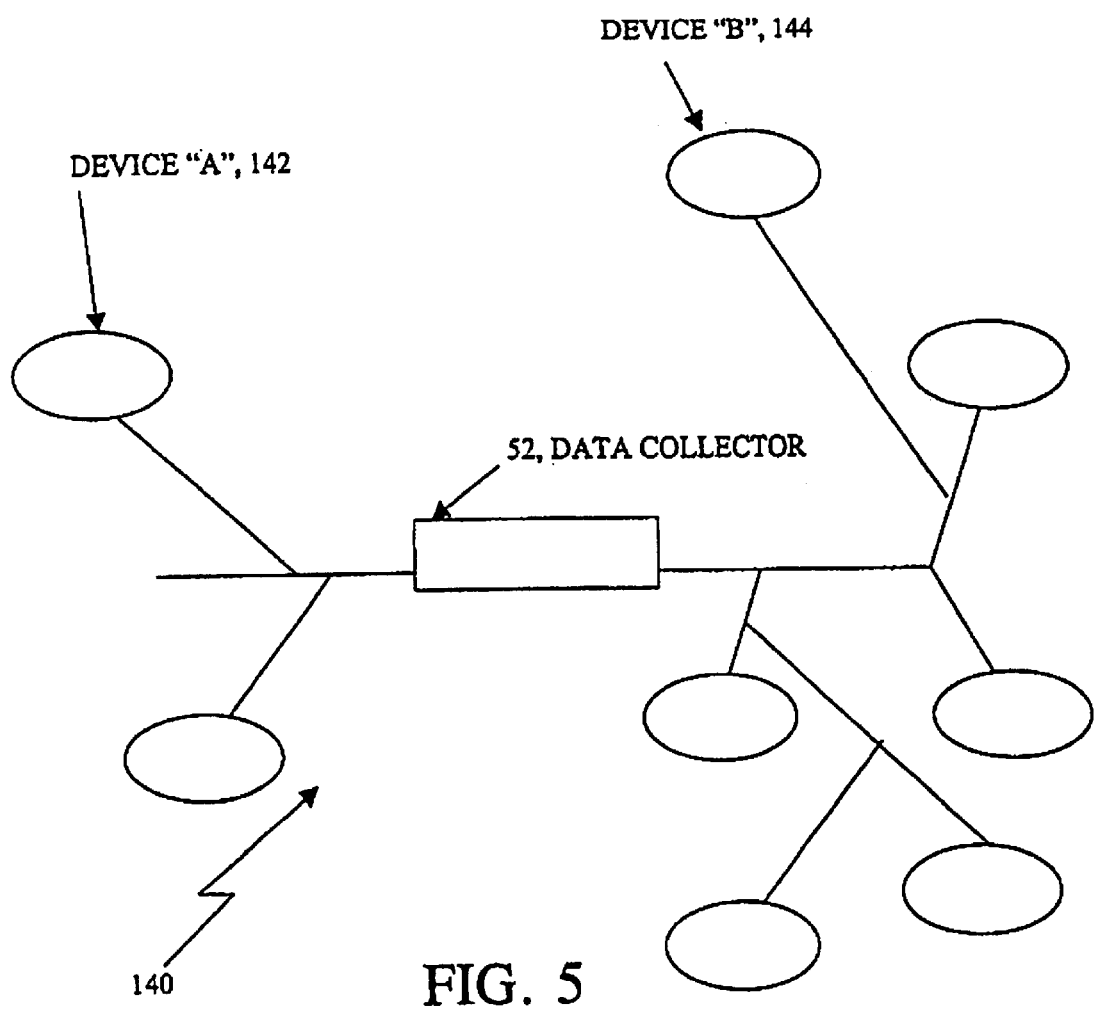
FIG. 5 is graph depiction of a network including data collectors disposed in the network.

Referring now to FIG. 5, a graph 140 depiction of a very large scale network includes a device "A" 142 communicating with a device "B" 144. The graph 140 includes nodes (not all numbered) that can represent routers, switches, flow probes, etc. that have interfaces (not shown) which maintain statistics on information passed through the interfaces. For example, a switch may have a number of Ethernet ports and a host could be connected to one of the ports and in communication with one of the interfaces to transfer information over the network. The interface would have counters that are used to track "packets in," "packets out," "bytes in," "bytes out," and so forth.

In this case of the host connected to the port, or a router or some other device being connected to the port, there is no other connection that the host, router or other device is aware of other than the entire network. This is an example of a "connectionless oriented" protocol. A data collector 52 can be disposed in the network in a path between the entities "A" and "B", such that the data collector 52 monitors some of the packets that comprise a flow between "A" and "B." As a single point monitor, the data collector 52 has no concept that there are two ends communicating. The data collector 52 identifies these entities "A" and "B" in various NARs produced by the data collector 52. At a later stage in the processing, either in the data collector 52 or elsewhere in the accounting process 14 the NARs are correlated so that the NARs or some aggregated NAR produced by the data collector 52 or the rest of the accounting process 14 can be associated with the accountable entities "A" and "B" to thus identify a connection between entities "A" and "B."

The data collectors 52a–52g (FIG. 2) develop a description of the connection. For a router, normally an address of the object that is connected to that interface might serve as an address. A switch has an IP address that can be used as the destination. The actual device that is connected to the switch or router can be used as an accountable object. Although the traffic is not destined for the router, the data collector can use those identifiers as keys to the endpoints "A", "B."

In many cases, the protocol can explicitly determine connections. For example, the TCP/IP protocol is explicitly a "connection oriented" protocol used in the Internet. When the data collector 52 needs to determine a connection, the data collector 52 can exploit the "connection oriented" nature of certain types of protocols such as the TCP/IP protocol. When the data collector 52 tracks a TCP/IP connection, the data collector 52 can determine exactly that A and B are connected, when the connection starts, stops, and updates. With other protocols such as a "connectionless" protocol, and even in some complex environments such as a virtual private network or a proxy server, the data collector 52 does not necessarily know the real endpoints. The data collector 52 only knows that some entity is talking to some other entity.

Thus, the data collector 52 is a single point monitor that monitors traffic at one point in the network and converts the traffic into "pipe oriented" or "flow oriented" accounting information. The data collector 52 identifies a source and a destination of the traffic. That is, the data collector 52 develops a "connection oriented tracking." By distributing data collectors 52a–52g (FIG. 2) throughout the network, the network can be modeled as pipes having two endpoints. A data collector can be disposed in a partial pipe. The data collector 52 determines that one end of the pipe refers to "A" and the other end of the pipe refers to "B." The data collector 52 can be disposed anywhere along the network.

The graph 140 represents the network as a directed graph, including partial segments. The endpoints of those partial segments can act as proxy entities to the actual accountable objects. Once independent accounting records that relate to these two entities A and B are aggregated in the accounting process 14, the accounting process 14 can identify that A and B are connected and have particular metrics.

Some equipment have a half pipe model that generates independent-accounting records for each half pipe. The data collectors can assemble full pipe information from half pipe information. The accounting process 14 could be coupled to equipment that gives a half pipe model for A communicating with B and a separate one for B communicating with A. The data collectors 52a–52g combine information from these two half pipes into a bidirectional flow.

Figure 6:
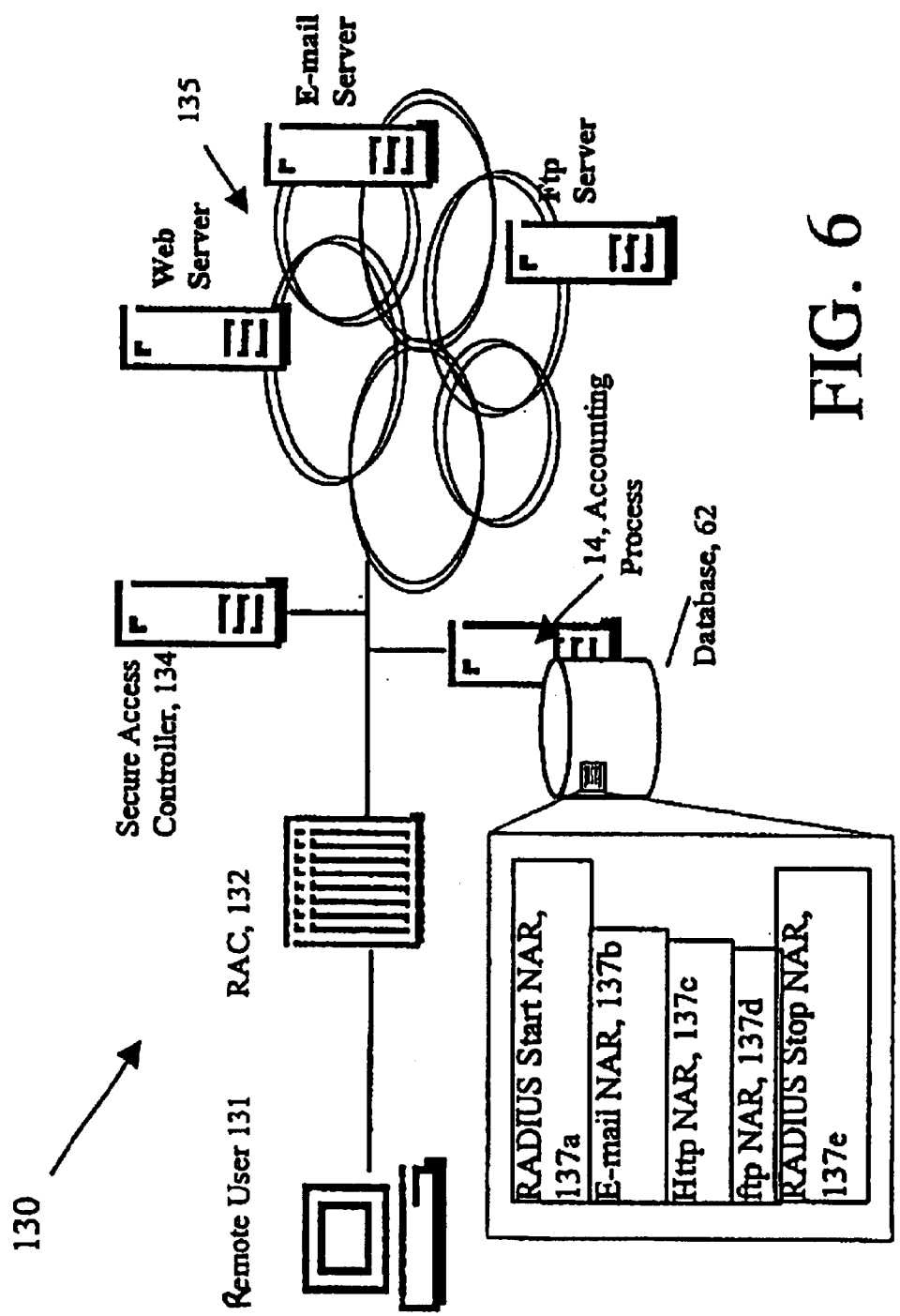
FIG. 6 is a flow diagram showing a typical data flow process using an accounting process.

Referring now to FIG. 6, an example of data flow 130 through the accounting process 14 is shown. In this example, the data flow 130 is initiated by a user 131 making a call to a remote access concentrator (RAC) 132. Upon receiving the call the RAC 132 authenticates the user 131 against a secure access controller 134. After verification, the RAC 132 connects the user 131 to the network 135 and sends a RADIUS Start record (not shown) to the accounting process 14. The accounting process 14 generates a RADIUS Start NAR 137a and stores the RADIUS Start NAR 137a in a database 62. At that point, the remote user may check e-mail, look at a web server and transfer a file. For each transaction, the accounting process 14 captures the IP traffic, generating e-mail, http, and ftp network accounting records 137–137d, respectively. These are stored in the database 62. Upon completion of these transactions the user would log out of the network, at which time the RAC 132 would send the accounting process 14 a RADIUS Stop record. The accounting process 14 generates a RADUIS Stop NAR 137e and stores the RADIUS Stop NAR 137e in the database 62. All of these records reflecting the user's transactions could be viewed and reported in flexible ways dependent on the needs of an end-user application.

Network Accounting Records (NARs)

The data collector 52 translates collected information into network accounting records (NARs). A NAR includes a header, an accounting entity identifier and metrics. The network accounting record (NAR) is a normalized data record that contains information about a user's network usage activity.

Figure 7:
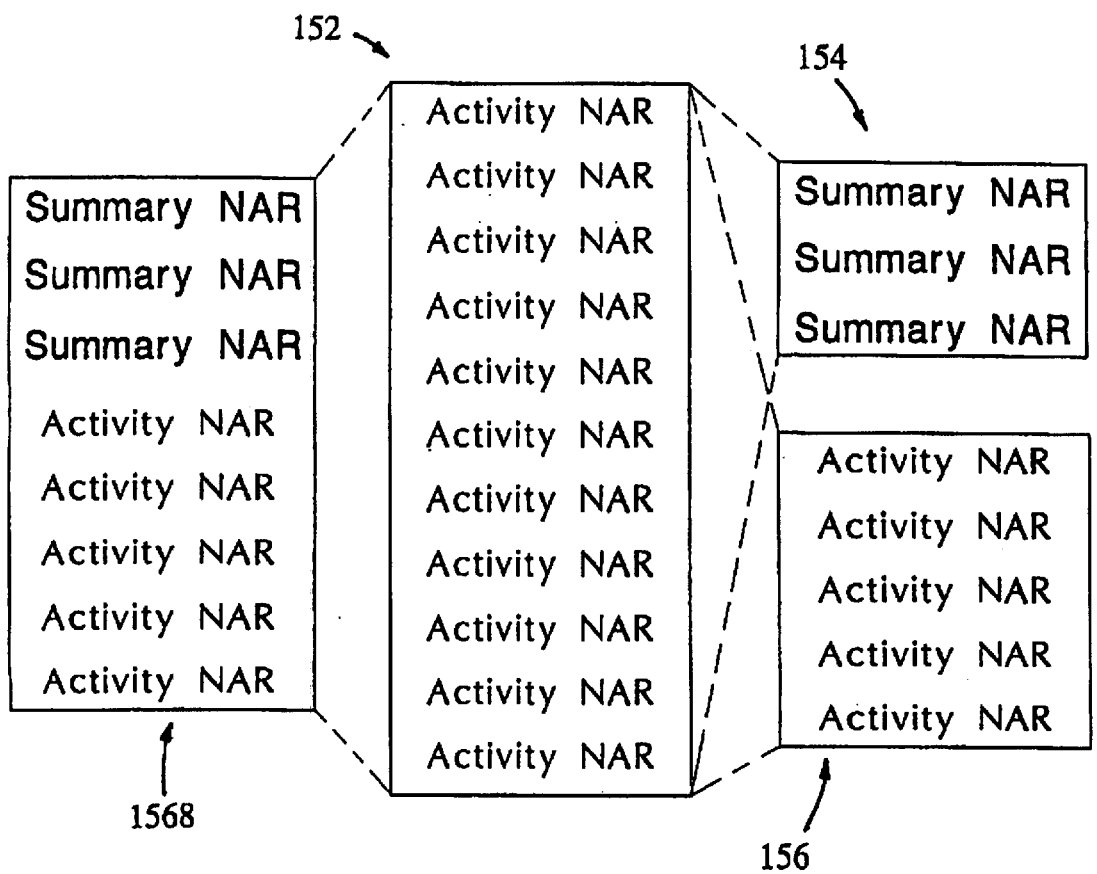
FIG. 7 is a diagram show exemplary network accounting records.

Referring now to FIG. 7 a base level "activity" NAR that includes source, destination, protocol, source port, destination port, byte and packet counts, etc. The base level activity NAR can be combined and aggregated in many different and flexible ways to support various accounting functions. The NAR is an activity record corresponding to some level of detail. Detail can vary based on the level of aggregation being applied, in accordance with the needs of the end-user/application.

FIG. 7 has a plurality of exclusively "Activity NARs" which could correspond to a very low level of detail, or could be the result of a prior aggregation providing a higher level view of the information. Thus, FIG. 7 shows a collection 152 of exclusively activity NARs. From base level data, additional "views" of the NAR could be produced, such as a set of "Summary NARs" 154, or another set of Activity NARs 156 which could be a result of further aggregation of the base level information, or lastly a combination of a set of Summary NARs and Activity NARs 158. The summary NAR is produced by the central aggregation processor 60 and can include user identifying information, protocol information, connection time information, data information, and so forth.

The specifics of what can be combined and aggregated will described below. Thus, the accounting process 14 use of NARs provides the ability to combine and aggregate base level activity information in a flexible way to meet the specific needs of the end-user/application.

TABLE 1 below corresponds to the fields that can be captured in a NAR. This is essentially the activity NAR. The NAR contains these fields, which can then be combined and used to form other activity NARs or summary NARs.

TABLE 1

| Column Name | Description |
| --- | --- |
| OSA_SOURCE_TYPE | List all of the possible data sources from which data can be collected. Reference to OSA_SOURCE_TYPE TABLE. |
| OSA_SOURCE_SERIAL_NUM | Number which uniquely identifies an OSA FDC. |
| START_TIME_SEC | Indicates the date and time at which a record was recorded. |
| START_TIME_USEC | Microseconds component of START_TIME_SEC. |
| SEQUENCE_NUMBER | Sequence number assigned by the source of the NAR to uniquely identify the record and ensure integrity. |

TABLE 1-continued

| Column Name | Description |
| --- | --- |
| USER_NAME | The user associated with the record. |
| EVENT | Event type of the record (i.e. Start, Stop, Update). |
| SESSION_ID | Unique Accounting ID to make it easy to match start and stop records. |
| SESSION_TIME | Duration of the record in seconds. |
| SESSION_TIME_USEC | Microseconds component of the SESSION_TIME. |
| SRC_ADDR | Source address of the record. |
| DST_ADDR | Destination address of the record |
| PROTO | Protocol of the record. Reference to OSA_PROTOCOL_TYPE table. |
| SRC_PORT | Source port number. |
| DST_PORT | Destination port number. |
| SRC_OCTETS | Number of bytes transmitted into the network by the source. For RADIUS is equivalent to Acct-Input-Octets. |
| DST_OCTETS | Number of bytes sent out of the network, to the source. For RADIUS is equivalent to Acct-Output-Octets. |
| SRC_PKTS | Number of packets transmitted into the network by the source. For RADIUS is equivalent to Acct-Input-Packets. |
| DST_PKTS | Number of packets transmitted out of the network, to the source. For RADIUS is equivalent to Acct-Output-Packets. |
| SRC_TOS | The Type of Service coding marked by the source. |
| DST_TOS | The Type of Service coding marked by the destination. |
| SRC_TTL | The Time To Live field set by the source and modified by the network until the Nortel flow probe recorded it. |
| DST_TTL | The Time To Live field set by the destination and modified by the network until the Nortel flow probe recorded it. |
| OSA_CAUSE | A number that indicates the reason the accounting record was generated. |
| OSA_STATUS | A value used to indicate the status of an accounting record when it was created. |
| ACCT_DELAY_TIME | Indicates how many seconds the client has been trying to send this record |
| ACCT_AUTHENTIC | Indicates how the user was authenticated. |
| ACCT_TERMINATE_CAUSE | Indicates how the session was terminated |
| ACCT_MULTI_SESSION_ID | Unique Accounting ID to make it easy to link |
| ACCT_LINK_COUNT | Indicates the count of links which are known to have been in a given multilink session at the time the accounting record is generated. |

The summary NAR and activity NAR have a one-to-many relationship. That is, while there can be a single summary NAR for a particular user over a particular call that will contain information about the sum of usage of network resources over the duration of the call, there can be many activity NARs. The activity NARs capture details about the actual activity and applications being used during the call. The summary NAR, therefore, depicts the total expense of the transaction or a set of transactions on a network, whereas, the activity NARs depict expenses of a transaction at any point in time. The summary NAR is generated in the flow aggregation process 60, as will be described below. In essence, the summary NAR is generated from individual activity NARs correlated in the data collectors 52a–52g, as will be described below.

A NAR is a member of a generic data message set that is used to transport data, such as network accounting data, through the accounting process 14. These system data messages include "Status Event", "Maintenance Event", "Trace Event", "Network Accounting Record". Accounting process 14 messages share a common MSG_HDR structure that is used to discriminate between the four types of accounting process 14 messages. The Message Header (MSG_HDR) includes Message Type, an Message Event and Cause, and Message Length.

Network Accounting Record Data Structures

As will be described below, the NAR is unique within the accounting process 14. The NAR has a NAR_ID that specifies an accounting process component ID. The component ID specifies the data collector assigned to a particular network device that produced the NAR. The component ID e.g., NAR_SRC_ID 203a (FIG. 8B below) is allocated at the time that the component is produced. The NAR_ID also includes a time stamp at the second and microsecond level so that the accounting process 14 can discriminate between multiple NARs generated by a particular component. A sequence number, e.g., 32 bits is also used to differentiate NARs from the same accounting process component that may have the same time stamp. The sequence number e.g., NAR_SEQ_NUM 203c (FIG. 8B) is preferably a monotonically increasing number starting from, e.g., 1. As long as the component is functioning, and producing NARs, the component provides a new sequence number to a new NAR.

Figure 8A:
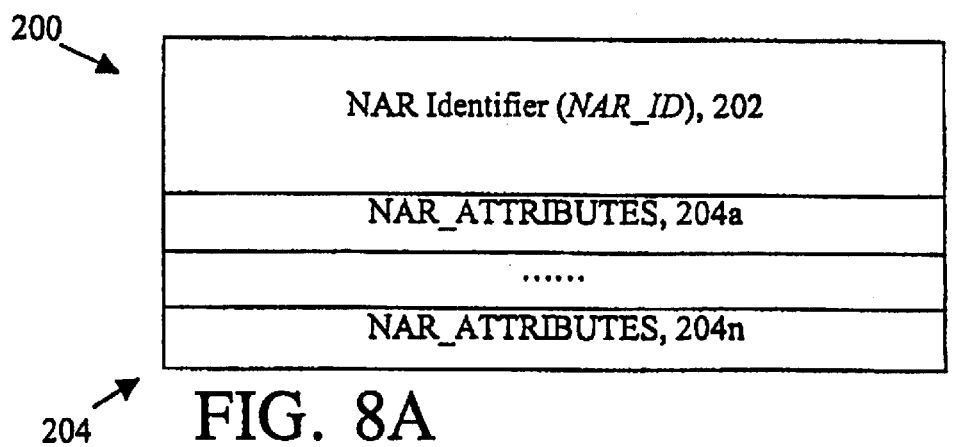
Figure 8B:
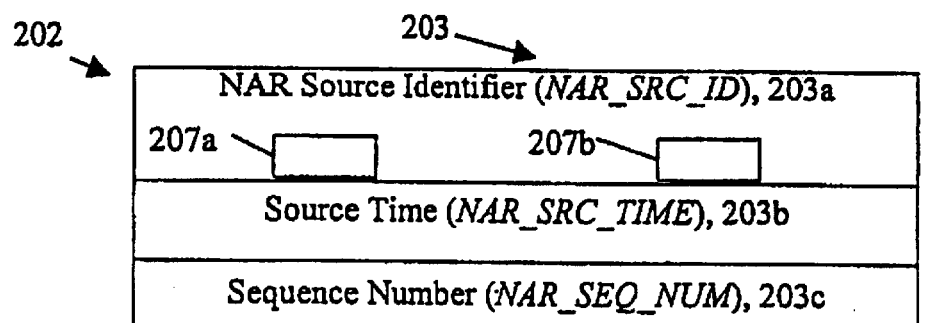

Referring now to FIGS. 8A–8C, a Network Accounting Record (NAR) data structure 200 is shown.

As shown in FIG. 8A, the NAR data structure 200 includes two basic accounting objects, a Network Accounting Record Identifier 202, and optionally one or as shown a plurality of Network Accounting Record Attributes 204a–204n, generally denoted as 204. The Network Accounting Record Identifier 202 has a set of object identifiers that uniquely identifies the network accounting record within the accounting process 14.

The Network Accounting Record Identifier 202 acts as a database key value that makes the NAR 200 unique within the entire accounting process 14. The Network Accounting Record Identifier 202 allows the NARs to be handled and managed using database functions such as database integrity analysis and reliability analysis. The Network Accounting Record Identifier 202 also gives the accounting process 14 the ability to track the source of NARs and to build mechanisms such that the accounting process 14 can maintain identity of the origination of NARs throughout the system 10.

The plurality of Network Accounting Record Attributes 204a–204n provide metrics for the NAR 200. The Network Accounting Record Attributes 204a–204n capture specific information contained in data from network devices. Differentiating between the Network Accounting Record Identifier 202 and the metric 204 allows the accounting process 14 to perform logical and arithmetical operations on metrics 204 while leaving the Network Accounting Record Identifier 202 intact. The Network Accounting Record Identifier 202 can be enhanced unlike the metrics 204.

The data collectors 52a–52g (FIG. 2) are oriented around the process of filling in the NAR. The metrics are left untouched by the data collector and are passed transparently into the accounting process flow aggregation processor 60. The data collectors 52a–52g assign the Network Accounting Record Identifiers 202 to the metrics e.g., a source and a destination identifier to the metric. In the example of a router link, the metrics that the router interface provides are in the form of "information in" and "information out" e.g., octets in, octets out, bytes in, bytes out, datagrams in, datagrams out, faults in, faults out, and so forth. The data collectors 52a–52g determine what "in" and "out" mean and assigns the unique identifier that is unambiguous relative to the determined meaning of "in" and "out." Once a data collector 52 has established this convention, the convention is used throughout the system 10.

Thus, the NAR Identifier 202 provides database constructs to a NAR, whereas, the plurality of Network Accounting Record Attributes 204a–204n provide the actual metrics used for network activity reporting and network accounting.

As shown in FIG. 8B, the Network Accounting Record Identifier 202 (NAR_ID) is a set of objects within the NAR that uniquely identifies the NAR throughout the accounting process 14. The NAR_ID 202 is designed to support a number of properties of a NAR including flexibility, accountability, reliability and uniqueness. In order to provide these properties, the NAR_ID 202 is divided into objects designed to specifically provide these properties. Flexibility is supported through a NAR_HDR 203 section of the NAR_ID. Accountability is attained in the NAR through explicit identification of the source of the NAR by a component identification NAR_SRC_ID 203a. The source time is maintained in a NAR_SRC_TIME 203b. Reliability is supported, as described above, through the use of a NAR sequence number (NAR_SEQ_NUM) 203c, which is designed to enable traditional database integrity mechanisms.

The NAR_ID 202 is used to provide uniqueness for each NAR. The responsibility for guaranteeing the uniqueness of each NAR is handled by every accounting process component that has the ability to originate/source network accounting records. This responsibility requires that each accounting process component have the ability to unambiguously identify itself in each NAR that it produces. Thus, NAR type identifier, NAR_TYPE, is comprised of the source component identifier, NAR_SRC_ID, the NAR source time, NAR_SRC_TIME, and the NAR sequence number, NAR_SEQ_NUM. These three data objects act as a database key for a particular network activity record, ensuring the uniqueness of the NAR throughout the entire system.

The NAR_SEQ_NUM can have several purposes. One way that the NAR_SEQ_NUM can be used is as a discriminator when two NARs are produced at the same time. A second way that the NAR_SEQ_NUM is used is as a monotonically increasing index to ensure database integrity. Because the NAR_ID is unique, it should be considered as an allocated value. A NAR_ID is allocated at NAR origination.

If a component creates or modifies the contents of an existing NAR, as for example when aggregating two NARs together, the component originates the NAR_ID. This provides an opportunity for the accounting process 14 to have explicit internal integrity mechanisms that can account for any network accounting record that is processed by the accounting process 14.

The NAR Source Identifier NAR_SRC_ID 203a includes a source type 207a and a Source Serial Number 207b. The serial number 207b is an administratively allocated value e.g., 24-bits that uniquely identifies the NAR source type throughout the accounting process 14. The source serial number 207b should be unique within the specific accounting domain.

The (NAR_SEQ_NUM) 203c is a monotonically increasing, e.g., unsigned 32-bit integer that acts as a sequence number for NARs that originate from a particular NAR source. Because the value of the NAR_SEQ_NUM can "wrap around", the combined 64-bit value NAR_SRC_ID and NAR_SEQ_NUM are unique only over a specified time period.

Referring now to FIGS. 9A–9B, exemplary formats for Network Accounting Record Attributes 204 are shown. There are two variations on a single NAR_ATTRIBUTE format that can be used. As shown in FIG. 9A, a standard NAR_ATTRIBUTE format 206a includes header fields NAR_ATTR type, NAR_ATTR Code, NAR_ATTR Qualifier, and NAR_ATTR Length and a "value field." In order to conserve the size of accounting information, when the size of the value of the NAR_ATTRIBUTE is a byte i.e., 8-bits, as indicated in the NAR-ATTR Qualifier field, the format 206b of the NAR_ATTRIBUTE can be as shown in FIG. 9B, including fields NAR_ATTR type, NAR_ATTR Code and an 8-bit NAR_value field.

Each supported object is assigned an NAR_ATTR Code. Through the NAR_ATTR Code, the accounting process 14 can distinguish the semantics of a particular NAR_ATTRIBUTE. Although NAR_ATTR Codes are specific to the NAR_ATTR Type, the NAR_ATTR Code assignments can be unique to aid in implementation. Values can be assigned to provide some explicit hierarchical structure. Each NAR_ATTR has an 8-bit NAR_ATTR Qualifier that provides typing information for the NAR_ATTR. The NAR_ATTR Qualifier is used because some supported objects can be represented using several different types. Counters, for instance can be 32-bit as well as 64-bit, in the case of aggregated objects. Network identifiers may use numeric indexes, or strings as labels. The NAR_ATTR field specifies the length of the NAR attribute including the NAR_ATTR header.

Figure 13A:
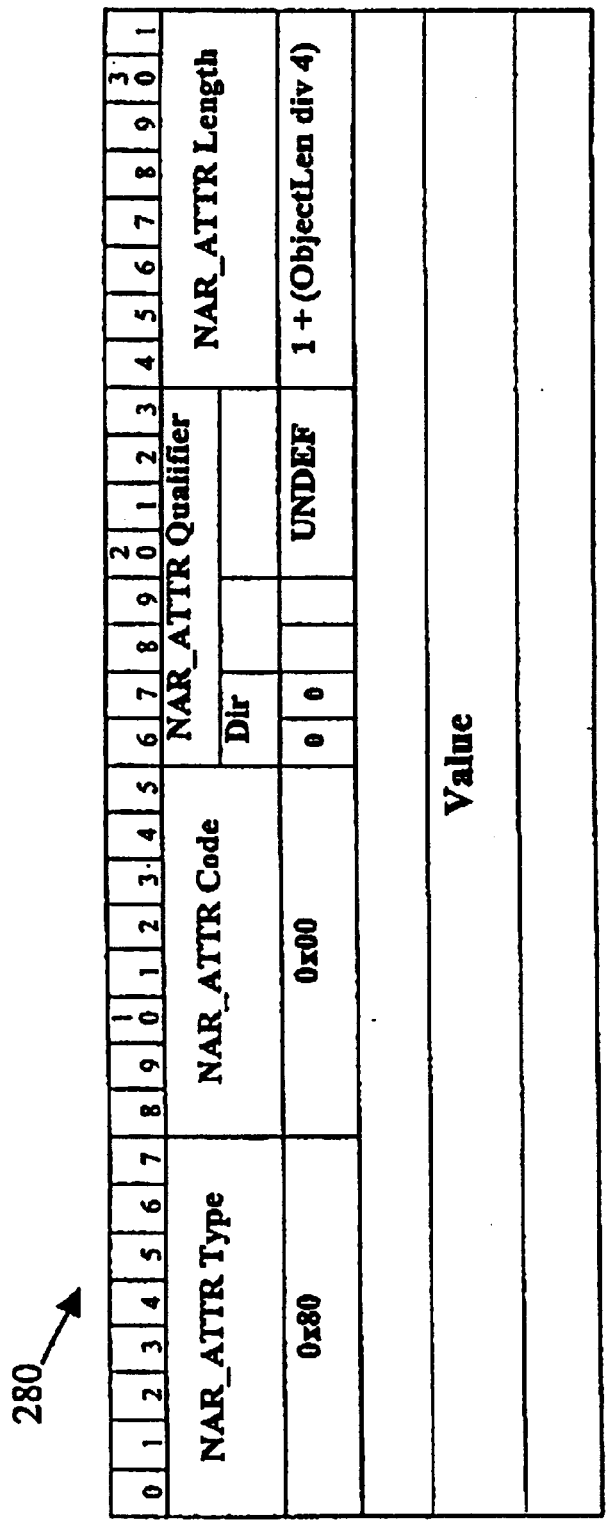
Figure 13B:
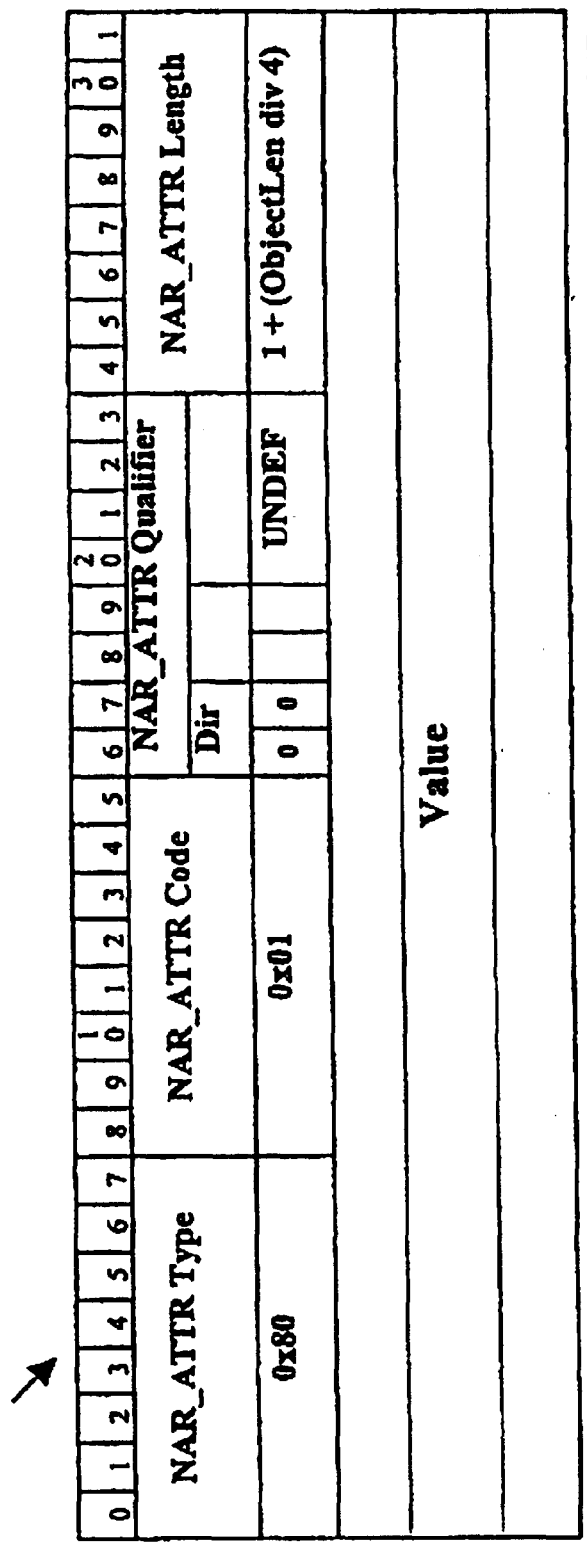

There are five types of Network Accounting Record Attributes that are supported in the NAR. The five attributes are Accounting Time Interval (ACCT_TIME) (FIG. 10); Accounting Entity Identifier (ACCT_ENTITY_ID), (FIGS. 11A–11E); Accountable Entity Descriptor (ACCT_ENTITY_Desc); Network Activity Metrics (NET_METRICS)(FIG. 12); and two Transparent Attributes (TRANS_ATTR)(FIGS. 13A–13B). As necessary, additional NAR_ATTRIBUTES can be supported. For example, a NAR_ATTRIBUTE type could also include Security Attributes for accounting data to protect against unauthorized introduction or modification of accounting information.

Referring now to FIG. 10, an Accounting Time Interval record includes a value "seconds" and a value "micro second". The values of "seconds" and "micro seconds" together represent a time stamp of network activity for the NAR, as discussed above. When derived from an absolute time value that represents the end of the accounting time interval, the Accounting Time Interval is the duration, as calculated using the Accounting Time Interval as the starting time value. All Network Accounting Records can have an Accounting Time Interval attribute.

Referring now to FIGS. 11A–11E, Accountable Entity Identifier data structures are shown. The Accountable Entity Identifiers are a collection of entity description attributes that together identify an accountable entity in the accounting process 14. The accounting entity identification mechanism facilitates flexible NAR aggregation properties of the accounting process 14. The ACCT_ENTITY_ID is the description of an accounting object within the accounting process 14. There can be one or more ACCT_ENTITY_IDs in a given NAR, but there must be at least one ACCT_ENTITY_ID in an Network Accounting Record. The actual accountable object is defined by the entire collection of ACCT_ENTITY_IDs that are included in the NAR.

In transaction based accounting, a network accounting record will contain two ACCT_ENTITY_IDs, representing the source and the destination entities that are involved in the network transaction. For traditional flow based accounting, these would normally be the two network addresses that are involved in the flow. Qualifiers are available in the ACCT_ENTITY_ID objects to indicate which ID is the source and which is the destination of the network transaction.

In direct support of flow based accounting data sources, the accounting process 14 supports a specific IP flow descriptor. This is the traditional IP 5-tuple flow description. The accounting process 14 could also support a 6-tuple flow descriptor that includes a type of service (TOS) indicator in the flow designator. This allows for Class of Service distinction in the accounting model.

For network activity data sources that do not have a transaction accounting model, there may only be a single ACCT_ENTITY_ID present in the accounting record. Qualifiers for the ACCT_ENTITY_ID are available to indicate if the single object is the source, destination, or both, for the accounting metrics that will be included. The types of entities include User Identifiers and Network Entity Identifiers. The network identifiers can include IP Address, Flow Description, and Network Object ID. Other types of accounting entities can be provided.

The actual accountable entities for a specific network accounting record are specified in the complete set of ACCT_ENTITY_ID(s) that are present in the NAR. Operations that can be applied to NARs, specifically aggregation, can influence how ACCT_ENTITY_IDs are used in NARs. Each accountable entity identifier that is present adds refinement to the definition of what accountable entity the metrics actually apply to, whereas each ACCT_ENTITY_DESC further refines the description of the accountable entity.

Figure 11A:

Referring now to FIG. 11A, a NAR_USERNAME is a specific type of NAR_USERID data structure. A system string type "Username" 222 can represents a real accountable user within the accounting process 14. The NAR_USERNAME data structure 220 is used to transmit the string. The semantics can be applied when the string "Username" 222 is supplied by RADIUS or from DCHP management systems. The NAR_USERNAME data structure 220 includes a NAR_USERNAME NAR_ATTR Qualifier that provides for Role designation, indicating whether the object referenced is acting as a source, destination, both or undeterminable within the system. The NAR_ATTR Qualifier bits are set when the Role can be determined without ambiguity.

Figure 11B:

Referring now to FIG. 11B, a NAR_USER_ID data structure 230 is the general type for identifying an accountable user. The accounting process 14 can use any available object type to represent the NAR_USER_ID value 232. The NAR_USER_ID value 232 will be a system established STRING type or a user index as generally supplied by a database system. The semantics of the NAR_USER_ID value 232 are consistent within the accounting process 14, and can be consistent outside of the accounting process 14.

Figure 11C:
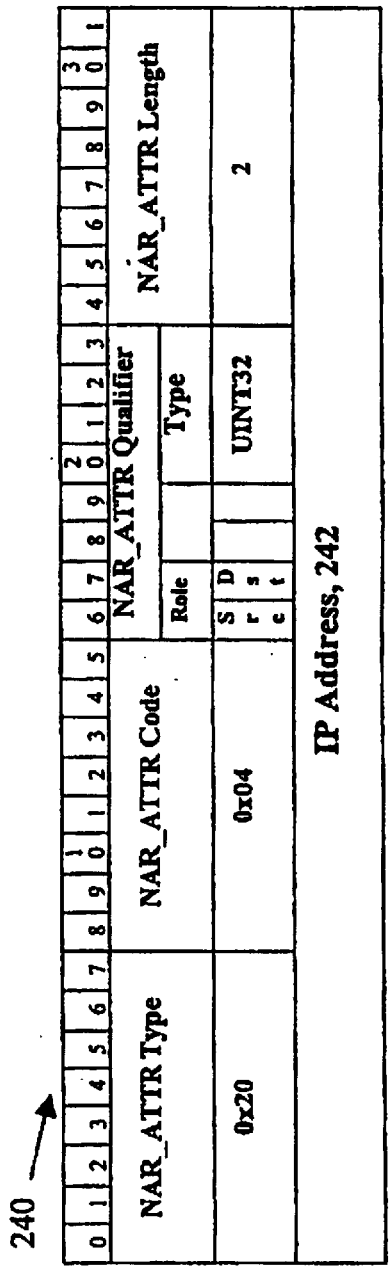

Referring now to FIG. 11C, a NAR_IP_ADDRESS data structure 240 is shown and which is the general network component identifier for an IP enterprise network. NAR_IP_ADDRESS data structure 240 includes a IP Address 242 that is usually unique within the accountable domain, and thus can be usable as an accounting process 14 identifier. Within the accounting process 14, the occurrence of this record implies that the address is unique within the accounting realm. NAR_IP_ADDRESS type includes a NAR_IP_ADDRESS NAR_ATTR Qualifier. The NAR_IP_ADDRESS NARATTR™ Qualifier provides for Role designation, indicating whether the object referenced is acting as a source, destination, both or undeterminable within the system. These bits are set when the Role can be determined without ambiguity.

Figure 11D:
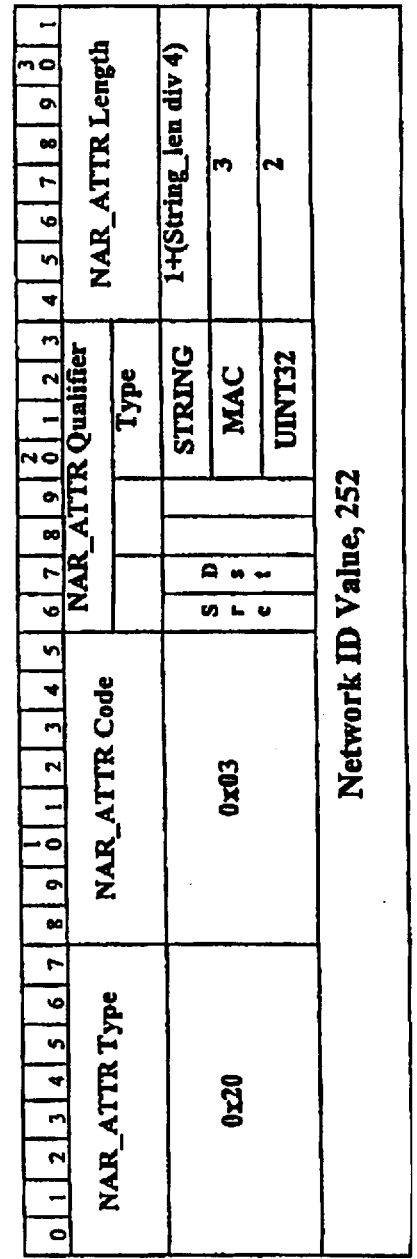

Referring now to FIG. 11D, a NAR_NETWORK ID type data structure 250 is shown. The NAR_NETWORK_ID data structure 250 includes a NETWORK ID value 252 is a general type used for identifying a network component when a network address is inappropriate. The accounting process 14 can use any available object type to represent the NAR_NETWORK_ID, but it is assumed that this value will be an accounting process 14 established STRING type, (e.g., a Media Access Control (MAC) address that is predefined in Network interface cards), object type or a number index that cannot be associated with a network address. The semantics of the NAR_NETWORK_ID is consistent within the accounting process 14, and can be consistent outside the accounting process 14. A NAR_NETWORK_ID NAR_ATTR Qualifier provides for Role designation, indicating whether the object referenced is acting as a source, destination, both or undeterminable within the system. These bits are set when the Role can be determined without ambiguity.

Figure 11E:
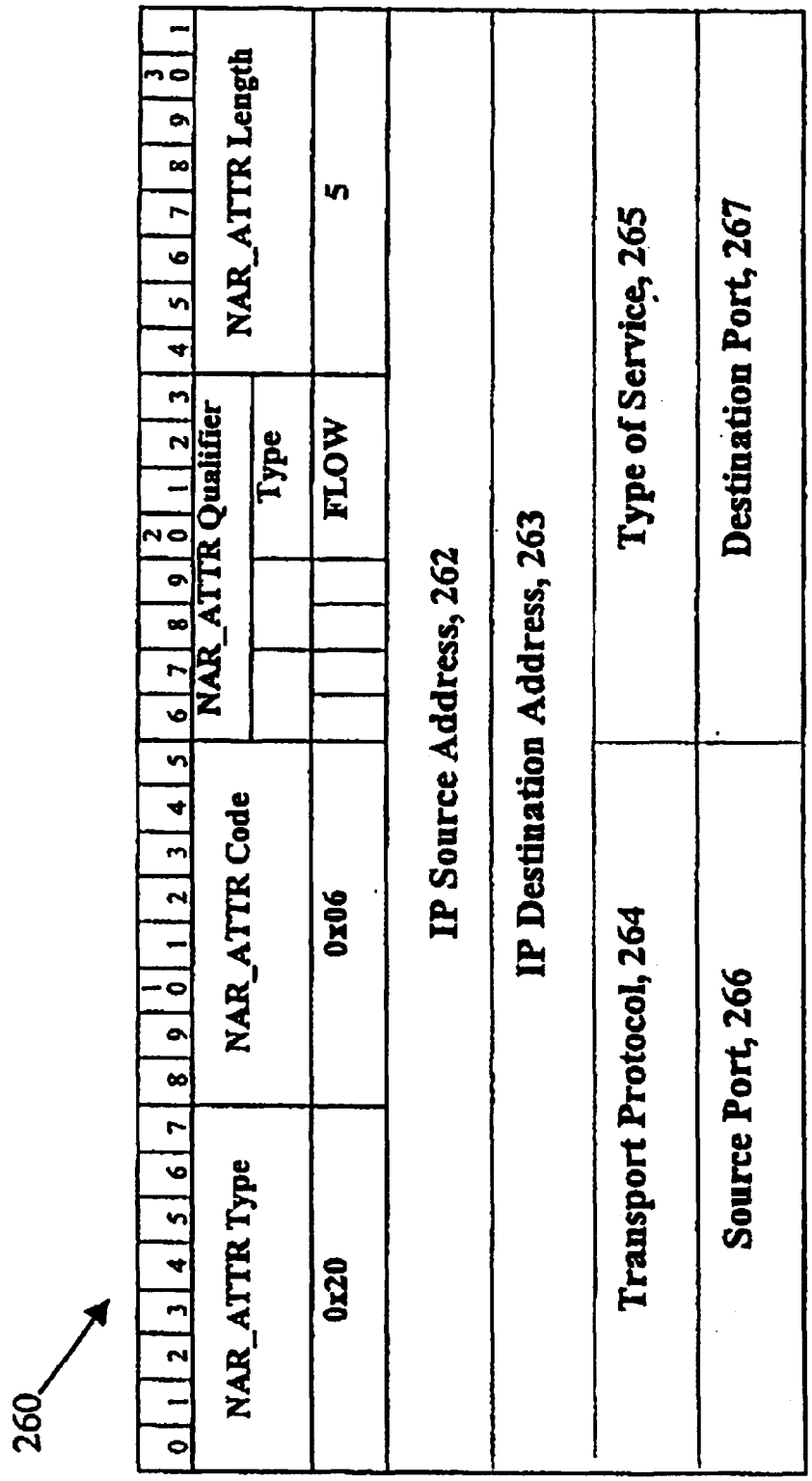

Referring now to FIG. 11E, a NAR_FLOW_DESC data structure 260 is the general type for reporting on flow based network activity. The NAR_FLOW_DESC is a composite data structure 260 including a IP Source Address 262, IP Destination Address 263, Transport Protocol 264, Type of Service 265, Source Port 266 and Destination Port 267 that are populated from transport and network layer of IP packets via flow probe. The NAR_FLOW_DESC NAR_ATTR Qualifier provides for Role designation, indicating whether the object referenced is acting as a source, destination, both or undeterminable within the system. These bits are set when the Role can be determined without ambiguity.

Therefore the Network Accounting Activity Records are fundamentally bindings between an accountable entity and a set of metrics that can be associated with that entity over a specified period of time. The NARs provide flexibility in defining, or specifying, the accountable entity. This level of flexibility is required because in network accounting, an accountable entity could potentially refer to objects that are either physical or logical, singular or members of collections, or geographically or topologically constrained, such as network numbers or autonomous system numbers.

Figure 14:
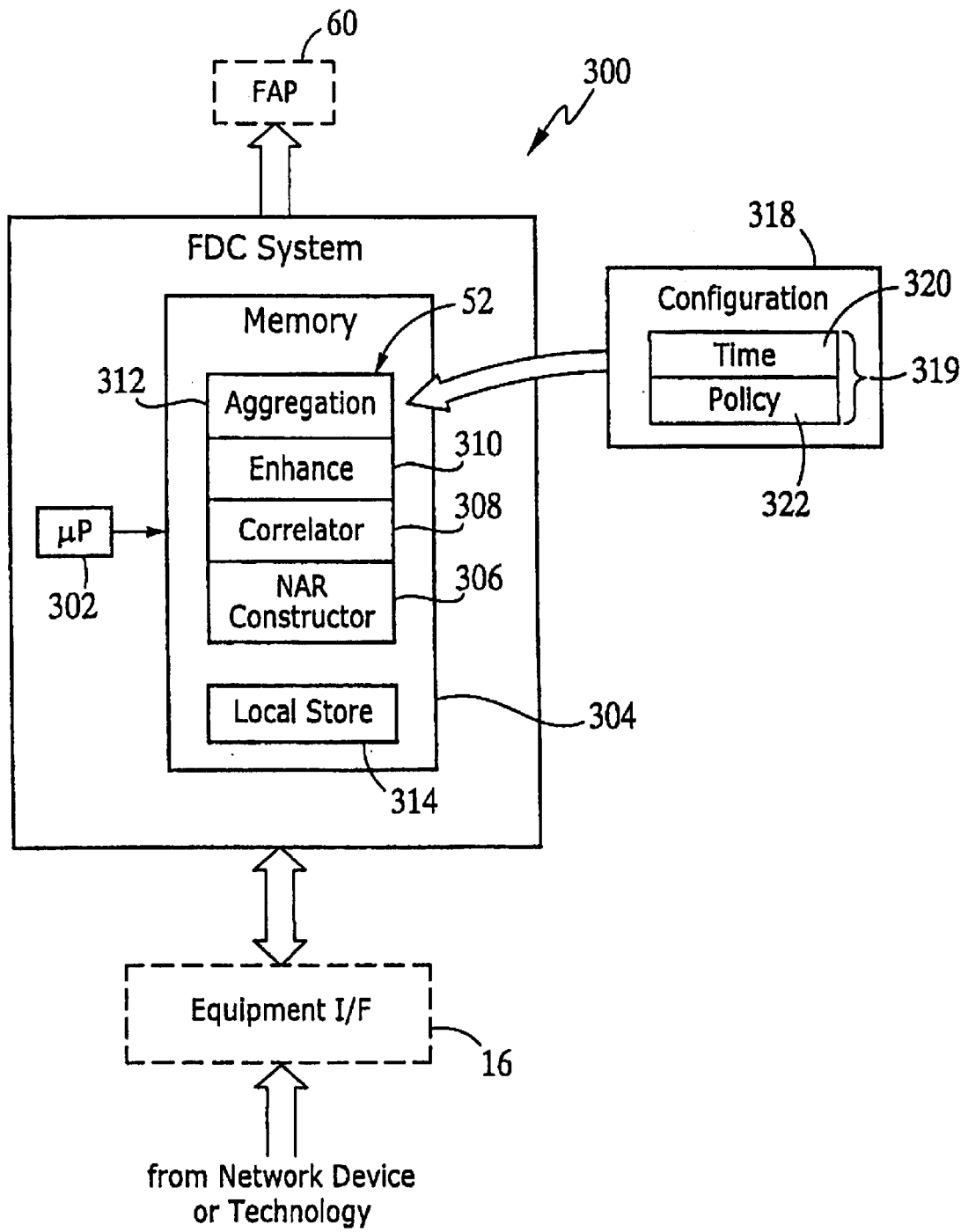
FIG. 14 is a block diagram of a flow data collector system.

A set of accountable entities includes Username and Network Object Identifiers. There can be additional descriptive information available within network activity reports and within networking components that could be used to further describe accountable entities. These entity attribute descriptors can be used in the accounting process 14 to provide additional flexibility in how network activity information is reported and tallied. Support for entity descriptions can include object support for:

Flow Descriptors
    Flow Protocol Descriptors
    Flow Transport Port Descriptors.
Authentication Descriptors
    NAS Descriptors
Aggregate Descriptors
    Class Identifiers
    Session Identifiers
    Multi-Session Identifiers
    VLAN Identifiers
    ELAN Identifiers
    Group Identifiers
Access Identifiers
    Source and Destination Ethernet Addresses
    Ingress and Egress Tunnel Ids
    Ingress and Egress Port Numbers
        ATM Virtual Circuit VPI/VCI
        Calling and Called Station Ids
Flow Status Descriptors
Class of Service Identifiers
Quality of Service Identifiers
Traffic Path Identifiers
Accounting Time Interval
Accountable Network Activity Metrics
    Source and Destination Datagrams
    Source and Destination Octets
Extended Network Activity Attributes
    Network Flow Control Indications
    Host Flow Control Indications
    Traffic Burst Descriptors Referring now to FIG. 12, a NET_METRIC data structure 270 is shown. A NET_METRIC data structure 270 to support a count is shown in FIG. 14. The NET_METRIC data structure 270 is used to hold basic accounting values that can be tallied within the accounting process 14. The NET_METRIC data structure 270 can support time, octets, datagram, counts and cells, circuits, tunnels and so forth.

Referring now to FIGS. 13A and 13B, two basic transparent objects TRANS_ATTR objects are shown; UNDEFINED 280 and RADIUS 290. New TRANS_ATTR object types can be defined as needed. These are objects that a user may want to send through the accounting process 14, that are customer specific, or proprietary in nature. The accounting process 14 allows for object transparency, i.e., an object that the system does not act on or modify. Thus, the contents of transparent attributes are undefined with respect to the accounting system. They are passed through, unmodified.

Flow Data Collector

Referring to FIG. 14, a flow data collector system 300 for supporting the flow data collector ("FDC") 52 (from FIG. 2) is shown. The flow data collector system 300 includes a processor 302 coupled to a memory 304. In this embodiment, the FDC is a process stored in the memory 304 and executed by the processor 302. The FDC 52 includes several NAR processing components or processes. These processes include a NAR constructor 306 for converting data gathered by the equipment interface (EI) 16 (shown in dashed lines) from a network device or technology ("network entity") into NAR format. Recall that each equipment interface 42a–42g is associated with an flow data collector. Thus, the combination of a equipment interface and a flow data collector support a particular device or technology and collects data from the particular device or technology using a pre-defined format, schedule and protocol specific to that device/technology. The NAR processes further include a correlator 308, an enhancement process 310 and an aggregator 312 for processing the constructed NARs as appropriate. The details of these processes will be discussed further with reference to FIG. 15 below.

Still referring to FIG. 14, the memory includes a local store 314 and a flow data collector configuration (file) 318.

The local store 314 stores data received from the equipment interface 16 and processed NARs. The configuration file 318 is provided at startup to configure the flow data collector 52. The configuration file 318 specifies various configuration parameters 319, including a time parameter 320 and a policy 322. The NAR processes 304 populate and process NARs for data received from network devices via the equipment interface 16 in accordance with the policy 322 of the configuration file. NARs being held in the local store 314 are transferred to the flow aggregation process 60 (FIG. 2, shown here in dashed lines) when the time specified by the time parameter 320 expires.

It can be appreciated from the above description that the flow data collector 52 is a software component of the accounting process and runs on the flow data collector system 300. The flow data collector system may be any computer system, such as a workstation or host computer, which can communicate with the equipment interface. Alternatively, the FDC may reside in the network device itself. Many known details of the flow data collector system 300 have been omitted from FIG. 17 for the sake of clarity, as the figure is intended to highlight the processes of and memory structures associated with the flow data collector.

Conceptually, as earlier described, each flow data collector of the accounting process architecture is capable of supporting multiple equipment interfaces 16. At the implementation level, there is a one-to-one correspondence between each flow data collector "process" and a given equipment interface 16. For example, a single computer system might provide both RADIUS and flow probe support and thus run separate flow data collector processes for the RADIUS EI and the flow probe equipment interface. In such a configuration, where the flow data collector processes are operating independently and loading directly into the flow aggregation processor 60 (FIG. 2), the computer system itself may be viewed as an flow data collector supporting multiple EIs.

Figure 15:
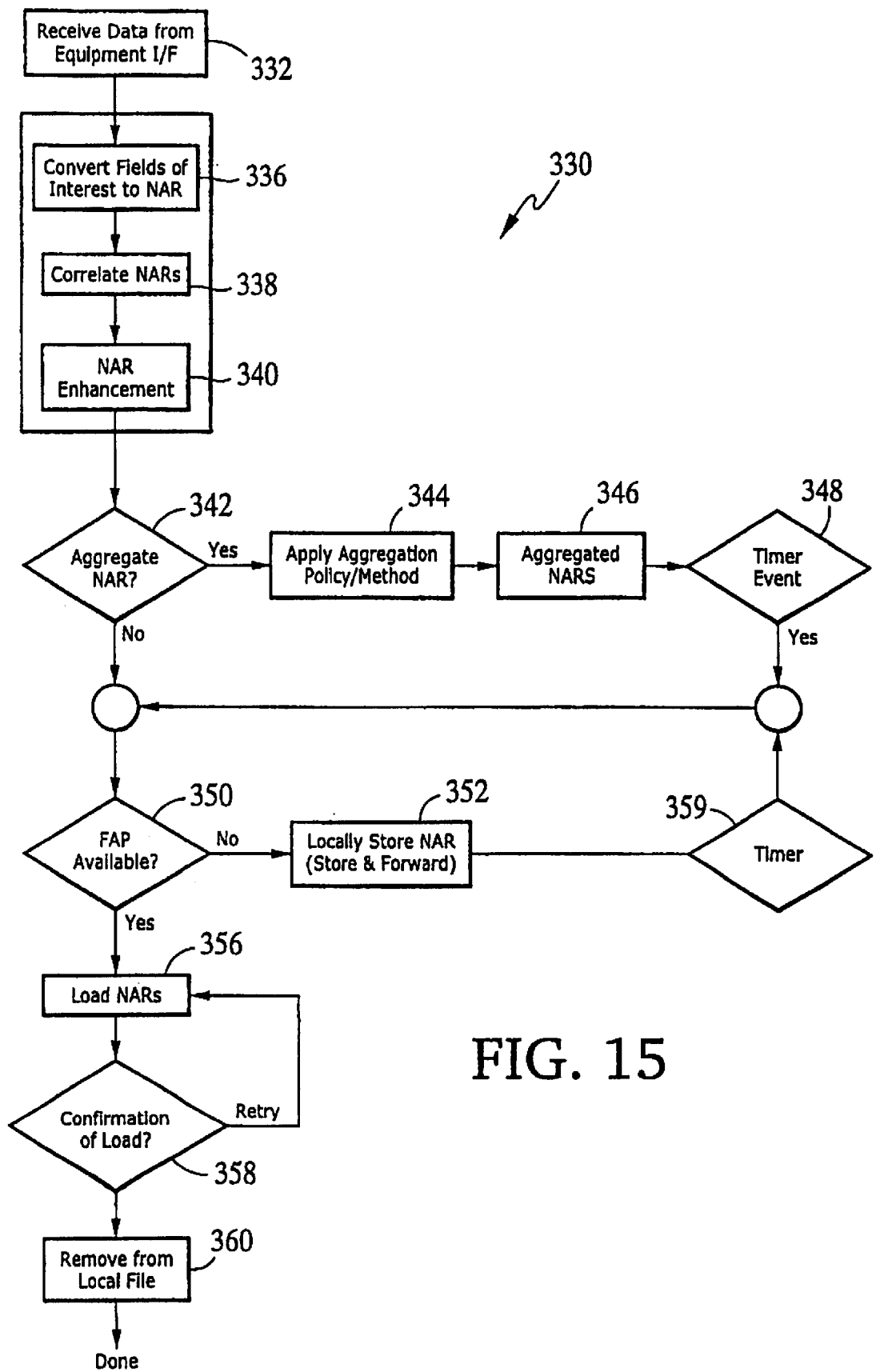
FIG. 15 is a flow diagram of the flow data collection process of the flow data collector of FIG. 14.
Figure 17:
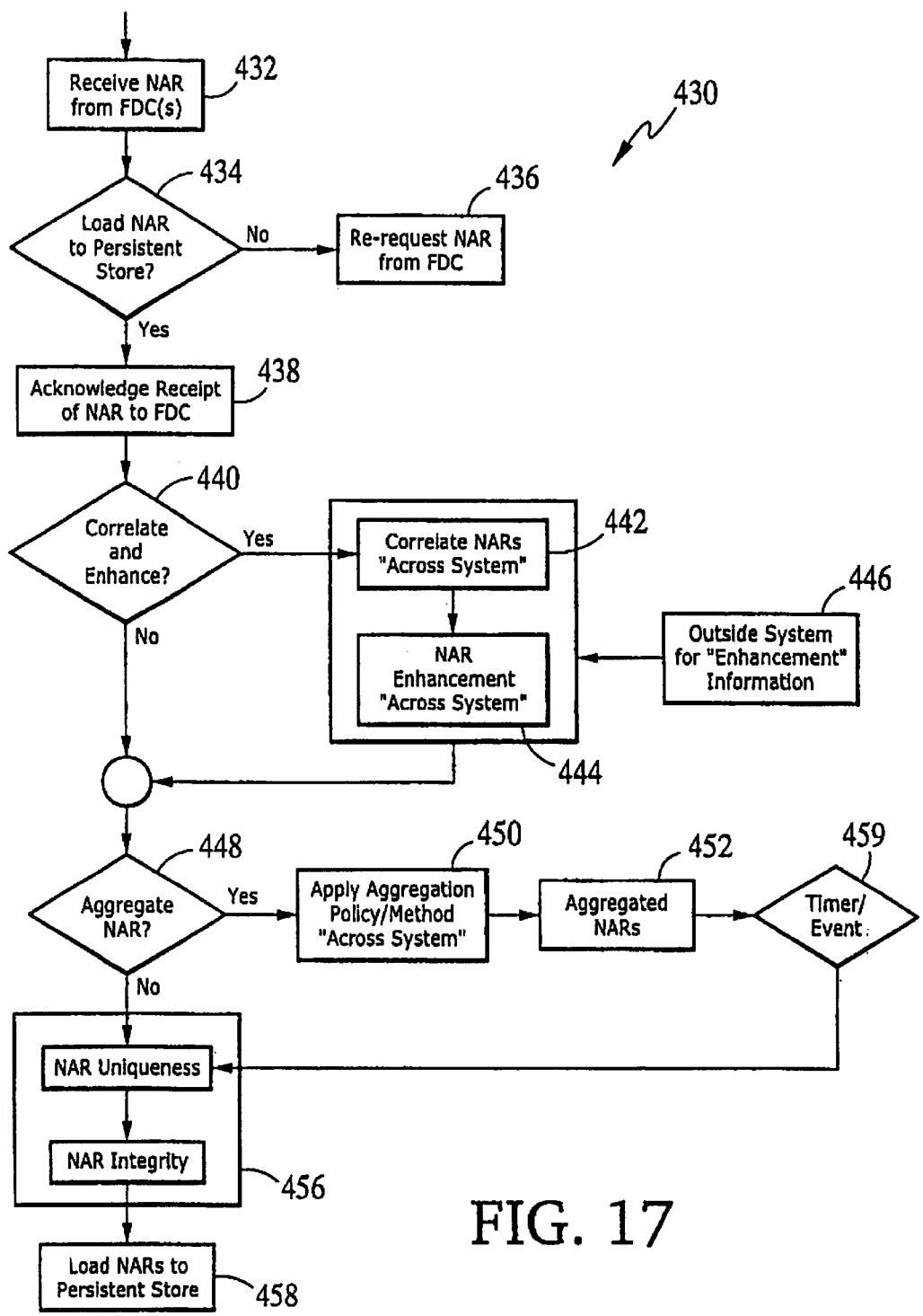
FIG. 17 is a flow diagram of the flow aggregation process performed by the FAP of FIG. 16.

Referring now to FIG. 15, a data collection process 330 performed by the flow data collector 52 of FIG. 17 is shown. The flow data collector receives 332 data from the equipment interface for a network device. The flow data collector performs an equipment interface specific translation to convert 336 the received data into NAR format as well as populates the NAR header. Once the NAR is populated with the appropriate data, the flow data collector 52 attempts to correlate 338 the newly populated NAR with the other NARs. That is, the flow data collector 52 compares the newly populated NAR to NARs currently stored in the local store 314 (from FIG. 14) to determine if there are multiple instances of the same object. Specifically, correlation is performed by examining the ACCT_ENTITY_ID (from FIGS. 11A–11E).

The flow data collector uses one clock and one time determinator, so all NARs that the flow data collector is processing or holding are assumed to be in the same time domain. Consequently, the flow data collector need not consider time during correlation. If the flow data collector 52 determines that a NAR ACCT_ENTITY_ID (i.e., the collection of descriptors or objects as described above) in the NAR matches that of another NAR that it is currently holding, the FDC 52 can replace an older (stored) NAR with the new (i.e., most recently populated) NAR and discard the older NAR. For example, the existing or older NAR may be a start record and the new NAR a stop record that includes all the data included in the older NAR, thus superseding the older NAR. Alternatively, if the new NAR is a replica of an existing NAR, the FDC may decide to discard the new NAR. Also, the data collector can determine that the two NARs should be merged or aggregated. Thus, the correlation process may discard the new NAR, replace an older NAR with the new NAR or mark the two matched NARs as candidates for aggregation, a process which is described in detail below.

As part of the correlation process, the flow data collector may enhance 340 the new NAR. That is, the FDC may determine that the NAR cannot be correlated without some amount of enhancement. The FDC 52 enhances the NAR by supplementing the information provided by the original source equipment with information that is not available from that source equipment. The supplemental information is added to the ACCT_ENTITY_ID. Recall that the accounting entity identifier ACCT_ENTITY_ID is a collection of descriptors, so the enhancement process 310 adds to that collection of descriptors. For example, the accounting entity ID ACCT_ENTITY_ID in one NAR might include a source address and a destination address, along with a value indicating how long the flow (for the accounting entity) has been in existence. A subsequently processed NAR record having those same three objects can be correlated. However, if a subsequently processed NAR only has two of the three objects, the flow data collector can enhance the accounting entity ID ACCT_ENTITY_ID for the third (missing) object to permit correlation. Enhancement may involve collecting information from a completely different network device (via a NAR generated by another accounting process component, such as another data collector), or it may be as simple as adding a timestamp to a NAR's accounting entity ID.

As indicated above, the correlation process may determine 342 that two NARs should be "aggregated". Aggregation merges the accounting entity identifiers of the two NARs together. It also merges metrics for NARs that contain metrics, as later described. Aggregation of the accounting entity identifiers is accomplished through an explicit and implicit matching of those accounting entity identifiers. Correlation relies on the explicitly matched fields, that is, the fields or objects actually used to determine that two NARs should be aggregated. The other descriptors or objects in the accounting entity ID that were not used by the correlation process to make a match may be equal or different. Aggregation of the accountable entity ID portion of the NAR keeps the explicitly matched objects, and determines which of the implicitly matched objects (the matching objects that were not a part of the explicit match) to save or discard. Of course, the nonmatching objects are automatically discarded, as all of the metrics that are the result of this aggregation have to apply to the objects in the aggregated accountable entity ID ACCT_ENTITY_ID. The removal of accounting entity ID descriptors actually serves to lower the semantic complexity of the NAR, whereas enhancement does just the opposite.

When the data collection process 330 involves a decision concerning aggregation, the flow data collector 52 applies 344 the aggregation policy 322 (from FIG. 14) and uses a method defined therein. The method outlines the decision-making process to be followed by the FDC in the case of implicitly matched objects. The aggregation policy will be discussed in further detail with reference to FIG. 18. Once the flow data collector aggregates the accounting entity ID ACCT_ENTITY_ID portion of the NAR attributes, it can aggregate the NAR metrics. To aggregate the metrics, the flow data collector performs a summation process on numerical metric values and/or a logical operation (e.g., ANDing, ORing, or XORing) on logical metric values. Aggregation of the metrics is specific to each metric field in the NAR.

Once the NAR aggregation is complete 346, the FDC changes the NAR header (i.e., the NAR_SRC_ID and NAR_SRC_TIME in the NAR_ID) of the newly aggregated NAR to identify the component (in this case, the FDC) that performed the aggregation as the originator of this particular NAR. The FDC stores aggregated NARs for a period of time determined by the configuration profile's event-based counter or timer 320 (from FIG. 14). When the timer expires 348, the FDC is ready to transfer NARs processed by the correlator/(enhancement) and possibly the aggregator as well to the FAP.

Figure 16:
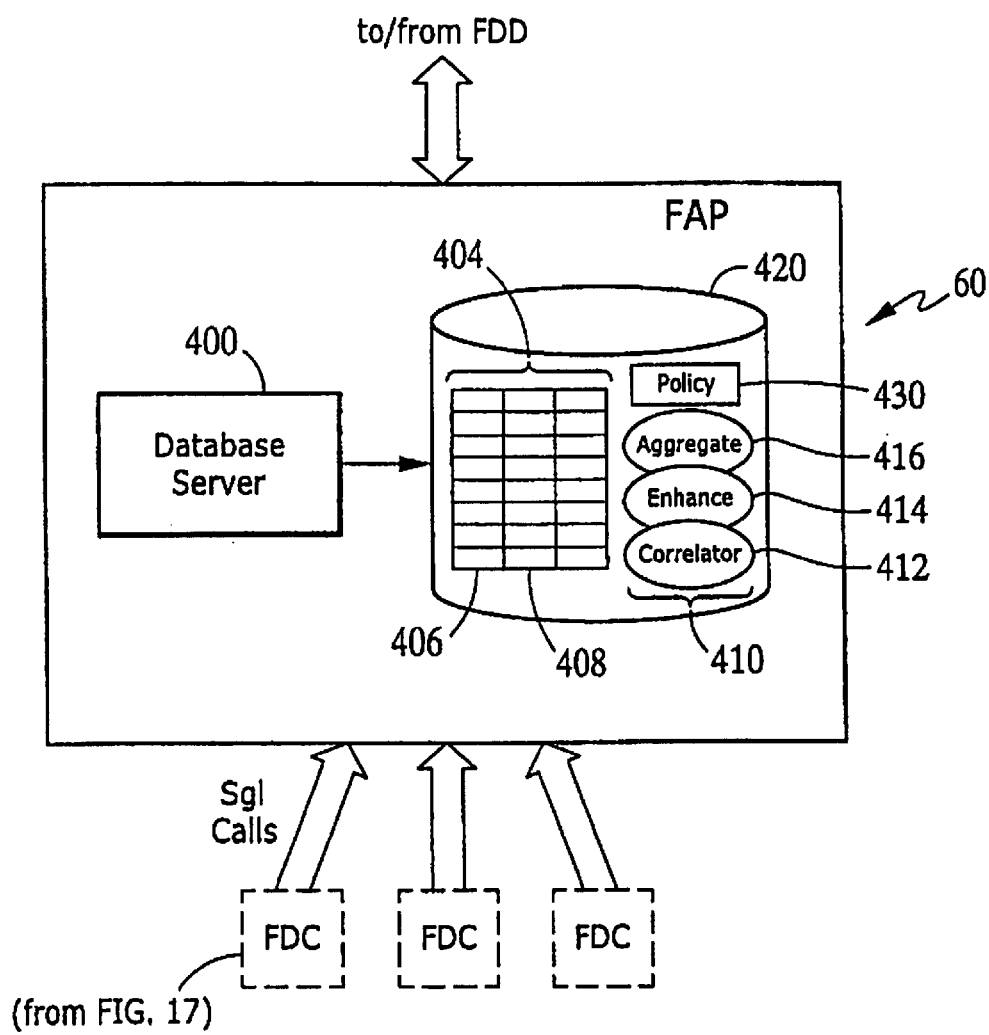
FIG. 16 is a block diagram of the flow aggregation processor (FAP).

Prior to commencing transfer, the flow data collector 52 determines 350 if the flow aggregation processor 60 is available to receive NARs. If the flow aggregation processor 60 is unavailable, the flow data collector stores 352 the NARs to be transferred in its local store 314 (FIG. 16). The flow data collector 52 continues to check 354 the availability of the flow aggregation processor at periodic intervals until the connection between the flow aggregation processor 60 and the flow data collector is re-established. When the periodic status check indicates 350 that the flow aggregation processor is available, the flow data collector loads 356 NARs into the flow aggregation processor 60. The loading function can be implemented according to one of many strategies, e.g., a database, file, or data streaming strategy. Other strategies could be used. When the flow data collector receives 358 a confirmation or acknowledgment back from the flow aggregation processor that the NARs were loaded, the transfer is deemed successful and the locally stored copies of the transferred NARs are removed 360 from the local store. Thus, the "store and forward" capabilities of the flow data collector provide a measure of fault tolerance at this accounting process level to ensure reliable data transfer. The flow data collector only transfers NARs when it has determined that the flow aggregation processor is available and it considers the NAR transfer successful only upon receipt of an acknowledgment from the flow aggregation processor.

The flow aggregation processor (FAP) 60 (FIG, 2) aggregates and/or enhances record data across the system 10. It receives data from multiple flow data collectors (FDCs) that may be aggregating and enhancing close to the source of the information (as described above with reference to FIG. 17). As NARs are received from multiple FDCs, the data can be further enhanced and/or reduced (i.e. aggregated) to meet the specific needs of an application or output interface based on the aggregation policy of the flow aggregation processor 60 (FAP). The design and operation of die FAP will be described in more detail below.

Flow Aggregation Processor

Referring now to FIG. 16, one implementation of the FAP 60 is as a database management system, or more specifically, a Structured Query Language (SQL) database management system, like those commercially available from Oracle or Sybase. Although not shown, it will be appreciated that the FAP is installed on a computer system, such as a host computer. Implemented as a database management system, the FAP includes a database server 400 coupled to a database 402. The FDCs 52 (from FIG. 14) can use the "push" model to move NARs up to the FAP via SQL calls. The database 402 stores a plurality of tables 404, including a NAR table 406 (implemented as a persistent cache) and an aggregation store 408. Also stored in the database are a plurality of SQL commands and procedures (functions) 410 to be executed by the server 400. The functions include a FAP correlator 412, a FAP enhancer (enhancement process) 414 and a FAP aggregator 416. The database also stores a configuration file 420 for storing configuration parameters such as time and policy information. The operation of the FAP will be described below with reference to FIG. 17.

Referring to FIG. 17, an overall flow aggregation process 430 performed by the FAP is shown. The FAP receives 432 a NAR from one or more FDCs and loads 434 the received NAR into a persistent store or cache (of database 492 from FIG. 16). If the FAP is unable to load the NAR, it requests 436 that the transferring FDC resend the NAR. If the load is successful, the FAP sends 438 an acknowledgment back to the sending FDC. The FAP determines 440 if the NAR can be correlated (with or without enhancement). If the FAP determines that the NAR can be correlated, the FAP correlates 442 the NAR with other NARs received from other FDCs. Once the NAR is correlated, it may be enhanced 444 "across the system", in a manner more fully described with reference to FIG. 18. The NAR may be enhanced 446 to include enhancement information obtained from an outside source (i.e., collected by a data collector for a different equipment interface). Once any potential correlation and enhancement has been performed, the FAP determines 448 if the NAR is a candidate for aggregation. If so, the FAP applies 450 the aggregation policy 420 (from FIG. 16) and stores 452 the resulting aggregated NAR in the aggregation store until a predetermined time expires or event occurs 454 (as set in the FAP configuration 420). The FAP ensures 456 the uniqueness and integrity of any NAR by examining NAR header information prior to re-loading 458 such NAR into the persistent store.

The accounting architecture may be implemented to include a second "shadow" FAP process, also coupled to the data collectors and operating in the manner described above with respect to receiving and processing NARs. In the dual/shadowing FAP implementation, the accounting architecture further includes an error detection module (not shown) coupled to both of the first (primary) and second (shadow) FAP processes. The error detection module operates to detect an error relating to the first flow aggregation process and cause the aggregate reports from the second flow aggregation process to be transferred to the accounting module (i.e., flow data distributor 70) in place of the aggregate reports from the first flow aggregation process.

Enhancement

Figure 18:
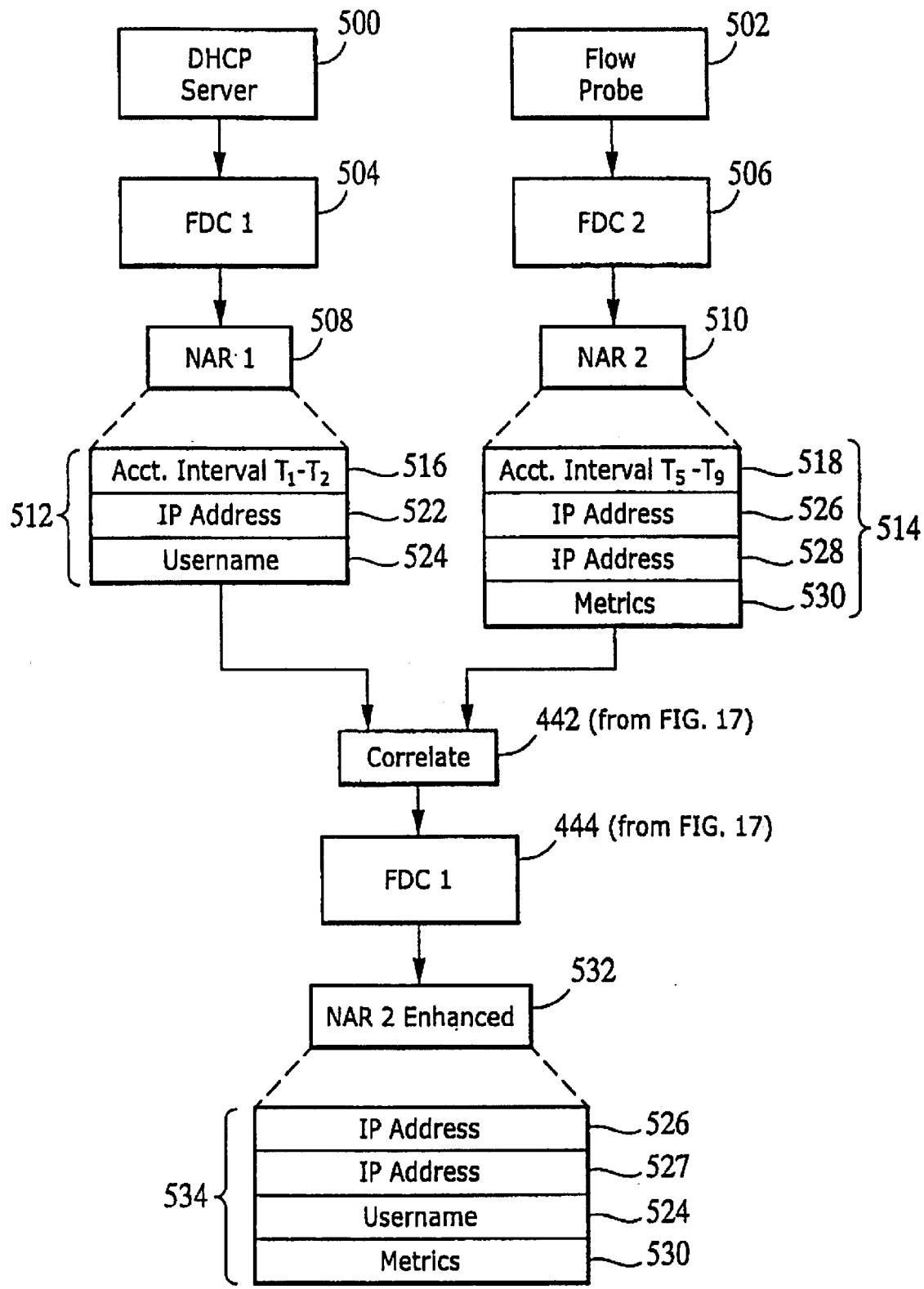
FIGS. 18–20 are examples of the FAP enhancement and aggregation portions of the flow aggregation process shown in FIG. 17.

Now referring to FIG. 18, an example of an application of the FAP enhancement process 444 (from FIG. 20) is shown. In the illustrated example, enhancement deterministically identifies the source of a captured network accounting record, flow or a transaction across a network. Enhancement accesses other sources of information on the network in order to enhance a record and make it chargeable to a specific user.

In the example shown in the figure, two NARs of different sources are inevitably going to be aggregated together to produce a third unique NAR. A first source equipment (or source) 500 is a DHCP (Dynamic Host Configuration Protocol) server. A second source equipment (or source) 502 is a flow probe (discussed below). The sources 500, 502 have corresponding flow data collectors, a first FDC (FDC1), 504 and a second FDC (FDC2) 506, respectively, for converting their data into respective NARs NAR1 508 and NAR2 510. As described earlier, each flow data collector assigns an accounting entity identifier 512, 514, and adds time stamp information 516, 518 on the records of the sources to which they correspond. The NAR1 508 includes in its assigned accounting entity identifier 512 an "IP address-to-user-name" assignment, thus including an IP address 522 and a username 524. The accounting entity identifier 514 for the second source is an IP-to-IP flow and therefore includes a first IP address 526 and a second IP address 528. The NAR2 of the flow probe includes a metric 530 attribute as well.

These two records NAR1, NAR2 are combined through correlation 442 (from FIG. 17) and enhancement 444 (FIG. 17) to generate an enhanced NAR2 532. This enhanced NAR has a modified accountable entity identifier 534 and a metric. The modified accountable entity identifier is the existing accounting entity ID 514, to which the FAP has added the IP-to-username assignment from the accounting entity D 512 of the NAR1 508.

Still referring to FIG. 18, the NAR1 508 has an IP-to-username mapping 512 and an accounting interval 516 comprising a start time and a session time to indicate a time interval bounded by start time "T1" and a start time+session time ("T2"), that is, the accounting interval represents a start time and a stop time. The username 524 in the IP address-to-username mapping is supplied by the DHCP server 500. In the FAP, this NAR1 information will either go directly to a correlation function or to the local store (which could either be a database, file or memory), where it can be directly accessed by the correlator function. The NAR2 510 has an accounting entity ID 514, a T3-to-T4 accounting time interval 518 and a metric 530. The accounting entity identifier 514 has two IP addresses 526, 528, one corresponding to a source IP address and the other corresponding to a destination IP address. The NAR2 510 is passed to the correlator 442, which determines that the T1-to-T2 time interval 516 from the IP-to-username address map in the NAR1 508 overlaps or in some way relates to the T3-to-T4 time interval 518 of the NAR2 510. The correlator 442 determines that T1, T2, T3 and T4 are related, and that the IP address 522 in the IP-to-username address mapping 512 is associated with one of the two IP addresses 526, 528 in the NAR2 510. Thus, the PAP enhances the NAR2 510 by inserting information from the accounting entity ID 512 (of NAR1 508) into the accounting entity ID portion of the NAR2 510. The resulting, enhanced NAR2 532 has an enhanced accounting entity ID 534 that includes the T3-to-T4 timestamp (not shown), the IP-to-IP addresses 526, 528 and the username 524. Thus, the enhanced NAR2 now has a mapping between the username and the one of the IP addresses 526, 528 that is related to the IP address 522. The metric 530 is unchanged.

It should be noted that the correlator is able to determine that the time intervals are related to each other because the flow data collectors are time synchronized (or closely synchronized, assuming some amount of drift). Thus, if the correlator assumes no drift, then T3-to-T4 must be within the time period of T1-to-T2. The IP-to-username address mapping is an event that has to encompass or cover all of the accounting records that apply to that IP address. Any user assigned to this IP address, started at T1 and ended at T2. Only those records that reference that IP address between T1 and T2 will have this username applied to it. When the two flow data collectors are not strictly synchronized, then the amount by which T3-to-T4overlaps T1-to-T2 should correspond to the amount of tolerance, i.e., drift, built into the system. The accounting process assumes a drift amount of at least one second for even a strict time synchronization, so T4 can be greater than T2 by one second.

Figure 19:
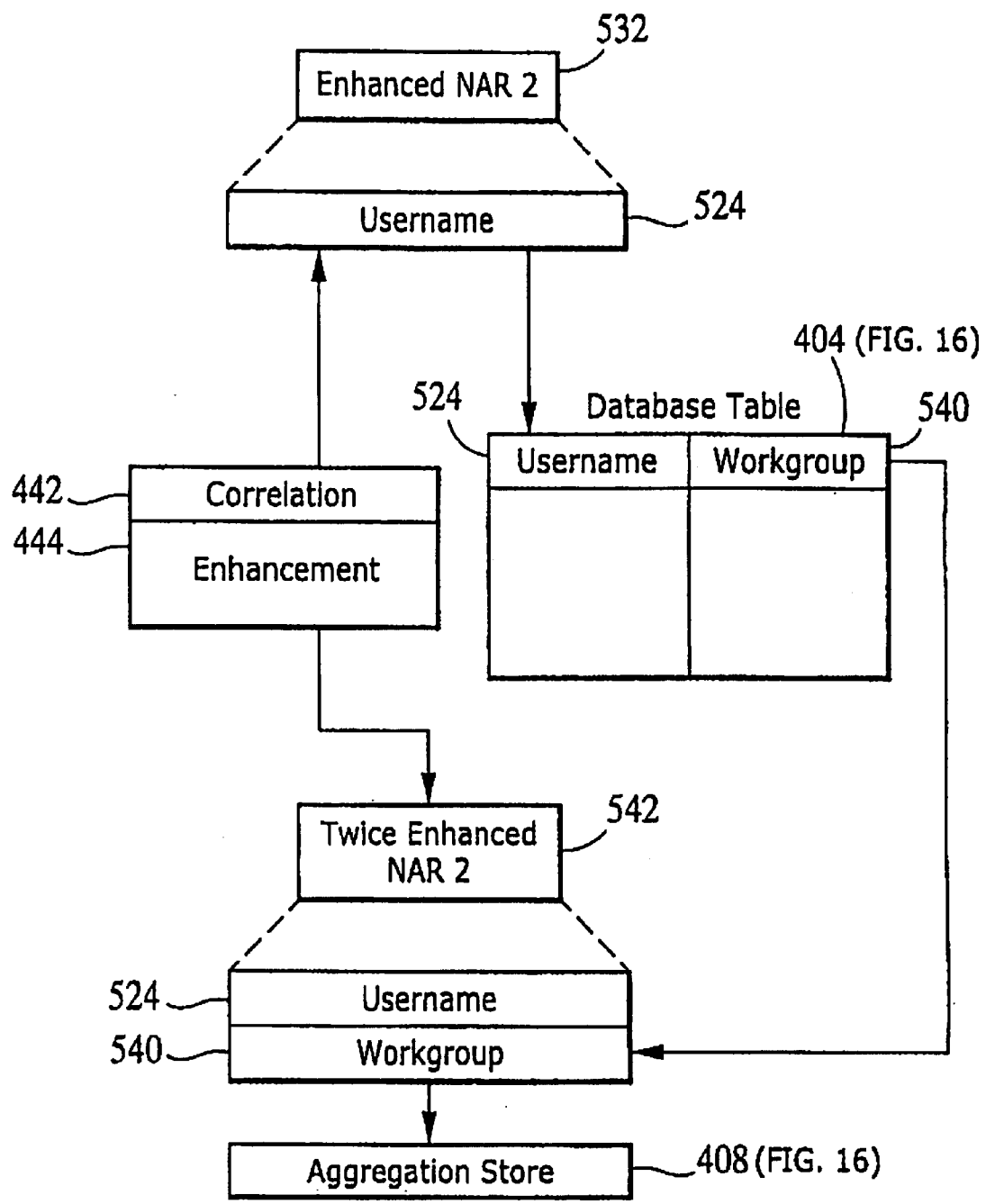

Referring now to FIG. 19, an aggregation of the enhanced NAR2 532 (from FIG. 18) is shown. In this example, the aggregation involves combining NARs with IP-to-username address mappings to workgroups. To accomplish this requires two enhancements, two correlations, and an aggregation phase. As already described above, with reference to FIG. 19, the IP address-to-username information is received by the FAP and is either passed to the correlation or stored in the local store but available to the correlator. When the IP-to-IP address NAR with metrics is received, the correlator and the enhancer work together to add the username mappings to these IP-to-IP address NAR. The username could be provided for one or both of the source and the destination addresses. More than likely, the username is assigned to the source IP address.

Referring again to FIG. 19, another correlation and enhancement process 442, 444 maps the username 524 to a workgroup. The FAP builds up search keys using database principles and relational algebra. Thus, for example, the IP address has a one-to-one mapping with a username. (The one-to-one mapping is assured because of the nature of IP addressing and the way that the DHCP server assigns usernames.) Therefore, there can be only one user for an IP address in a given instance. These terms or values are equivalent keys, so the username can easily be replaced with the IP address. The username 524 that was inserted into the enhanced NAR2 532 can be used as a look-up into a workgroup 540 in one of the database tables 404 (FIG. 16) because the user is actually a member of a workgroup. Therefore, the enhancement function can be used to insert the workgroup label into the enhanced NAR2 (already enhanced for username) to produce a twice-enhanced NAR2 542. If the now twice-enhanced record 542 is to be aggregated, it is held in the aggregation store 408 (FIG. 16) for some time period T until other NARs are received for potential aggregation.

Suppose now that another NAR is loaded into the FAP. This new NAR passes to correlation, which determines that enhancement is need in order to correlate the new NAR with the twice enhanced NAR2 542 of FIG. 19. As a result, the FAP enhances the NAR to include the username 524 and the workgroup 540 to produce a resultant NAR "NAR3" 550, as shown.

Figure 20:
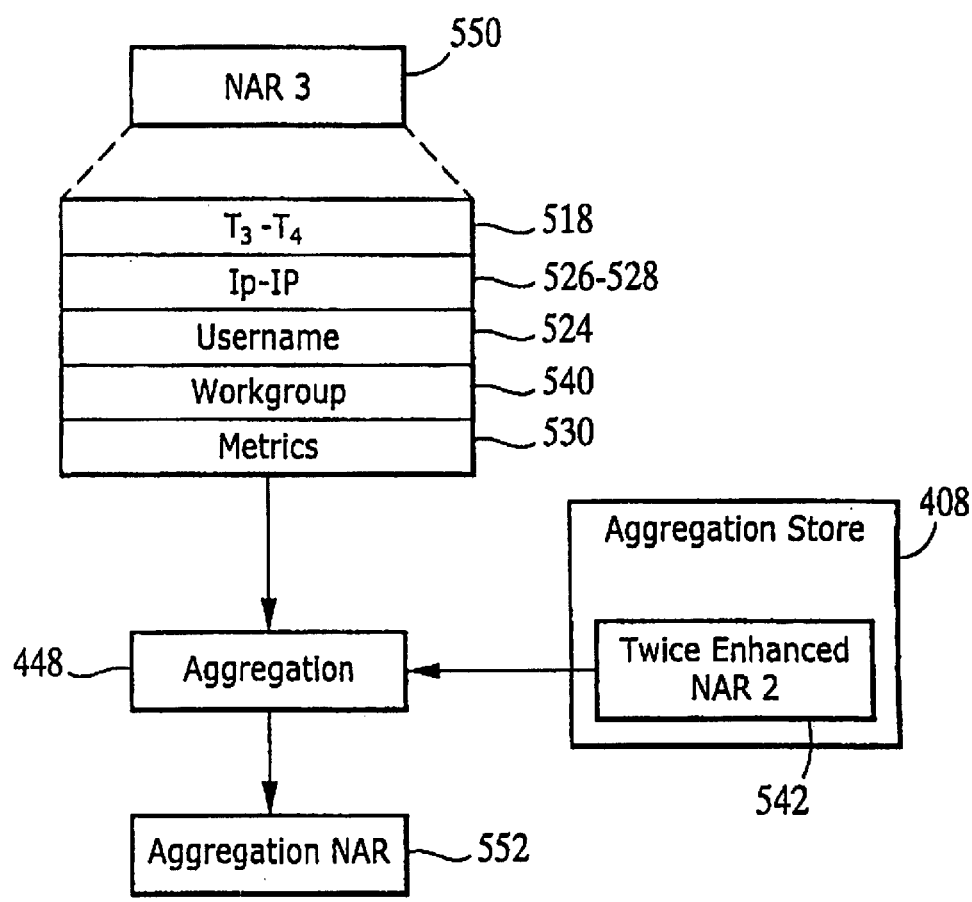

Referring to FIG. 20, in addition to the username and the workgroup, the other NAR3 attributes include the T3–T4 accounting interval, the IP-IP address mapping and the metrics. With the enhancement, the correlation process 444 determines that the resultant NAR3 now matches the twice enhanced NAR2 542 held in the aggregation store 408. Having explicitly matched the two NARs, aggregation 448 is performed. Aggregation preserves the explicitly matched data objects that are in the accounting entity identifier, discards any mismatches in the accounting entity identifier and makes a decision whether to keep the implicitly matched objects (i.e., those that seem to be equal but were not used to make the correlation match). It also then combines the relevant metric values together via summation or logical operations (e.g., ORing, XORing, ANDing). Once the aggregation is complete, the FAP holds the resulting aggregated NAR 552. As the FAP receives additional NARs, the aggregator continues to sum and perform these logical operations on these metrics values for some aggregation period. The duration of that aggregation period may be in the order of 60 seconds to a week, or however long the FAP is configured to aggregate these records. The termination of that period can be a time-based or event-based. Once an event that terminates the time period occurs or an aggregation timer expires, the aggregated NARs held in the aggregation store are released for output by the FAP.

Aggregation Adjustment

It can be understood from the foregoing description that aggregation exists at different levels of the accounting process. As shown and described above with reference to FIGS. 15 and 17, both the flow data collector and the FAP are aggregation-capable. Each aggregates in accordance with an overall aggregation policy that defines how aggregation is used to provide the data to meet the needs of a specific application. The aggregation performed by the different levels can also be remotely and independently adjusted, as will now be described.

Aggregation adjustment involves the ability to adjust the level of aggregation to meet specific application data needs. There are two aspects of aggregation adjustment: remote control and variable degree.

Figure 21:
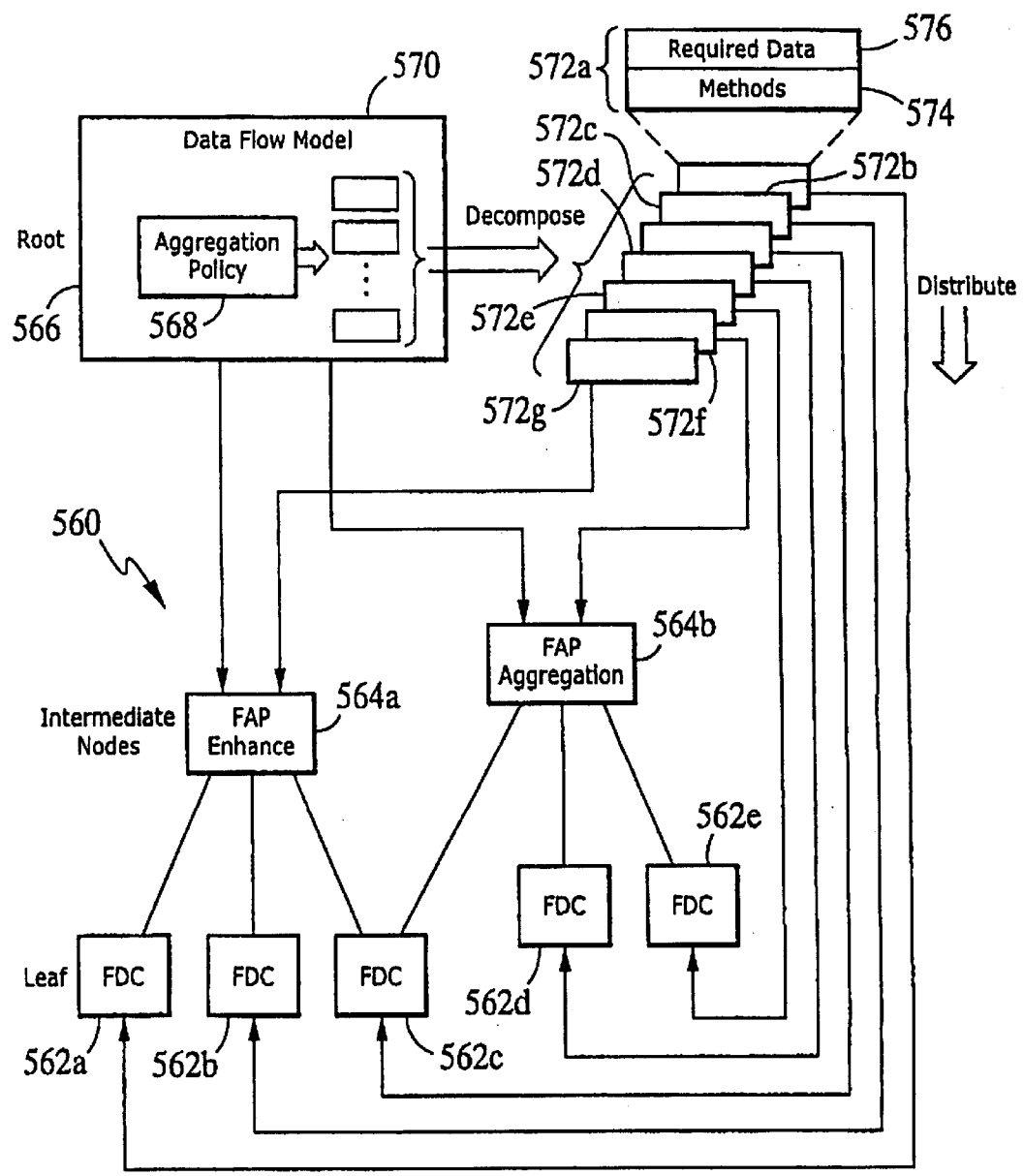
FIG. 21 is a hierarchical representation of an aggregation adjustment scheme for adjusting the aggregation activity at the levels of the flow aggregation processor and the data collectors.

Referring to FIG. 21, a graphical representation of aggregation control and adjustment via a data flow decomposition model is depicted. As shown, the accounting system is depicted as a tree 560. The flow data collectors are leaf nodes 562a–562e and the two illustrated FAP processes are intermediate nodes 564a–564b. The root 566 is the collective view of all of the processed accounting information. Given a common view of all the data and the particular accounting information requirements of a given application, the root 566 thus embodies a single accounting/aggregation policy 568. The accounting policy is defined such that an accounting schema is a direct derivative of the accounting policy 568.

The accounting policy 568 is viewed as a collection of accounting objects 570, each defined as an accounting entity identifier 572 and a set of metrics (not shown). The accounting entity identifier is an abstract object resulting from construction functions that use the flow data collector data as its original starting point. If an accounting entity ID is in the accounting policy as a part of a collection of accounting objects, it is there because it can be constructed from the FDC data and the collective set of operations that allow for correlation, enhancement and aggregation. Therefore, if an accounting entity ID can be constructed, it can be decomposed.

To implement a given user/application requirement, therefore, the data flow model 566 decomposes each object's accounting entity ID into policy information 572*a*–*g*, which includes a collection of data 574 that can be supplied by the available flow data collectors and a set of functions or methods 574 needed to correlate, aggregate or enhance that data in order to construct the accounting entity identifier.

Aggregation adjustment takes an accounting policy that is a collection of accounting objects and decomposes those accounting objects into their accounting entity identifiers and then further decomposes the accounting entity identifiers in a recursive fashion to provide the collection of basic data and functions needed to construct those accounting identifiers. This concept builds on the logical directed graphs as seen in many compilers or data flow systems. Knowing the order of the functions, the data requirements and dependencies, the data flow software can build the logical graph from the decomposition and that specifies data requirements and methods that can be distributed to configuration files in the flow data collectors and FAPs to result in adjusting the configuration of those accounting components.

For example, suppose a user wants to receive accounting on an hourly basis from all of the potential sources of information. The flow data collectors 562*a*–562*e* are the components that are available for collecting the raw information to generate the accounting data in accordance with a userspecified accounting policy. The internal FAP processes 564*a*–564*b* further correlate, enhance and aggregate to evolve the data towards the overall accounting data to meet the accounting policy specified by a user. Thus, the user's information requirements are translated into a policy (i.e., collection of objects), which is received by the accounting system and decomposed into the sets of data requirements and methods for each of the available accounting components 562*a*–562*e*, 564*a*–564*b*, that is, policy information 572*a*–572*g*). Assuming that these components or processes are already configured, these sets represent configuration updates that are distributed to and stored in the configuration files (see FAP configuration file 420 from FIG. 16 and FDC configuration file 318 from FIG. 14) in their respective processes.

Figure 22:
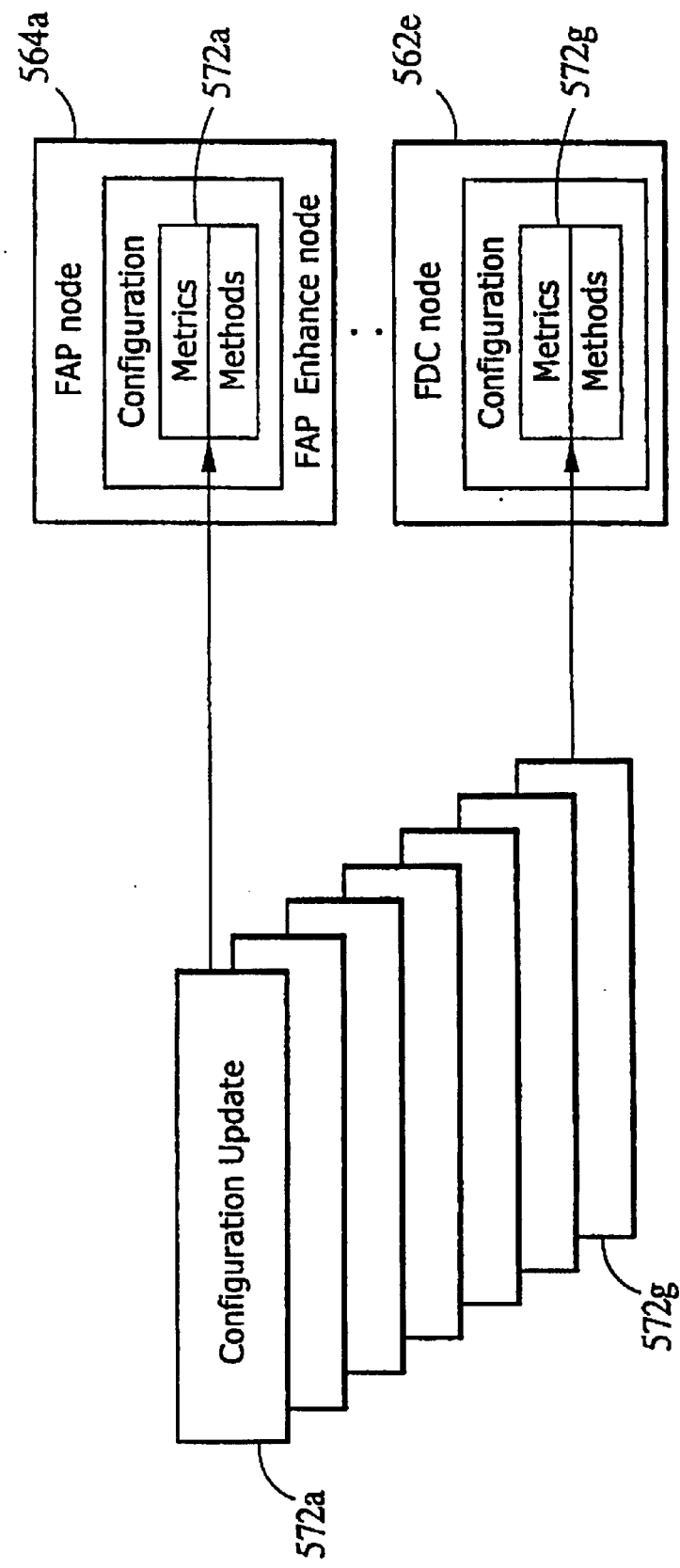
FIG. 22 is an example of a configuration file update for aggregation (policy) adjustment.

Referring now to FIG. 22, a depiction of the configuration update process is shown. The decomposition/configuration update process is implemented in software and is based on known data flow technology used in conjunction with an available visualization tool to act as a front-end graphical interface. Using such visualization tools, the updated configuration is simply mapped to the appropriate component.

It should be noted that not all accounting processes have a complete collection of data collectors. For instance, if the accounting process is to perform user-based accounting and the accounting process only has a flow probe, then it will be necessary to request that the user supply a static table of IP-to-username mappings or a source of DHCP user IP address mappings. The source of that "outside" information becomes part of the decomposition strategy.

Information Management

The NAR sequence number (NAR_SEQ_NUM FIG. 8B) allows components that are in the next level to detect if there are missing NARs in a collection of NARs and can be used to give a sense of how often NARs are produced in a given time period. With the time stamps and the sequence numbers, a per second creation rate of NARs throughout the system can be determined. With this information being part of every NAR, the accounting process 14 can determine a sense of the functional capabilities of the intermediate components and detect some aspects of the communication channel between components. Also included in a NAR identifier is a component type identifier 207*a* which specifies what kind of component produced the NAR and its serial number 207*b* as described above in FIG. 8B. The component type identifier allows the accounting process 14 to keep component statistics and characteristics based on component type. It also allows specific processing on the NARs. NAR IDs are allocated in a very specific way through a management system in order to insure that the IDs are actually unique within the accounting process 14.

Figure 23:
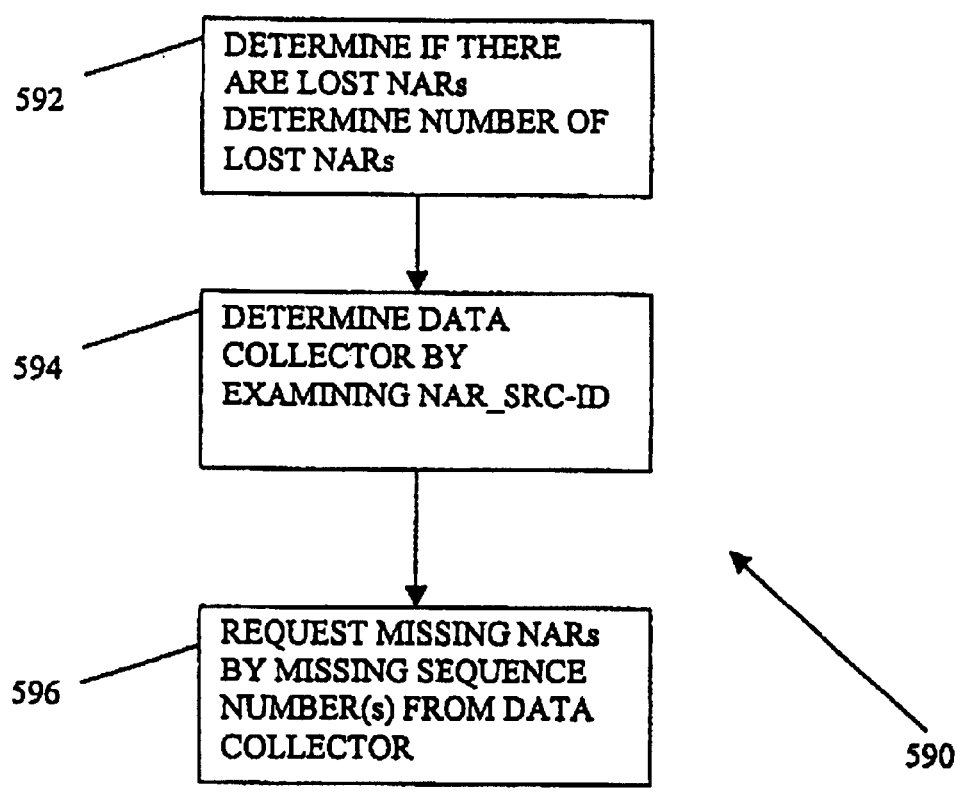
FIG. 23 is a flow chart of an information management process.

Referring now to FIG. 23, the sequence numbers (NAR_SEQ_NUM) are a key reliability feature 590 of the accounting process 14. By having the sequence numbers as part of the NARs and knowing that the numbers are monotonically increasing enables the accounting process 14 to track and identify 592 lost traffic or records. It also enables the accounting process to determine 592 the amount of lost traffic. By having the NARs with stored accounting process component IDs (e.g. a data collector assigned to a particular network device that is allocated at the time that the collector is assigned) the information managment process 590, can identify 594 the data collector responsible for the flow. The accounting process 14 can call back to the data collector that produced the NARs of a particular flow and request 596 that the missing NARs (i.e., those NARs for which there are missing sequence numbers) be retransmitted.

Flow Probe

As discussed above in reference to FIG. 2, the accounting process supports a flow probe e.g., 12*c* that captures a user's network activity for purposes of IP accounting. The flow probe 12*c* monitors all traffic over a given network link and captures data associated with the different flows in the traffic on that link. It is capable of monitoring IP data flows over a number of technologies (e.g., Ethernet, Asynchronous Transfer Mode (ATM), FDDI, etc.).

Figure 24:
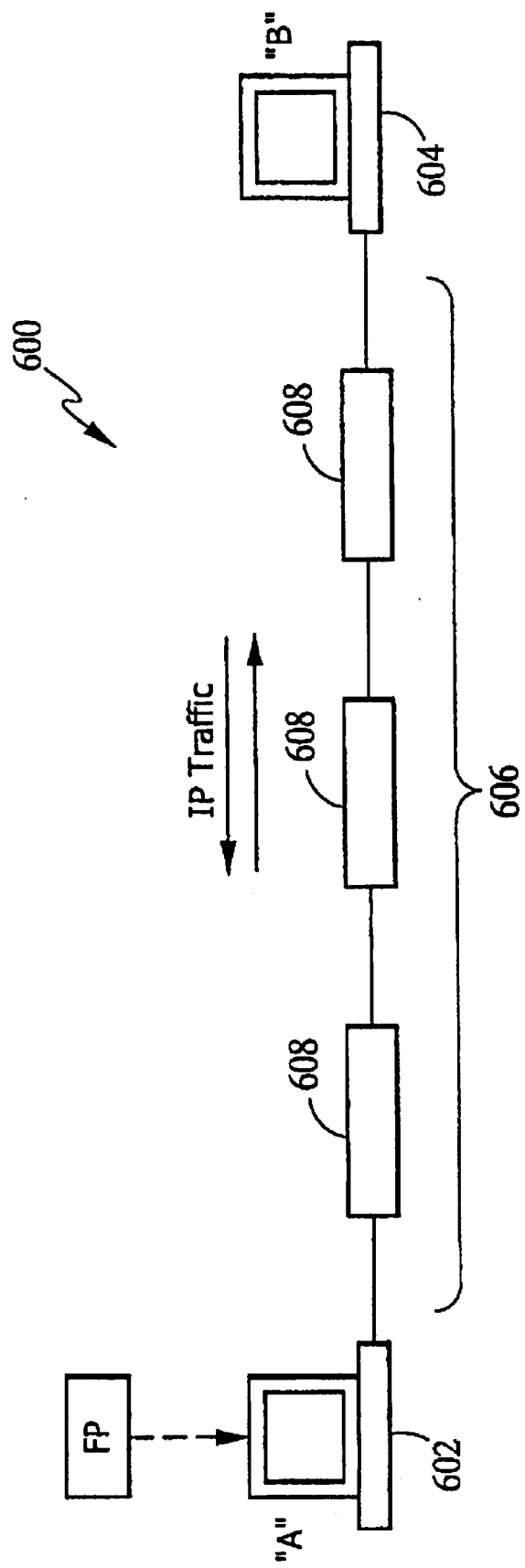
FIG. 24 is a representation of a network communications path between two end stations in a network.

One important feature of the flow probe is its ability to detect and report on successful and unsuccessful connectivity. This capability is useful to billing and chargeback applications. For example, a user may try to connect to a particular switch or reach a particular network, but is rejected. The flow probe 12*c* can identify that transaction as unsuccessful and provides the billing application with information that the billing application can use in determining whether or not the user should be charged for that transaction. The flow-based connectivity model embodied in the flow probe is described generally with reference to FIGS. 23–25, and specifically with reference to FIGS. 27–28. Referring to FIG. 24, a representation of a network 600 in which an end system "A" 602 is connected to another end system "B" 604 is shown. The terminal systems A 602 and B 604 communicate with one another over a communication path 606. Along that path are multiple intermediate devices 608 (e.g., routers, switches) to support the communication services required for communications between A and B. Although the path from A to B is depicted as a single straight line, it may be appreciated that the actual physical topology of this path most likely is extremely complex. For the purpose of understanding the flow probe's connectivity model, however, it is not necessary to know how the actual network would be configured.

The physical deployment of the flow probe in a network, such as the network 600, is based on two criteria: performance, e.g., a 100 Mb probe must be deployed within a region of the network that operates at 100 Mb, and granularity of the information to be generated. That is, if the performance or the quality of service provide by A is of particular interest, then the flow probe is located as close to A as possible so that the flow probe will see all of the traffic that is seen by A.

The deployment of the flow probe may be in-line or out-of-line of the stream of IP packets of interest. Thus, the flow probe 12 may be deployed in-line, i.e., integrated into either of the components that are actually party to a conversation (like end station A 602, as shown in the figure), one of the devices 608 that are actually supporting the communication or out-of-line, i.e., packets are copied and delivered to a remote position.

Generally, a flow is defined as any communication between communicating entities identified by an IP address, a protocol and a service port. All IP packets (or datagrams) are categorized using the fields present in the packets themselves: source/destination IP addresses, the protocol indicated in the IP header PROTO field, and, in the case of User Datagram Protocol (UDP) or Transmission Control Protocol (TCP), by the packet's source and destination port numbers.

In a given network segment monitored by the flow probe, much of the typical IP traffic includes TCP protocol traffic.

Because the flow probe is a flow based monitor that is actually tracking the TCP as a flow, it is completely aware of the TCP protocol and that protocol's three-way handshake algorithm (state machine). The TCP flow has indicators to indicate that a connection is being established or a flow is being disconnected. However, these messages are only relevant to the two communicating parties (e.g., A and B in FIG. 27). The end system A may request that it be able to communicate with B and sends a "TCP SYN" indication. Any of the networking devices 608 along the path 606 can reject this SYN request, completely independent of the intended destination (in this example, end system B) and without the knowledge that the end system B is a party to this communication request. There are a variety of problems that can cause an internal network component to reject a request. For example, a router between A and B may find that there is no route available for forwarding a packet towards B or that the routing path is inoperable (and no alternate exits), or the router may find that it doesn't have the resources to handle the packet.

The Internet Control Message Protocol (ICMP) is designed to convey this type of error event information back to the originator of the request. For example, suppose device 608 is a router that is in a "failed" state and cannot process the SYN request that it received from A. The support exists in the Internet protocol, specifically, ICMP, to signal this condition back to A. Originator A has the ability to correlate the error event with the request and inform the requesting application that its request is not going to be supported. Because the network uses a completely independent protocol, i.e. ICMP, to convey the information, it is necessary to correlate these independent protocols (TCP and ICMP) to provide the accounting process with the information it needs to know about a given transaction. Specifically, the accounting process needs to know if the transaction was successful or unsuccessful and the cause of failure if unsuccessful.

As an independent monitor operating outside of the context of the originating entity ("A", in this example), the flow probe is able to produce a complete and accurate record of the transaction by mapping the network control information to the user request information. To do so, flow probe correlates the state information in protocols such as TCP with error event or condition messages provided by other protocols, such as ICMP. In this manner, it is possible to determine if a particular request for a service has actually been denied as a result of some network independent event. The flow probe correlates the dissimilar protocols together and finds a way of representing the network event in its normal reporting of the TCP flow.

The flow probe has specific reporting mechanisms for the specific protocols. The TCP protocol, for instance, has many more metrics associated with its protocol states than UDP based flows. However, because ICMP relevant events or network relevant events are not associated with or have any impact on the state of TCP or UDP or any of the normal protocols, the flow probe provides a mechanism for tagging its state tracking with the error event. The NAR is represented as a start flow indication, a continuing or status record and a stop record. All of the flow probe's internal protocol indications map to start, continuous or stop states. When a network rejection event comes in (e.g., in the form of an ICMP message, or other type of internet control information), regardless of what state the probe is tracking as the current state, it reverts to a stop state and has to expand upon the normal time or transition based stop conditions to include an specific ICMP event as the cause of the closed state. The flow probe NAR includes bit indications for the actual protocol states that it is tracking. For ICMP generated events, the flow probe indicates whether the source or the destination was affected by the events. In order to convey this network rejection or network event back to the parent flow, the NAR allows for specific network rejection logic to be reported either by the source or the destination, and has specific bit indicators in either the source or the destination fields.

There are two key aspects to the connectivity scheme of the flow probe as described thus far. First, the probe determines that an ICMP event has occurred. Second, the probe correlates that event to the "parent" flow, i.e., the same flow as that associated with the failed request, and stores the exact ICMP event into some state associated with that flow so the event can be reported to the accounting system in a NAR. At this point it may be useful to examine the IP packet and ICMP message formats in general, as well as examine certain fields of interest.

Figure 25:
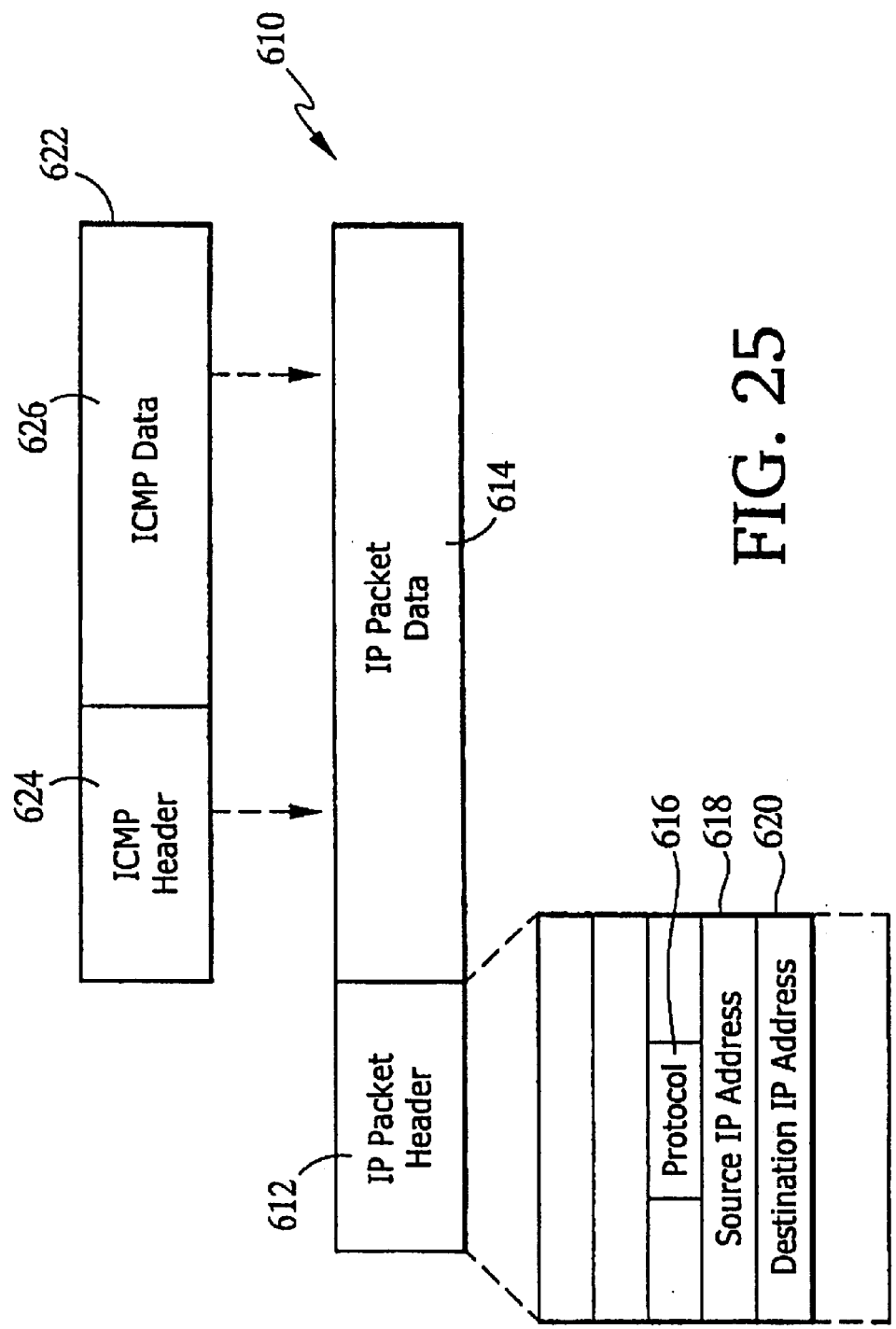
FIG. 25 is an illustration of an ICMP message encapsulated in an Internet Protocol (IP) packet and the formats of the ICMP message and the IP packet.

Referring to FIG. 25, an exemplary IP packet format 610 is shown. The IP packet format 610 includes an IP packet header 612 and an IP packet data field 614. The IP packet header 612 includes a PROTOCOL field 616 for indicating the protocol of the message encapsulated therein. The header also includes a source IP address field 618, a destination IP address field 620 and other known fields (not shown). In the example of FIG. 25, the message contained in the IP packet data field (or payload) is an ICMP message or packet 622. The ICMP packet is formatted to include an ICMP header 624 and an ICMP data field 626. In the example, the protocol field 616 would be set to indicate a protocol value corresponding to ICMP.

Figure 26:
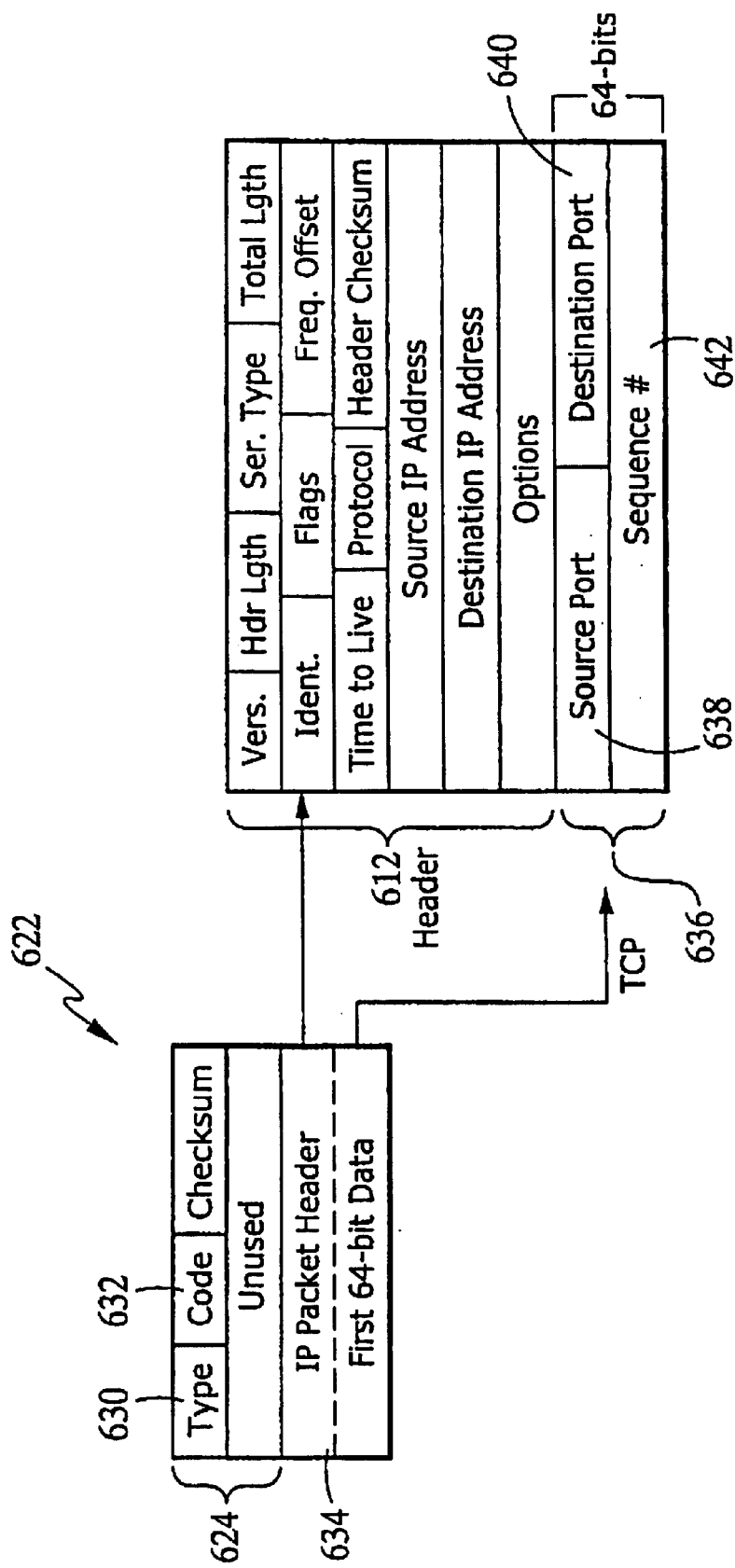
FIG. 26 is an illustration of the format of an ICMP error reporting message header and datagram prefix.

Referring to FIG. 26, an exemplary ICMP message format 622 for reporting errors is shown. The format includes an ICMP message header 624. The header 624 includes a type field 630, which defines the meaning of the message as well as its format, and a code field 632 that further defines the message (error event). The error reporting message types (type values) include: destination unreachable (3); source quench (4); source route failed (5); network unreachable for type of service (11); and parameters problem (12). Each of the types has a number of code values. For a destination unreachable message (TYPE field value is 3), the possible codes (code values) include: network unreachable (0); host unreachable (1); protocol unreachable (2); port unreachable (3); fragmentation needed and DF set (4); source route failed (5); destination network unknown (6); destination host unknown (7); source host isolated (8); communication with destination network administratively prohibited (9); communication with destination host administratively prohibited (10); network unreachable for type of service (11); and host unreachable for type of service (12).

Also included in the ICMP message format is a datagram prefix field 634, which contains a prefix—header and first 64 bits of data—of the IP datagram that was dropped, that is, the datagram that triggered the error event message. The datagram prefix field 634 corresponds to the ICMP message (packet) payload. The IP datagram or packet header 612, partially illustrate in FIG. 24, is shown here in its entirety. Assuming that the IP datagram carries a TCP message, the protocol value would correspond to TCP and the portion of the IP datagram's data 636 (first 64-bits) would in fact correspond to a TCP message header 636, which includes a source port field 638, destination port field 640 and a sequence number field 642. The source port is the port number assigned to the process in originating (source) system. The destination port is the port number assigned to the process in the destination system.

It will be understood that TCP is an example protocol. The field 636 could correspond to a portion of packet header from a packet of another protocol type. Also, the error reporting protocol could be a protocol other than ICMP, and the amount of header in field 636 could be more or less than 64 bits, that is, this amount may be adjusted so that the appropriate flow information can be obtained from the header of the message contained in the discarded IP packet, as described below.

Figure 27:
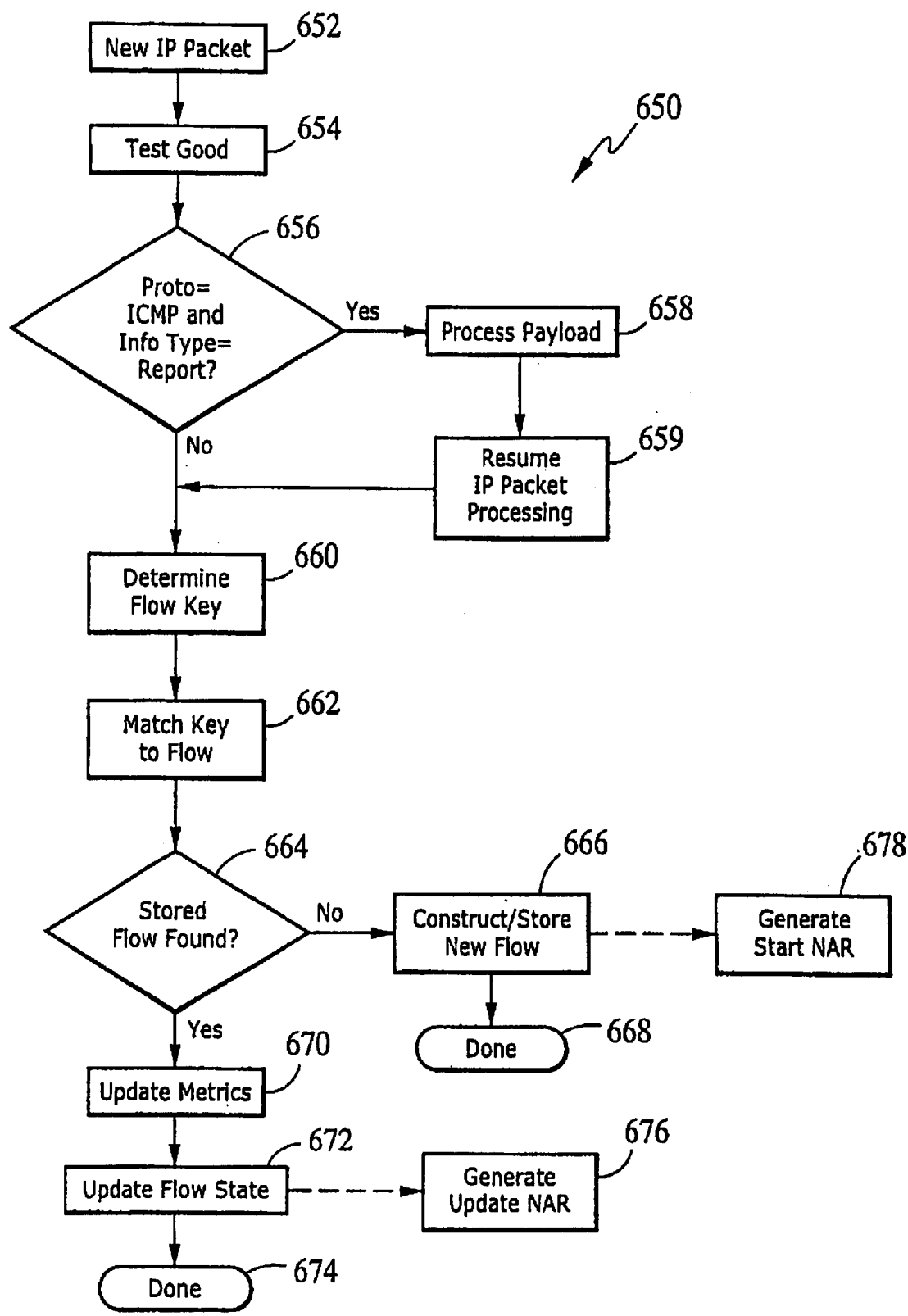
FIG. 27 is a flow probe IP packet processing mechanism.

Referring to FIG. 27, a packet processing method ("the process") 650 performed by the flow probe is shown. The process captures 652 a new IP packet (datagram) and tests 654 the received packet to determine if it is good (i.e., well-formed). The process 650 examines 656 the protocol field in the IP packet header to determine if the protocol is the ICMP protocol. If the protocol is ICMP and the information type field is set to one of the five error reporting messages described above, the process bypasses the IP packet and ICMP message headers and processes 658 the ICMP message or packet payload (FIG. 26), which corresponds to a portion of IP packet which that was discarded and to which the event message relates. The payload process will be described with reference to FIG. 28 below. Once the payload processing is complete, the processing of the IP packet resumes 659 the processing that would be performed if the IP packet had not been detected as containing an ICMP message of the error reporting variety as discussed above, as will now be described.

Still referring to FIG. 27, if the protocol is not ICMP and/or the information type is not an error report, the IP packet is processed as follows. The probe scans 660 the header to determine the values of the fields which correspond to the "flow key", the fields which define "the flow" for the probe. Each flow probe can be configured for a particular flow key definition. For example, the flow key might be the source/destination IP addresses, the source/destination ports and the protocol. The probe determines 662 if the flow key of the processed packet header matches a flow already stored in the flow probe. A local store in the flow probe is used to hold flow representations including flow key parameters, metrics, state information. The state information will include, in addition to the protocol control-related states (i.e., TCP "FIN"), error event/state change cause and source/destination to which the message is addressed. These flow representations are converted into NARs for accounting process reporting purposes.

Still referring to FIG. 27, if the flow probe cannot match 664 the flow key information to a stored flow, the probe constructs (and stores) 666 a new flow and completes 668 the process. If the probe finds a match, it updates 670 metrics for the matching stored flow (or "parent" flow). It also updates 672 the flow state of the parent and then completes 674 the process. It should be noted that the construction of a new flow triggers 676 the generation of a start NAR and the update of the flow state triggers 678 the generation of an update NAR. The generation of NARs by the flow probe will be discussed later.

Figure 28:
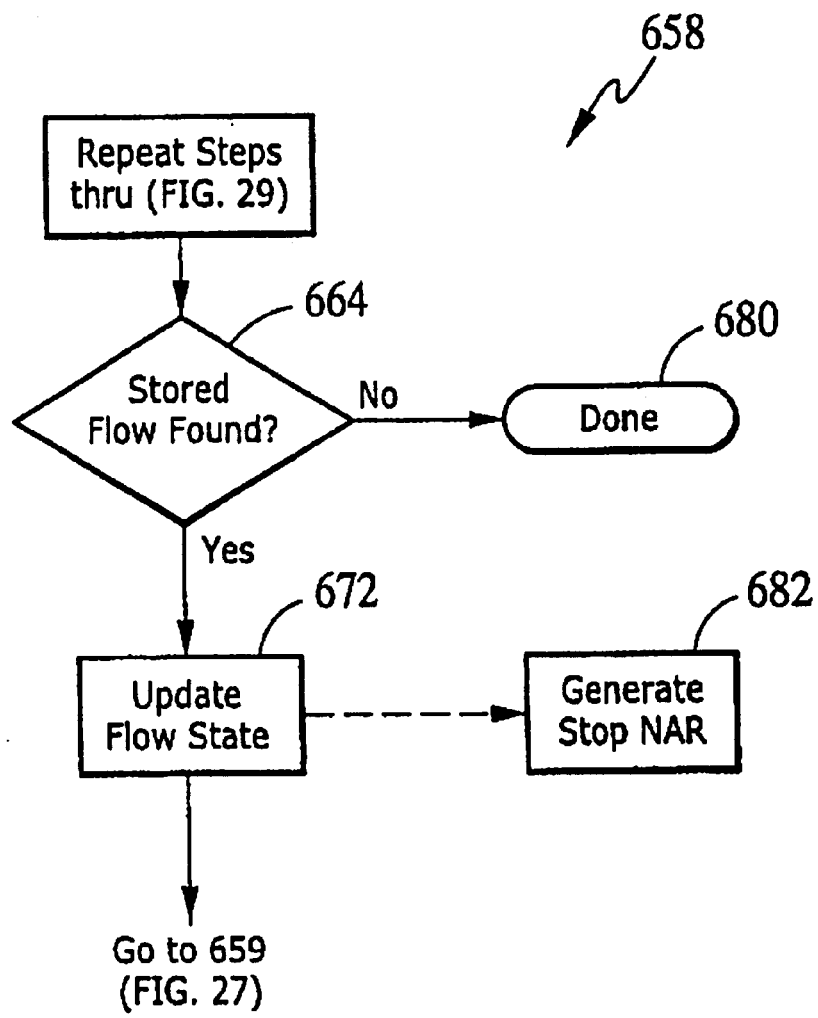
FIG. 28 is the payload processing/protocol correlation of the IP packet processing mechanism of FIG. 26.

Referring to FIG. 28, processing of the ICMP message payload, i.e., the embedded IP packet, 658 (from FIG. 27) is shown. The processing of the ICMP message payload processing is recursive in nature. The essential method is the same as used above for an IP packet (FIG. 27), with a few differences. If the flow probe determines 664 that there is no stored flow corresponding to the flow of the dropped IP packet or datagram (indicated by the ICMP message in the data prefix field or payload 634 of FIG. 26), the processing is complete 680. If a stored flow matching the flow key of the dropped datagram is found, the probe updates 672 the flow state to indicate a "rejected" state for the stored flow. It also updates the flow state information to indicate whether it was the stored flow's source or destination that was associated with the ICMP message and the event cause. The state change (to rejected state) triggers 682 the generation of a stop NAR, as is later described. Once the probe has completed the payload processing 658, it resumes 659 the processing of the original IP packet (as indicated in FIG. 27).

Thus, the payload processing can be viewed as a packet processing exception, an exception that is invoked when it is determined that an ICMP error reporting message has been received. The ICMP message reports a error event and the IP packet associated with that error event. The exception process serves to correlate the flow of the discarded IP packet in the ICMP message with the parent (matching stored) flow, thus mapping the ICMP error (state) information to the parent IP flow.

The flow probe reports on network traffic activity through a flow probe NAR, which reports IP flow traffic activity. The flow probe categorizes network traffic into one of four classes of traffic flow: i) connection oriented (e.g., TCP); ii) new connectionless; iii) request/response connectionless (e.g., User Datagram Protocol (UDP), Domain Name System (DNS)); and iv) connectionless persistent (e.g., Network File System (NFS), Multicast BackBONE, or "MBONE" multicast traffic). To each of these classes it applies connection oriented semantics for a uniform approach to status reporting. That is, the flow probe treats these dissimilar transaction models as if they were the same. There is one uniform structure for the status reports generated for each of the 4 different transactions. Each status report includes transaction start and stop information, media access control (MAC) and IP source and destination addresses, the IP options that were seen, the upper layer protocol used, and the transaction source and destination byte and packet counts and upper layer protocol specific information. The protocol specific information and the criteria for when the status reports are created is different for each of the four transaction types.

The connection oriented protocol understood by the flow probe is TCP. Flow probe has complete knowledge of the TCP state machine and thus can generate status reports with each state transition seen within any individual TCP. There is also a provision for generating time interval based status reporting in the TCP connections that the flow probe is tracking. The status report indicates which states were seen, if any packets were retransmitted, if the source or destination had closed, and if the report had been generated by a time condition. In a default mode, the flow probe generates a cumulative status at the time a TCP closes, or times out. This strategy offers the greatest amount of data reduction on transactions.

Any non-TCP traffic is categorized as a connection-less transaction. When configured to generate the most detailed level of reporting for connectionless traffic, the flow probe can report the discovery of a new connection-less transaction; the existence of a request/response pair within the transaction (as exists when the probe has seen a single packet from both the source and the destination for the transaction); the continuation or transaction persistence, and so forth. The transaction persistence status is generated with a timer function. If it has been seen within a configured timer window, a report is generated.

The status report for non-TCP traffic indicates if the report is an initial report, a request/status report or a continuation (or a current transaction) report.

In the default mode, the flow probe generates a status report when it has seen a request/response "volley" within a transaction and every 15 minutes thereafter, if the transaction persists. This offer immediate notification of request/response traffic and a fair amount of data reduction on connection-less transactions.

Thus, the flow probe state tracking includes protocol-specific state information. It provides detailed information on transport specific flow initiation, such as TCP connection establishment, as well as flow continuation and termination event reporting.

Protocol Independent Packet Monitor

Figure 29A:
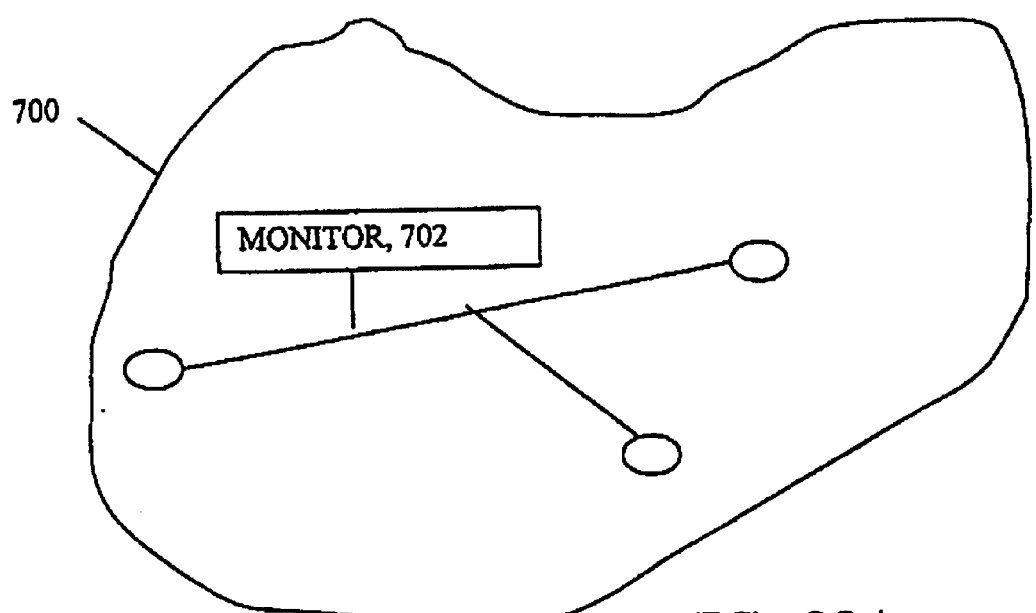
FIGS. 29A–29B are diagrams depicting a protocol independent, packet loss detection monitor.

Referring to FIG. 29A, a network 700 includes a monitor 702 that runs a process for detecting packet loss. The monitor 702 will be particularly described using IP SEC authentication headers. The monitor 702 uses sequence numbers that exist in IP SEC authentication headers. The monitor 702 can be used to detect lost packets in any type of protocol that uses sequence numbers in headers of the packets, etc. The monitor 702 is an independent monitor that can be disposed anywhere in the network 700. The monitor 702 is protocol independent.

The network 700 would include a plurality of such independent monitors 702 each disposed at corresponding single points in the network 70. Typically, the monitor 702 can be disposed in-line such as in a network device such as a switch, router, access concentrator, and so forth. Alternatively, the monitor can be disposed in an out of line arrangement in which network packets are copied from the device and coupled to the out-of line monitor.

The monitor 702 examines each packet of a network flow that passes through the device associated with the monitor 702. The monitor 702 receives serialized IP packets. The packets can have the format specified by the Network Working Group, by S. Kent, Request for Comments: 2402, November 1998 "IP Authentication Header" as part of the "Internet Official Protocol Standards", The Internet Society (1998). The IP Authentication header includes a Next Header field that identifies the type of the next payload after the Authentication Header, Payload Length an 8-bit field specifies the length of AH, and a reserved 16-bit field. The IP Authentication header also includes a Security Parameters Index an arbitrary 32-bit value that, in combination with a destination IP address and security protocol, uniquely identifies the Security Association for a datagram and a Sequence Number. The sequence number is an unsigned 32-bit field containing a monotonically increasing counter value (sequence number). It is always present in such datagrams and is provided form the purpose to enable an anti-replay service for a specific security authentication. According to the standard if anti-replay is enabled the transmitted Sequence Number is not allowed to cycle. Thus, the sender's counter and the receiver's counter are reset by establishing a new security authentication and thus a new key prior to the transmission of the $2^{32nd}$ packet. The datagram also includes Authentication Data, i.e., a variable-length field that contains the Integrity Check Value (ICV) for the datagram.

Figure 29B:
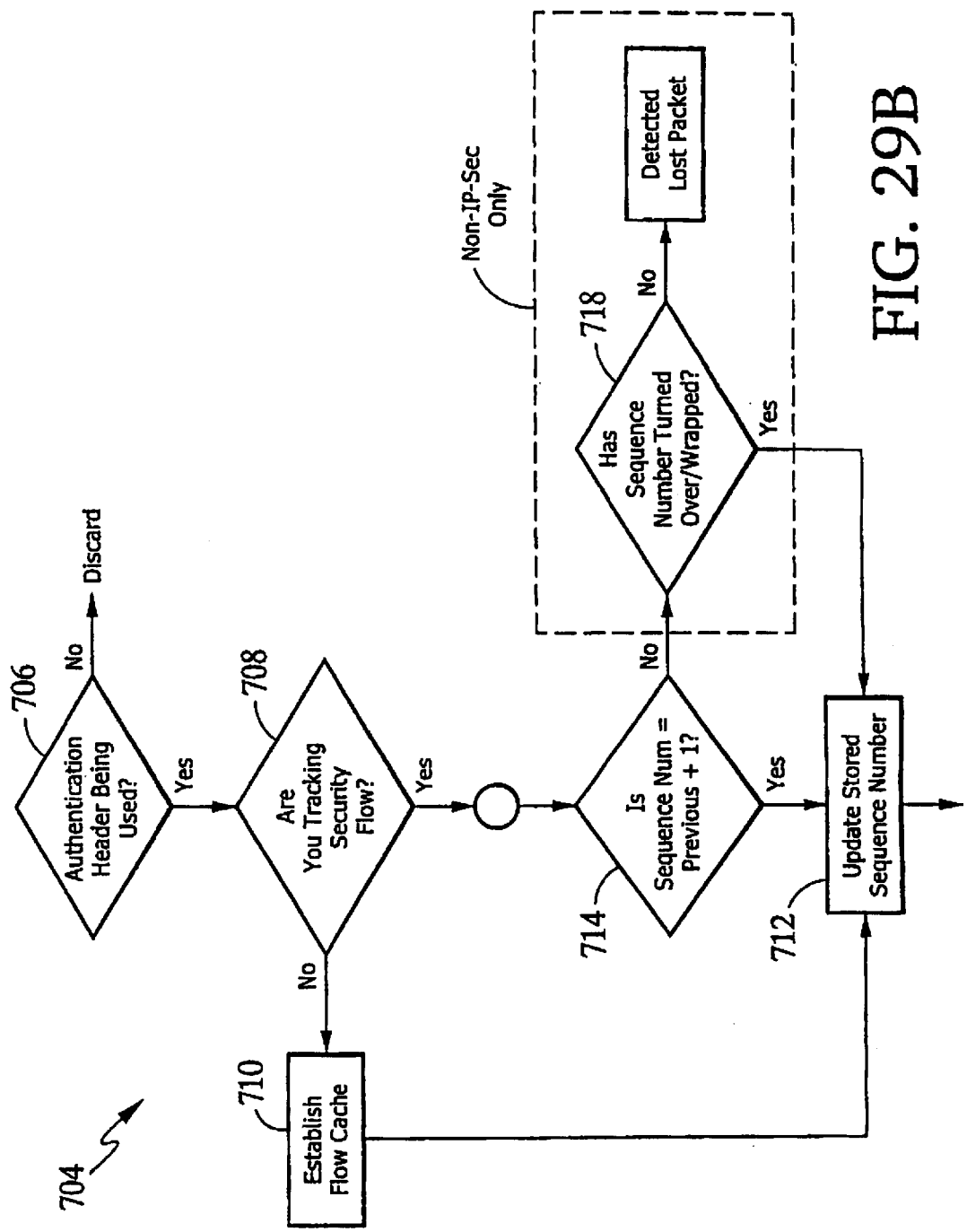

Referring now to FIG. 29B, a packet loss detector process 704 that runs in the monitor 702 is shown. The packet loss detector process 704 examines 706 header information in the packet, to determine if the packet includes an authentication header. If the packet does not include an authentication header, then the packet loss detector process 704 ignores 24 the packet and exits to wait for the next packet. If the packet includes an authentication header, the packet loss detector process 20 tests 708 to determine if the packet loss detector process 20 had been tracking the flow that is represented by the source and destination IP addresses and the SPID value that is in the authentication header. The packet loss detector will perform a cache look up to determine if the flow is stored in a cache of currently tracked flows. The packet loss detector process 20 tests 708 those values to see if the packet loss detector process 704 is currently tracking that security flow.

If the packet loss detector process 704 is not tracking that security flow, the packet loss detector process 20 will establish 710 a flow cache entry for that flow in a cache that can be maintained in memory (not shown). The packet loss detector process 704 will store the source and destination IP address and the SPID value from of the authentication header. The flow cache also includes all other authentication headers from other security flows that have previously been tracked. The flow cache enables the packet loss detector process 20 to monitor and track many hundreds, thousands, and so forth of different security flows. A cache entry is established for every different flow. Once the cache entry is established, the packet loss detector process 704 updates 712 the sequence number entry in the cache for that security flow. That is, the initial sequence number in the authentication header for the encountered flow is stored. The sequence number can start at any arbitrary value.

If, however, the packet loss detector process 704 determined 708 that it is tracking the flow, then the packet loss detector process 704 tests 714 if the sequence number in the current packet is equal to the previous sequence number noted for this flow plus 1. If the sequence number in the current packet is equal to the previous sequence number plus 1, then the packet loss detector process 704 can stop the current evaluation because the packet loss detector process 704 did not detect and the system did not experience any packet loss on that particular association. The packet loss detector process 704 will update 712 the stored sequence number for that flow in the cache.

If the sequence number in the current packet does not equal the previous sequence number noted for this flow plus 1, the packet loss detector process 704 for the IP SEC Authenication packets detected a potentially missed packet.

For some protocols that permit wrap around, the packet loss detector process 704 tests 718 if the sequence number has wrapped around e.g., gone from 32 bits of all ones to 32 bits of all zeros. The IPSec Authentication packets currently do not permit wrap around, so test 718 would not be necessary for IPSec Authentication Headers. If for other protocols (or latter versions of the IPSec Authentication protocol), the packet loss detector process 704 detects a wrap around condition, then there has not been any packet loss and the packet is dropped. The packet loss detector process 704 will update 712 the stored sequence number for that flow in the cache. If the sequence number is any other number, i.e., it did not turn over to all zeros, then there may have been packet loss. If there may have been packet loss, the packet loss detector process 704 can determine how many packets have been lost by determining how many sequence numbers are missing.

When packets may traverse more than one packet monitor 10, the packet loss detector process 704 may produce a packet loss detected indication that does not indicate that the packets were actually dropped. A packet loss drop indication in a multi-monitor embodiment indicates that the lost packets did not come is through the particular packet loss detector process 704. However, the indicated lost packets could be on other segments of the network. That is, it is possible that other parts of the current flow are in other parts of the network. Therefore, the packet loss detector process 704 notes how many packets were actually successfully transmitted, as well as lost, and optionally their sequence numbers. These values can be compared to other values from other monitors 702 to establish whether or not there had been packet loss for the flow through the network.

This indication, could be converted into Network Accounting Records thus would be coupled to a process e.g. the accounting process 14 that reports statistics on that particular flow to provide a summary of how many packets were lost relative to how many packets were actually successfully transmitted on the flow. In the accounting process 14, the network accounting records are correlated, aggregated, enhanced and so forth to identify network flows. This information can be used to determine the records that correspond to a particular network flow and whether a determined network flow lost any packets.

Capturing Quality Of Service

Figure 30:
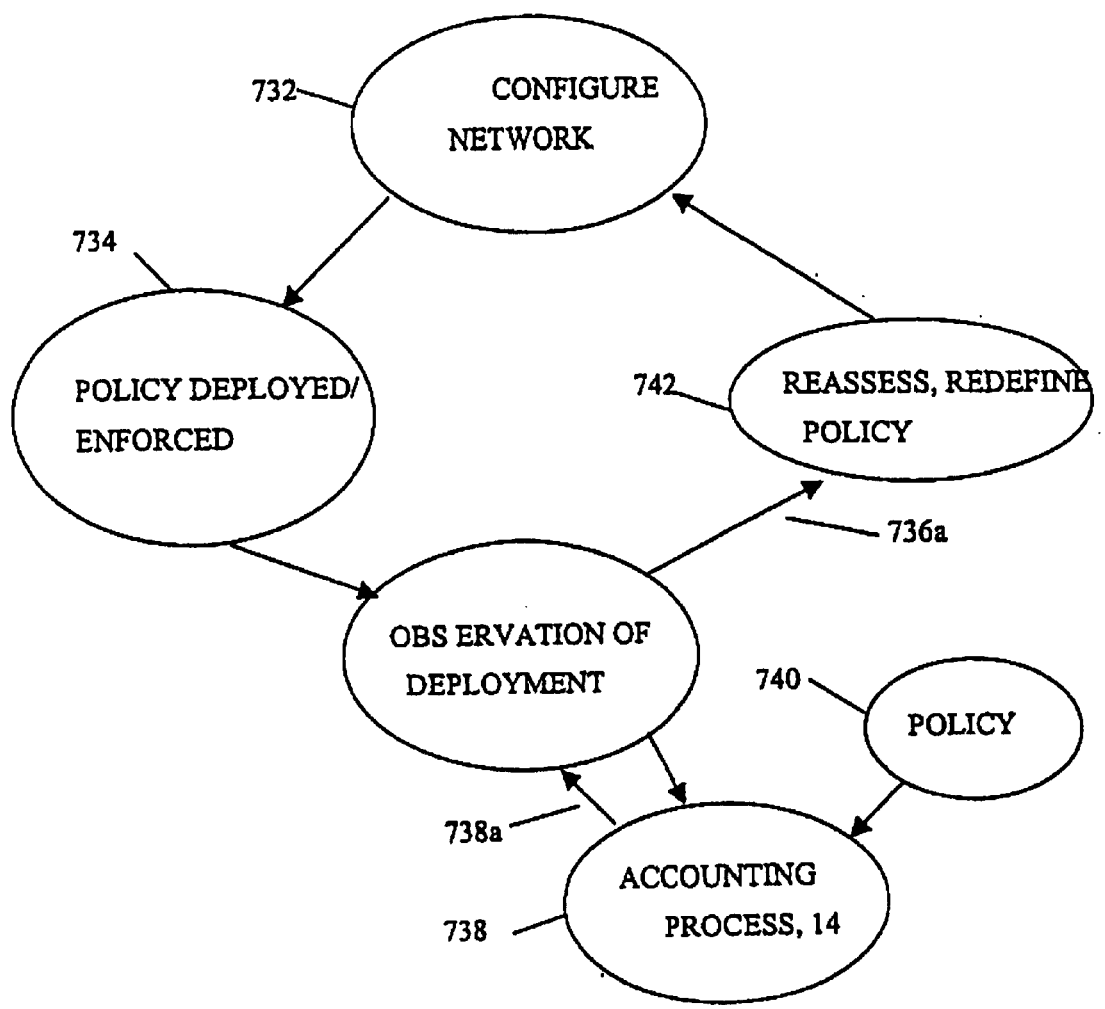
FIG. 30 is a diagram depicting a process to capture quality of service.

Referring now to FIG. 30, a process 730 for capturing quality of service in a network system 11, (FIG. 1), is shown. The capturing quality of service process 730 allows an administrator to configure 732 the network 11 with a policy that corresponds to a first quality of service. The process 730 also includes an optimization process that assigns or develops 734 the policy, defines the policy being used, and enforces the policy by deploying a policy dictated configuration into various policy enforcement devices in the network 11. The capturing quality of service process 730 allows the administrator to observe 736 the actual service delivered by the network 11 to a customer on the network 11 to determine if the quality of service provided matches that specified by the policy 740.

The capturing quality of service process 730 uses an accounting process 738 to collect information from the network. A preferred accounting process is accounting process 14 described above. The accounting process 14 collects data from the network 11 as part of the observation process 736. The accounting process collects different kinds of metrics from the network, correlates these metrics to specified network flows, via the use of NARS, and maps collected, correlated information i.e., NARs back to the policy that was defined and actually deployed in the network. Because the accounting process 14 performs this observation function, the accounting process can provide an indication 738*a* whether or not the policy 740 is being satisfied.

By deploying the accounting process 14 to observe service quality, the capturing quality of service process 730 can validate performance of service level agreements (not shown). If the capturing quality of service process 730 detects that the policy level specified in a service level agreement is not being enforced, then the policy can be reassessed, redefined, and redeployed 742. The capturing quality of service process 730 can again observe 737. Through the observation 736, the capturing quality of service process 730 can determine whether reassessment and redefining of the deployed policy was successful. Several cycles of this quality of service optimization process could be required.

An important component of quality of service includes determining whether there has been packet loss. The packet detector monitor described in conjunction with FIGS. 29A and 29B can be used to access packet loss. The packet detection monitor 702 can be deployed in the network and generate NARs that can be used to determine packet loss as discussed above. This information can be used in the capturing quality of service process 730 to assess whether the policy specified by the service level agreement was provided to the customer. Additionally, so called Differentiated Service "DiffServ technology" that a known quality of service solution that has been proposed for the Internet as well as enterprise networks. In contrast to a per-flow orientation of some types of quality of service solutions such as Integrated Services (Int-serv) and Resource Reservation Setup Protocol (RSVP), Diffserv enabled networks classify packets into one of a small number of aggregated flows or "classes", based on bits set in the type of service (TOS) field of each packet's IP header. This quality of service technology for IP networking is designed to lower the statistical probability of packet loss of specific flows. The capturing quality of service process 730 establishes DiffServ policy that is decomposed into a collection of DiffServ configurations. The DiffServ configurations are deployed to a collection of routers or switches that the customer would have access to in the network 11 as part of the enforcement/deployment process 732. Because packet loss is a statistical phenomenon, the capturing quality of service process 730 observes 736 a large number of network flows. The capturing quality of service process 730 can observe network traffic because of the use of the accounting process 14 and the resulting NARs at the granularity in which the DiffServ policies are actually being deployed. The DiffServ policies are generally deployed at the source and destination IP address, protocol and possibly destination port level.

By observing 736 network flows at the same granularity as a DivServe policy enforcement mechanism, if the capturing quality of service process 730 detects packet loss at that granularity, then there will be a direct feedback coupling to determine whether the policy is actually being enforced or not. If the policy is not being enforced, then an administrator will can reassess the policy, redefine the policy, and redeploy 742 new enforcement strategies. The capturing quality of service process 730 again will observe 736.

As mentioned, because IP network quality of service is a statistical phenomenon, the capturing quality of service process 730 obtains a large number of samples, over a long period of time. Through this optimizing capturing quality of service process 730 and DivServe deployment 734, the customer will get beneficial policy deployment for this service.

Service Management

Figure 31:
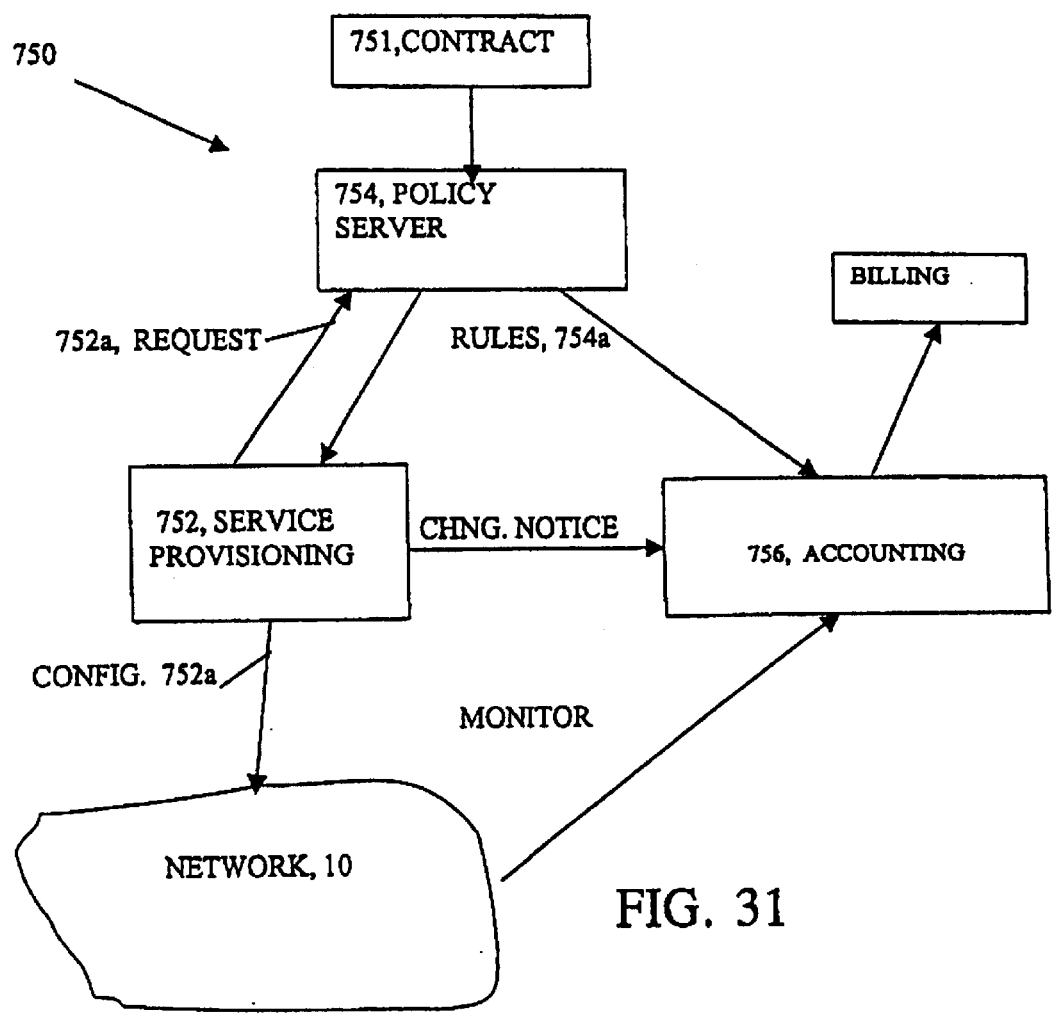
FIG. 31 is a diagram of a service managment process.
Figure 32:
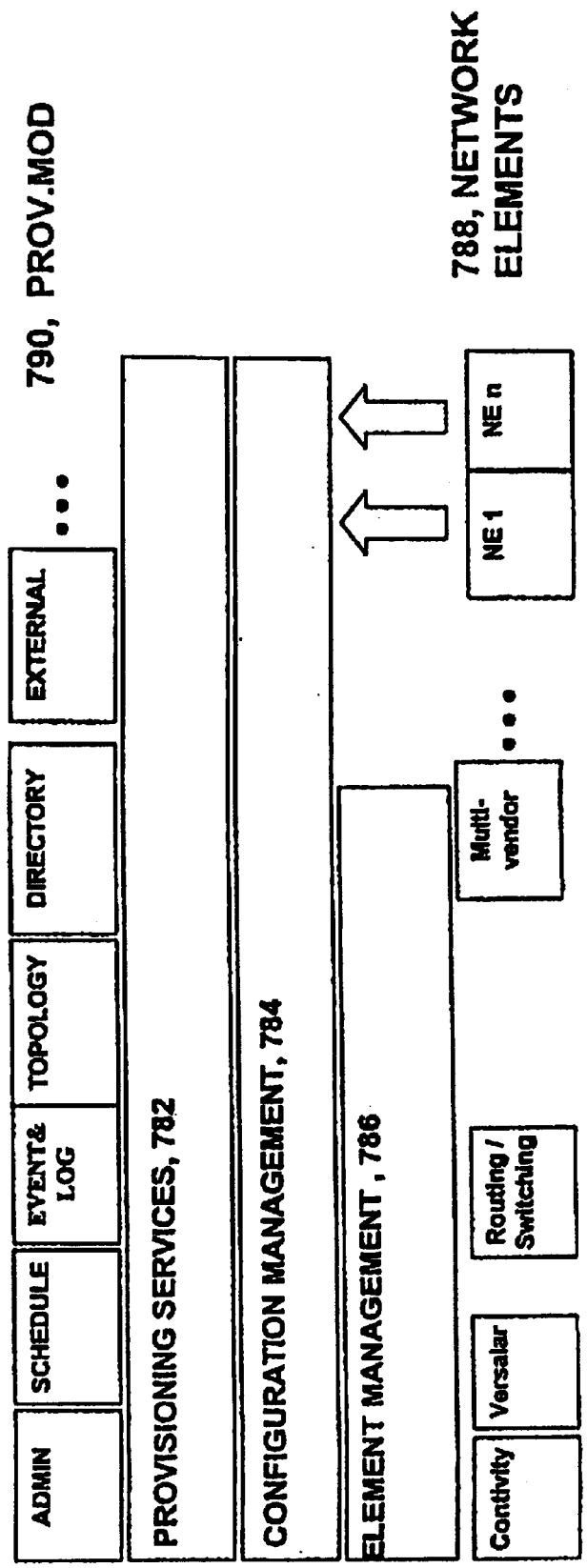
FIG. 32 is a diagram showing an architecture of a service provisioning application.

Referring now to FIG. 31, a service managment loop 750 includes a service provisioning application 752, a policy enabled network server 754 and an accounting process 756. In a typical example, an Internet Service Provider (ISP) and a customer will enter into a service agreement or contract 751 that will specify a level of service for the network. The contract 751 has requirements and conditions that are enforced by the policy enabled network 754. The service contract 751 is decomposed by the policy server to produce a template that defines the service represented by the agreement 751. The template is fed to the service provisioning application 752 that actually produces a configuration file 752a that is sent out to the network 10 to configure network for a level of service based upon that contract 751.

A service management feedback process 750 therefore includes three components, service provisioning 752, policy server 754 and service accounting 756. The role of service provisioning 752 is to semi requests 752b to the policy server 754 to obtain an appropriate active policy, and to obtain rules and domain information 754a from the policy server. The provisioning system can communicate with appropriate network management systems and element management systems (not shown) to configure the network 10 for an end-to-end service. When the configuration 752a is deployed at the various network devices (not shown), the service is produced. The level of service is monitored or audited by the accounting system 756 which can be the accounting process 14 described above. The accounting process 14 monitors the level of service by producing appropriate network accounting records. The network accounting records (NARs) are used by a billing application to adjust billing based on the level of service that was provided as determined by the accounting process 14. The accounting process 14 also can compare the policies produced by the policy server to the actual levels of service provided to the customer by examining NARs that are produced by the customer's usage of the network.

In addition, levels of service might change, and the system takes changes into account so that the service management can modify the charge or account differently for those changes in levels of service. The service accounting also uses the active policy information from the policy server to deliver billing information to a billing system or to a chargeback system that can make adjustments to billings for the service.

A policy server 754 is built on the capabilities of address management, domain name management and so forth. Essentially in a policy enabled network, policy servers produce a set of rules and apply those rules to a domain or problem set. The policy server communicates the rules to the accounting process 14 so that the accounting process 14 can determine what kind of records to generate. All of the information is described using data flows.

As an example, a service contract may specify that a company "X" will be given 100% availability of a particular network device e.g., a router (not shown) and its corresponding service. In order to assure that level of service, the policy server 754 sends that requirement in a template to the provisioning service 752 to produce a configuration file 752a to configure the router to give company "X" preferred use of the router. Therefore, every time a packet from company "X"'s network comes across the router, the packet will always be transmitted unless there is something wrong with the router. This may occur even if a packet of company "Y", which has a lower service level that company "X", is waiting in the router to be transmitted. The packet from company "Y" will wait because company "Y" is not paying for the quality of service that company "X" is paying for.

In that case, the provisioning service 752 configures the policy enforcement mechanism that was put into the router in the network. How the policy was defined to the provisioning equipment is that there is a one-to-one relationship between the policy and what the accounting process 14 will monitor in the network. The accounting process 14 will be aware that company "X" contracted to have 100% availability from the router.

The accounting process 14 will then take every source of information it has available and will construct an accounting record that reflects the level of service actually delivered to company "X." The accounting records produced are relative to two components, i.e., the router and the customer. The accounting process 14 is flexible and can generate accounting records of any flow abstraction. In the service management feedback process 750, the policy server 754 sends a flow based policy to the provisioning service 752. The provisioning service 752 uses a flow based policy to configure the network. That same flow based policy is passed to the accounting process 14, which can generate NARs having metrics that can be used to match the same level of those flows. The output of the accounting process 14 will determine whether the quality of service, availability, etc. that was contracted for in the contract 751 was provided. Therefore, the service management feedback process 750 provides the level of service that was delivered at the same semantic level as the actual contract.

Capturing quality of service as audited by the accounting process 14 includes detecting packet loss, as mentioned above. Each of the components managed by the service management feedback process 750 requires information. Therefore, the provisioning service 752 has to provision these various quality levels. The policy server 754, thus, keeps what is essentially enforcement of the levels of quality that are offered by different service types, and the accounting process 756 detects, monitors and audits whether those classes in quality of service are being delivered.

Referring to FIG. 3, an implementation of the provisioning service 752 is shown, The provisioning service 752, extends concepts of device management and network management into a service management layer of functionality. The provisioning service 752 includes a provisioning core 782, provisioning modules 784, and element managers 786. The provisioning service 752 is user focused rather than network focused, as in conventional network management. Network management involves communication with network systems and equipment. The provisioning service 752 is oriented more towards a user and a user's concepts of services. The provisioning service 752 provides an additional layer of abstraction that relates the description of services at a user level to a network's ability to provide those end-to-end services. The architecture 780 of provisioning service 752 is a multi-device 788 at the bottom of the architecture and multi-service 790 at the top of the architecture. The provisioning service 752 is deployed to write commands to the network systems, i.e., multi-devices 788 in order to change the configurations of those systems.

Since many end customer services now require that a network operate with multiple kinds of network elements in order to provide an end-to-end service, the provisioning service 752 simplifies producing information that is necessary for a service provider to translate a service order from a customer to a network configuration, i.e., all commands necessary for all the different elements in the network in order to create an end-to-end service.

The provisioning service 752 builds on existing systems. That is, in the lower layers there are existing element managers that have a configuration management system to configure at the network layer, The provisioning service 752 adds layering over the conventional network management layer. The provisioning service 752 maps a customer specified end-to-end service to the network elements that are required to produce that end-to-end service. Mapping of a customer's service orders into the state of the network can have various pieces of workflow necessary to create or completely activate this service order.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of transmitting accounting records in an accounting system that produces information pertaining to network traffic flow comprising:
   collecting data from a network device by a data collector associated with the network device and producing accounting records from the data;
   transmitting the accounting records to first and second flow aggregation processes, with transmitting further comprising for each flow aggregation process:
   storing in the data collector the accounting records;
   transmitting the accounting records to the flow aggregation process; and
   awaiting an acknowledgment signal from the flow aggregation process that the flow aggregation process received the accounting records before discarding the accounting records sent to the flow aggregation process.

2. A system, including an accounting module, comprising:
   a plurality of data collectors disposed in a network, and which collect data pertaining to operation of the network from network devices;
   a first flow aggregation process, connected to the plurality of data collectors, wherein the data collectors send the collected data to the first flow aggregation process; and wherein the data collectors dispose of the collected data only after receiving an acknowledgment that the data has been received with the first flow aggregation process processing the data to generate aggregated records; and
   a second flow aggregation process, connected to the data collectors, wherein the data collectors send the collected data to the second flow aggregation process, and dispose of the collected data only after receiving an acknowledgment that the data has been received, with the second flow aggregation process processes the data to generate aggregated records.

3. The method of claim 2 wherein if the data collector determines that the flow aggregation process is not operating, the method further comprises:
   continuing to collect and store accounting records from the network device for future transmission to that flow aggregation process.

4. The method of claim 2 wherein if the data collector does not receive an acknowledgment signal in response to transmitting the records to the flow aggregation process, the method further comprises:
   determining an error relating to the first flow aggregation process; and
   causing aggregate reports from the second flow aggregation process to be sent to the accounting module in place of the aggregate reports from the first flow aggregation process.

5. The method of claim 2 wherein the data collector produces network accounting records (NARs) from collected data.

6. The method of claim 5 wherein if the transfer is successful, the method further comprises:
   removing from a local store of the data collector the locally stored copies of the transferred NARs.

7. The method of claim 5 wherein store and forward capabilities of the flow data collector provide fault tolerance at this accounting process level to ensure reliable data transfer.

8. The method of claim 5 wherein flow data collector only transfers NARs when the data collector has determined that the flow aggregation process is available, and the data collector considers the NAR transfer successful upon receipt of an acknowledgment from the flow aggregation process.

9. The method of claim 1 further comprises:
   determining an error relating to the first flow aggregation process, and causing aggregate reports from the second flow aggregation process to be sent to the accounting module in place of the aggregate reports from the first flow aggregation process.

10. The system of claim 2 wherein the first and the second flow aggregation process summarizes related information from the received NARs across network devices.

11. The system of claim 2 further comprising:
    an error detection process that detects an error relating to the first flow aggregation process, to cause the aggregate reports from the second flow aggregation process to be sent to the accounting module in place of the aggregate reports from the first flow aggregation process.

12. The system of claim 11 wherein the data collector further comprises:
    logic to determine that the flow aggregation process is not operating to cause the data collector to collect and store accounting records from the network device for future transmission to the flow aggregation process.

13. The system of claim 11 wherein the data collector, further comprises:
    logic to determine an error relating to the first flow aggregation process; and to cause aggregate reports from the second flow aggregation process to be sent to the accounting module in place of the aggregate reports from the first flow aggregation process.

14. The system of claim 11 wherein the data collector produces network accounting records (NARs) from collected data.

15. The system of claim 14 wherein the data collectors further comprise:
    a local store that locally stored copies of the transferred NARs.

16. The system of claim 11 wherein the data collectors provide store and forward capabilities to provide fault tolerance to the accounting module to ensure reliable data transfer.

17. The system of claim 11 wherein the data collector only transfers NARs when the data collector has determined that the flow aggregation process is available, and the data collector considers the NAR transfer successful upon receipt of an acknowledgment from the flow aggregation process.

18. A computer program product residing on a computer readable medium for transmitting accounting records in an accounting system comprising instructions to cause a computer to:

collect data associated with a network device and produce accounting records from the data;

transmit the accounting records to first and second flow aggregation processes to produce aggregate reports of the accounting records;

store the accounting records in a local storage; and await an acknowledgment signal from the first flow aggregation process that the flow aggregation process received the accounting records before discarding the accounting records sent to the first flow aggregation process; and determine an error relating to the first flow aggregation process to cause the aggregate reports from the second flow aggregation process to be sent to the accounting module in place of the aggregate reports from the first flow aggregation process.

19. The computer program product of claim 18 further comprising instructions to cause a computer to:

determine that one of the flow aggregation processes is not operating;

cause the data collector to continue to collect and store records from the network device for future transmission to that flow aggregation process.

20. The computer program product of claim 19 wherein the data collector produces network accounting records (NARs) from collected data.

21. The computer program product of claim 19 further comprises instructions to:

remove the locally stored copies of the transferred NARs from a local store of the data collector if the transfer is successful.

22. The computer program product of claim 19 wherein store and forward capabilities of the flow data collector provide fault tolerance at accounting process to ensure reliable data transfer.

23. The computer program product of claim 19 further comprises instructions to:

determine that aggregation process is available before the data collector transfers NARs, and the data collector considers the NAR transfer is successful upon receipt of an acknowledgment from the aggregation process.

* * * * *